(12) United States Patent
Clarabut et al.

(10) Patent No.: US 12,555,994 B2
(45) Date of Patent: Feb. 17, 2026

(54) SYSTEMS AND METHODS FOR IMPROVED BATTERY ASSEMBLIES FOR EVTOL AIRCRAFT

(71) Applicant: Archer Aviation Inc., San Jose, CA (US)

(72) Inventors: Alex Clarabut, Santa Clara, CA (US); Likhith Madamanchi, Sparks, NV (US); Alex Ho Yang, Mountain View, CA (US); Ryan Joseph Cherniak, Sunnyvale, CA (US); Kerry Manning, Parker, CO (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/663,052

(22) Filed: May 13, 2024

(65) Prior Publication Data

US 2024/0297495 A1   Sep. 5, 2024

Related U.S. Application Data

(63) Continuation of application No. 18/297,138, filed on Apr. 7, 2023, now Pat. No. 12,100,850.

(Continued)

(51) Int. Cl.
*H02H 5/04*     (2006.01)
*B60L 3/00*     (2019.01)
(Continued)

(52) U.S. Cl.
CPC .......... *H02H 5/047* (2013.01); *B60L 3/0046* (2013.01); *B60L 50/66* (2019.02); *B60L 58/10* (2019.02);

(Continued)

(58) Field of Classification Search
CPC ..... B60L 50/66; H01M 50/24; H01M 50/242; H01M 50/213; H01M 50/229; H01M 50/291; H01M 50/383
See application file for complete search history.

(56) References Cited

U.S. PATENT DOCUMENTS

| 8,353,374 B2 | 1/2013 | Sugawara et al. |
| 8,785,026 B2 | 7/2014 | Hu et al. |

(Continued)

FOREIGN PATENT DOCUMENTS

| CN | 107760274 A | * | 3/2018 |
| CN | 106252549 B | | 3/2019 |

(Continued)

OTHER PUBLICATIONS

International Search Report and Written Opinion in corresponding PCT application No. PCT/US2023/079406, mailed Apr. 18, 2024, 12 pages.

*Primary Examiner* — Jonathan G Jelsma
(74) *Attorney, Agent, or Firm* — Finnegan, Henderson, Farabow, Garrett & Dunner, LLP

(57) ABSTRACT

This disclosure relates generally to an apparatus for organizing battery cells. The apparatus includes a block including: sleeves forming chambers, a first sheet configured to locate the sleeves, and a foam structure surrounding the sleeves. Each chamber is configured to accommodate a battery cell. The block is configured to: organize the battery cells into battery cell groups, separate each battery cell group from its adjacent battery cell groups using a thermally insulating material, and prevent gas from entering into each battery cell group from its adjacent battery cell groups. Each battery cell group includes a plurality of the battery cells, each of the battery cells in the battery cell group is adjacent to at least another of the battery cells in the battery cell (Continued)

group. Each battery cell group is adjacent to at least another battery cell group.

28 Claims, 36 Drawing Sheets

Related U.S. Application Data

(60) Provisional application No. 63/383,660, filed on Nov. 14, 2022, provisional application No. 63/378,680, filed on Oct. 7, 2022.

(51) Int. Cl.
| | |
|---|---|
| *B60L 50/60* | (2019.01) |
| *B60L 58/10* | (2019.01) |
| *B64D 27/24* | (2006.01) |
| *H01M 10/42* | (2006.01) |
| *H01M 10/48* | (2006.01) |
| *H01M 50/209* | (2021.01) |
| *H01M 50/213* | (2021.01) |
| *H01M 50/229* | (2021.01) |
| *H01M 50/24* | (2021.01) |
| *H01M 50/242* | (2021.01) |
| *H01M 50/291* | (2021.01) |
| *H01M 50/383* | (2021.01) |
| *H01M 50/583* | (2021.01) |
| *H02J 7/00* | (2006.01) |
| *B64C 29/00* | (2006.01) |

(52) U.S. Cl.
CPC .......... *B64D 27/24* (2013.01); *H01M 10/425* (2013.01); *H01M 10/48* (2013.01); *H01M 50/209* (2021.01); *H01M 50/213* (2021.01); *H01M 50/229* (2021.01); *H01M 50/24* (2021.01); *H01M 50/242* (2021.01); *H01M 50/291* (2021.01); *H01M 50/383* (2021.01); *H01M 50/583* (2021.01); *H02J 7/0031* (2013.01); *H02J 7/0047* (2013.01); *H02J 7/0063* (2013.01); *B60L 2200/10* (2013.01); *B64C 29/0008* (2013.01); *H01M 2010/4271* (2013.01); *H01M 2220/20* (2013.01)

(56) References Cited

U.S. PATENT DOCUMENTS

| | | | |
|---|---|---|---|
| 9,837,656 B2 | 12/2017 | Miller et al. | |
| 10,784,668 B2 | 9/2020 | Ing et al. | |
| 10,847,777 B2 | 11/2020 | Dekeuster et al. | |
| 11,394,072 B2 | 7/2022 | Jansen et al. | |
| 2014/0255748 A1 | 9/2014 | Jan et al. | |
| 2015/0222131 A1 | 8/2015 | Kano | |
| 2018/0287127 A1 | 10/2018 | Onnerud et al. | |
| 2018/0358671 A1 * | 12/2018 | Halsey | H01M 10/6557 |
| 2019/0296310 A1 | 9/2019 | Newman et al. | |
| 2020/0220121 A1 * | 7/2020 | Day | H01M 50/124 |
| 2021/0320365 A1 | 10/2021 | Nishikawa et al. | |
| 2022/0077507 A1 | 3/2022 | Hilligoss et al. | |
| 2022/0102954 A1 | 3/2022 | Baseri et al. | |
| 2022/0158273 A1 | 5/2022 | Razack | |
| 2022/0200082 A1 | 6/2022 | Fayemi et al. | |
| 2022/0271277 A1 | 8/2022 | Krafft et al. | |
| 2022/0285762 A1 * | 9/2022 | Ziegler | B64D 27/24 |
| 2022/0294059 A1 | 9/2022 | Gu et al. | |
| 2022/0328918 A1 | 10/2022 | Pitre et al. | |
| 2023/0163384 A1 | 5/2023 | Northwood et al. | |
| 2023/0187752 A1 | 6/2023 | Fuchs et al. | |
| 2024/0380038 A1 * | 11/2024 | Cheng | H01M 50/133 |
| 2025/0038348 A1 | 1/2025 | Scheile et al. | |

FOREIGN PATENT DOCUMENTS

| | | | | |
|---|---|---|---|---|
| CN | 115280580 A | | 11/2022 | |
| DE | 102009035488 A1 * | | 2/2011 | .......... H01M 50/107 |
| DE | 102018124790 A1 | | 4/2020 | |
| DE | 102018124793 A1 | | 4/2020 | |
| EP | 3993139 A1 | | 5/2022 | |
| EP | 4435935 A1 | | 9/2024 | |
| WO | 2021254701 A1 | | 12/2021 | |
| WO | 2022080845 A1 | | 4/2022 | |
| WO | WO-2023236218 A1 * | | 12/2023 | ........ H01M 10/0431 |

\* cited by examiner

SYSTEMS AND METHODS FOR IMPROVED BATTERY ASSEMBLIES FOR EVTOL AIRCRAFT

CROSS-REFERENCE TO RELATED APPLICATIONS

The present application is a continuation of U.S. application Ser. No. 18/297,138, filed Apr. 7, 2023, which claims priority to and the benefits of U.S. Provisional Patent Application No. 63/378,680, filed on Oct. 7, 2022, and U.S. Provisional Patent Application No. 63/383,660, filed on Nov. 14, 2022, all of which are incorporated herein by reference in their entireties for all purposes.

TECHNICAL FIELD

This disclosure relates generally to the field of powered aerial vehicles. More particularly, and without limitation, the present disclosure relates to innovations in aircraft that use electrical propulsion systems. Certain aspects of the present disclosure generally relate to the high voltage power supply (HVPS) systems and battery assemblies used in the aerial vehicles. Other aspects of the present disclosure generally relate to improvements in the cooling distribution system that may be used for other types of vehicles but can provide particular advantages for aerial vehicles.

SUMMARY

Embodiments of the present disclosure provide an apparatus for organizing battery cells. The apparatus includes a block including: sleeves forming chambers, a first sheet configured to locate the sleeves, and a foam structure surrounding the sleeves. Each chamber is configured to accommodate a battery cell. The block is configured to: organize the battery cells into battery cell groups, separate each battery cell group from its adjacent battery cell groups using a thermally insulating material, and prevent gas from entering into each battery cell group from its adjacent battery cell groups. Each battery cell group includes a plurality of the battery cells, each of the battery cells in the battery cell group is adjacent to at least another of the battery cells in the battery cell group. Each battery cell group is adjacent to at least another battery cell group.

Embodiments of the present disclosure provide a method for assembling an apparatus for organizing battery cells. The method includes: locating a plurality of sleeves to a first sheet to provide a plurality of chambers, each chamber being configured to accommodate a battery cell, and casting a foam material around the plurality of sleeves to provide a foam structure protecting the battery cells, in which the first sheet is configured to position the plurality of sleeves before the casting.

Embodiments of the present disclosure provide an apparatus for organizing battery cells. The apparatus includes a block comprising a plurality of hexagonal cells, each hexagonal cell configured to accommodate a battery cell. The block comprises: a honeycomb core structure forming the plurality of hexagonal cells, and a foam material within each of the hexagonal cells to provide a foam structure surrounding a corresponding battery cell to protect the corresponding battery cell.

It should be understood that the above general descriptions and the following detailed descriptions are merely for exemplary and explanatory purposes, and do not limit the present disclosure.

DETAILED DESCRIPTION

Figure 1A:
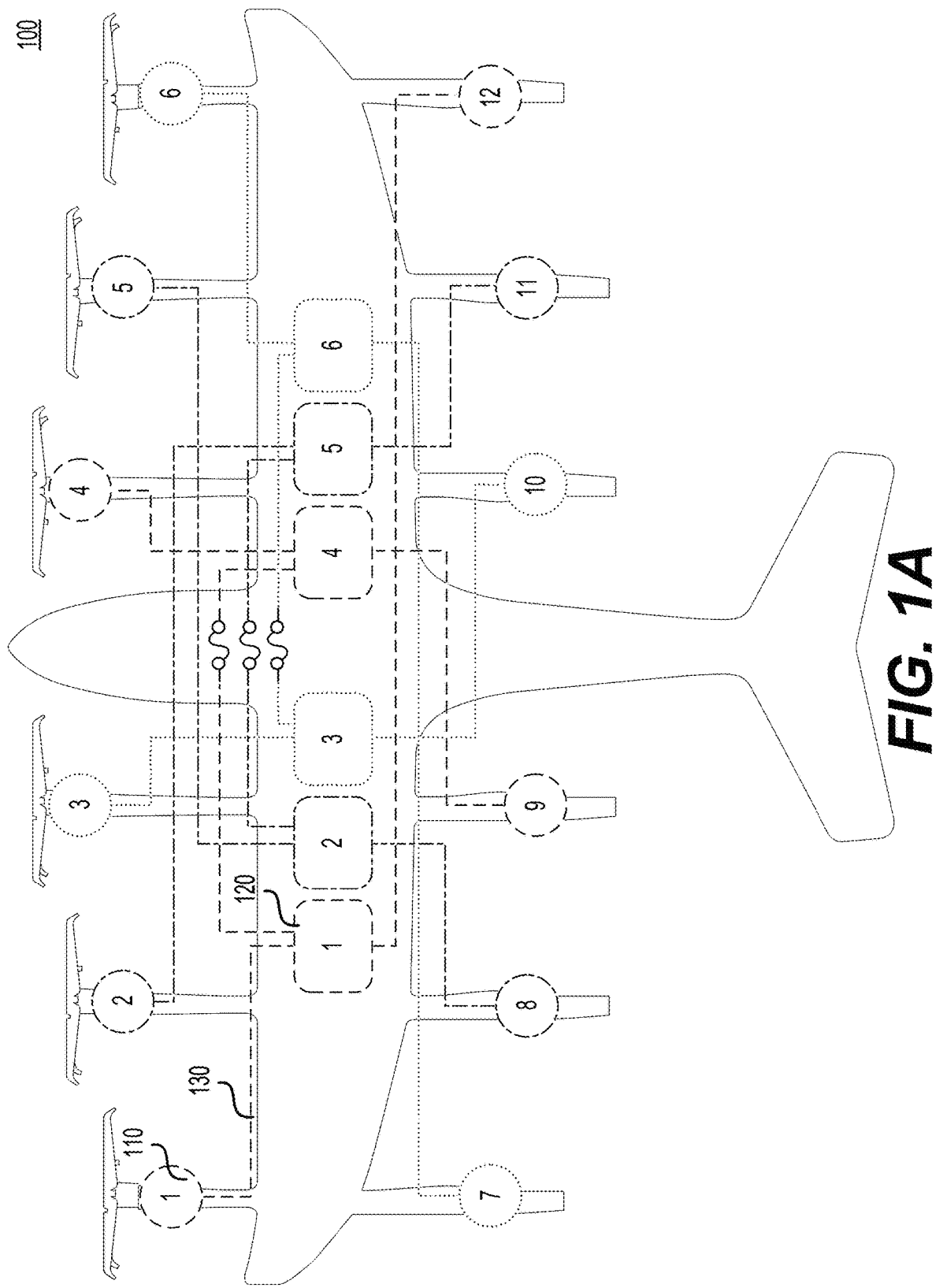
FIG. 1A is a diagram illustrating an eVTOL aircraft, consistent with some embodiments of the present disclosure.

An electric vertical take-off and landing (eVTOL) aircraft refers to an aircraft that uses electric power to hover, take off, and land vertically. In the following embodiments, components of an eVTOL aircraft primarily for use in a non-conventional aircraft will be addressed. For example, the eVTOL aircraft may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft includes mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms.

For example, it may be desired for safety reasons that the aircraft is propelled by a distributed propulsion system, avoiding the risk of a single point of failure, and that the aircraft is capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

The disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In some embodiments, the aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during take-off and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

In some embodiments, an electrical engine as described herein may possess design features which mitigate and protect against uncontained fire, such as utilizing less than one quart, or another non-hazardous quantity, of flammable fluid contained in both the tilt and lift engines, not possessing a nominal ignition source within the electric engines, possessing an engine over temperature operating limit that may be more than 50° C. less than a flammable fluid auto-ignition temperature, overtemperature detection and protection, overvoltage detection and protection, and overcurrent detection and protection. In some embodiments, the design features of the electrical engine may deem it to not be a designated fire zone.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in a housing that is cantilevered off of the rear of the motor and may be air cooled. It is to be recognized that such an inverter orientation would not be an optimum configuration in terms of the housing required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor housing. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator housing, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. It should be understood that the example embodiments as mentioned herein are representative and do not dictate the bounds of the amount of lubricant and coolant that may be used in an electrical engine.

It is understood that by using oil to not only lubricate the electrical engine but also cool the electrical engine rather than another coolant, additional oil will be added to the system, but that oil will remove traditional components that may be used to cool such an electrical engine. For example, if the electrical engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Additional embodiments of electrical engines may possess various components to ensure any flammable fluids are monitored and prevented from entering certain sections of the electrical engine. Some embodiments may include an electric engine possessing a wet zone enclosure that may be defined by a gearbox, motor, and/or heat exchanger. In some embodiments, an electric engine may possess up to 4 liters of air within the motor-gearbox housing which is in contact with engine oil. Embodiments of a motor-gearbox housing may equalize internal and external pressure using a breather. Embodiments of a breather may include it protruding above nearby design features in order to prevent inadvertent entry of external fluids. Additional embodiments may include a breather that possesses a screen and a circuitous entry path to prevent entry of external debris. Embodiments may include a sight glass being present on both the tilt and lift electric engines in order to check that oil is not overfilled or underfilled during servicing.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter will detect AC overcurrent and isolate the erroneous phase and/or will continuously monitor input DC voltage, and will apply protective actions to keep voltages under the overvoltage operating limit.

Reference is made to FIG. 1A. FIG. 1A is a diagram illustrating an eVTOL aircraft 100, consistent with some embodiments of the present disclosure. As shown in FIG. 1A, in some embodiments, the distributed electrical propulsion system of the eVTOL aircraft 100 may include twelve electrical engines 110, which may be mounted on booms forward and aft of the main wings of the aircraft 100. The forward electrical engines 110 may be tiltable mid-flight between a horizontally oriented position (e.g., to generate forward thrust) and a vertically oriented position (e.g., to generate vertical lift). The forward electrical engines 110 may be of a clockwise type or counterclockwise type in terms of direction of propeller rotation. The aft electrical engines 110 may be fixed in a vertically oriented position (e.g., to generate vertical lift), and may also be of a clockwise type or counterclockwise type in terms of direction of propeller rotation.

The aircraft 100 may possess various combinations of forward and aft electrical engines 110. For example, in some embodiments, the aircraft 100 may possess six forward electrical engines 110 and six aft electrical engines 110. In some other embodiments, the aircraft 100 may include four forward electrical engines 110 and four aft electrical engines 110, or any other combination of forward and aft engines 110. In some other embodiments, the number of forward electrical engines and aft electrical engines are not equivalent.

In some embodiments, for a vertical takeoff and landing (VTOL) mission, the forward electrical engines 110 as well as aft electrical engines 110 may provide vertical thrust during takeoff and landing. During flight phases where the aircraft 100 is in forward flight-mode, the forward electrical engines 110 may provide horizontal thrust, while the propellers of the aft electrical engines 110 may be stowed at a fixed position in order to minimize drag. The aft electrical engines 110 may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines 110 may provide horizontal thrust for wing-borne take-off, cruise, and landing. In some embodiments, the aft electrical engines 110 may not be used for generating thrust during a CTOL mission and the aft propellers may be stowed in place.

In some embodiments, an electric engine 110 may be housed or connected to a boom of the aircraft 100 and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger. In some embodiments, the amount of oil used to lubricate and cool the electric engine may vary, including amounts less than one quart, two quarts, three quarts, or any other measured amount of oil.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

As shown in FIG. 1A, the aircraft 100 may be configured with the distributed electric propulsion system enabling vertical flight, forward flight, and transition. The forward 6 electric engines 110 (which are numbered 1-6 from left to right) are with variable pitch propellers tilt to achieve vertical takeoff and landing, transition flight and fully wing-borne flight. The aft 6 electric engines 110 (which are numbered 7-12 from left to right) are equipped with fixed pitch propellers that operate during vertical takeoff and landing and transition and are stowed in a minimum drag position for conventional flight. The flight controls are an integrated fly-by-wire system that features envelope protection and structural load limiting functions. The aircraft 100 will be equipped with advanced cockpit avionics, a flight management system, and the sensors necessary to support the intended operations and system functions.

In some embodiments, an electrical propulsion system (EPS) as described herein may generate thrust by supplying High Voltage (HV) electric power to the electric engine 110, which in turn converts HV power into mechanical shaft power which is used to rotate a propeller. As mentioned above, an aircraft 100 as described herein may possess multiple electric engines 110 which are boom-mounted forward and aft of the wing. The amount of thrust each electric engine 110 generates may be governed by a torque command from the Flight Control System (FCS) over a digital communication interface to each electric engine 110. Embodiments may include forward electric engines 110, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, the aircraft 100 include a high voltage power supply (HVPS) system to supply the High Voltage (HV) electric power. The HVPS system is the source of power on the aircraft 100 and configured to distribute the stored electrical energy to other systems on the aircraft 100, including the electrical propulsion system (EPS) for converting electrical power into mechanical rotational shaft power to generate thrust, the environmental control system (ECS) to power equipment needed to control the internal atmosphere within the cabin, and the low voltage system (LVS) to power equipment and LRUs that operate on low voltage power (e.g., 28 VDC). In some embodiments, the HVPS uses an external HV power source to recharge or replenish its energy source on the aircraft 100. Charging the system ensures that sufficient energy is available to power all equipment needs, including the ECS, the EPS, and the LVPS, to successfully perform the subsequent flight mission.

Specifically, the HVPS system may include various subsystems, including a Battery Pack Subsystem, an HV Venting Subsystem, an HV Cooling Distribution Subsystem, and an HV Charging Subsystem. The Battery Pack Subsystem provides requisite power and energy needs for equipment on the aircraft and includes monitoring units that measure parameters, perform estimation algorithms and provide active protection against conditions that negatively impact the performance, life and safety of the HVPS. The HV Venting Subsystem may be configured to perform a safe removal of battery emissions during abnormal operating to prevent both structural degradation and minimize the risk of propagation. The HV Cooling Distribution Subsystem may be configured to distribute thermally conditioned coolant to the battery pack subsystem in order to reach requisite temperatures for safe charge and discharge operations. The HV Charging Subsystem provides the interface between the aircraft 100 and off-board charger and is responsible for sequencing charging operations and continuously monitoring voltage and current limits during the charging session.

Figure 1B:
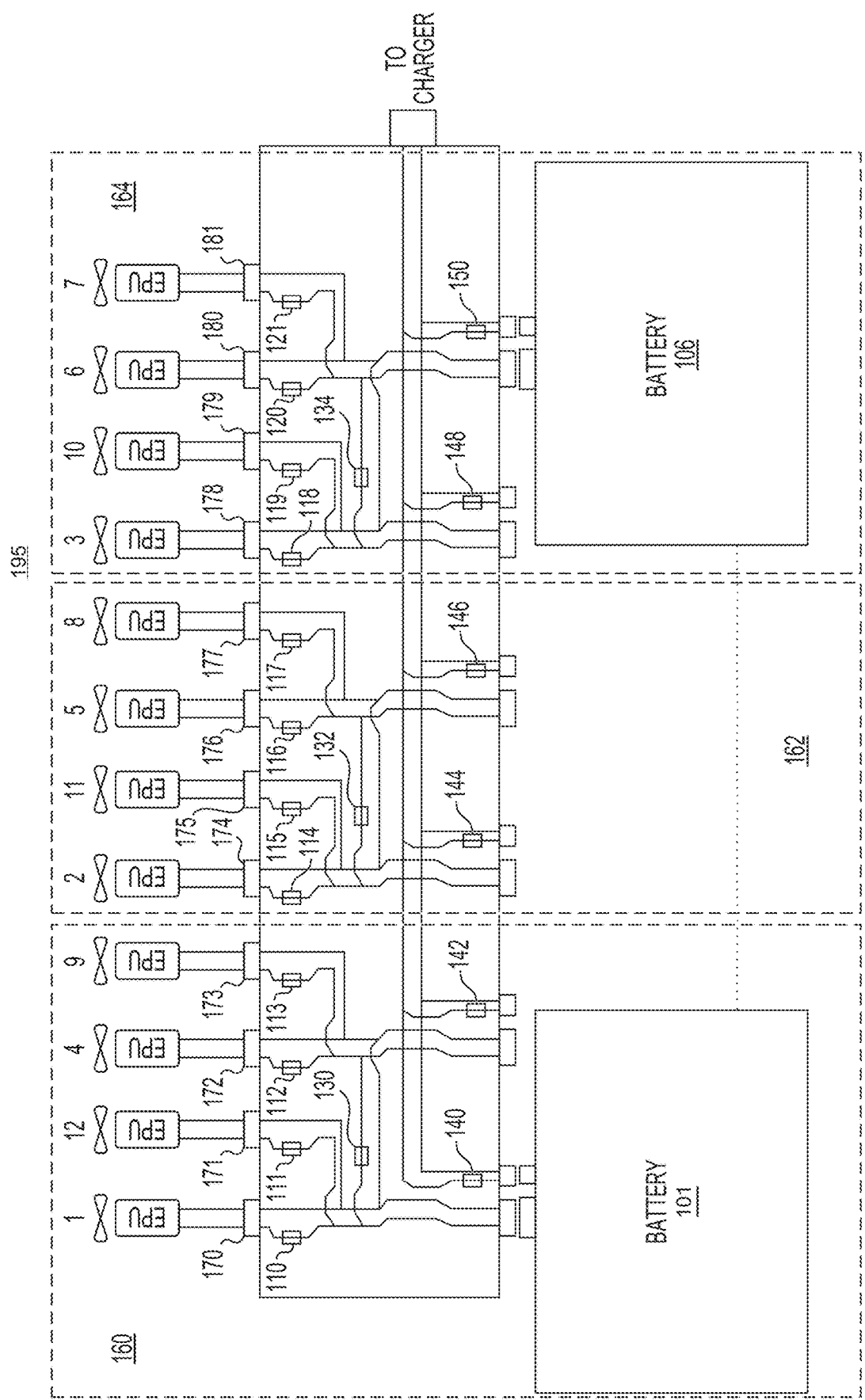
FIG. 1B is a diagram illustrating an eVTOL aircraft, consistent with some embodiments of the present disclosure.
Figure 1C:
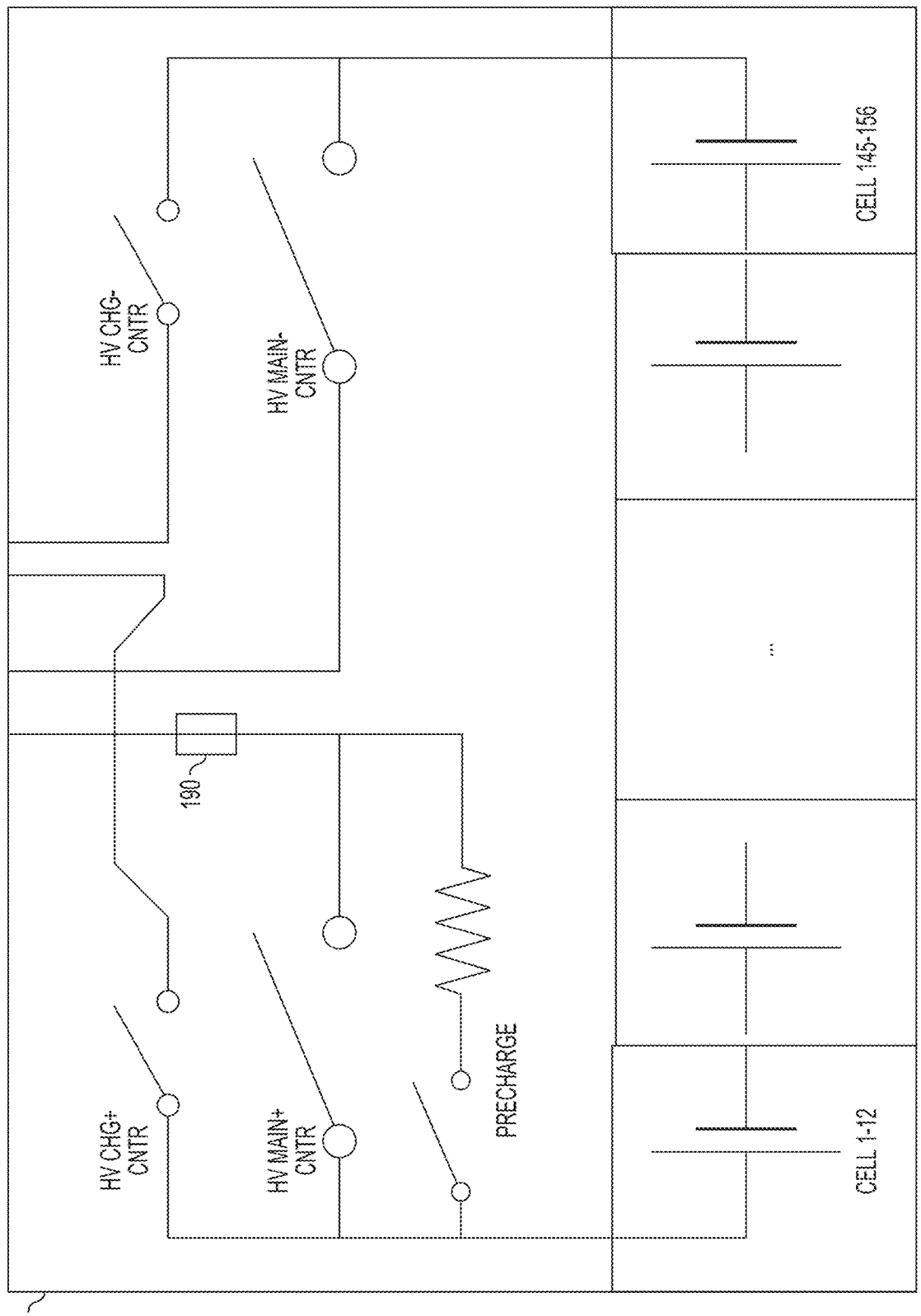
FIG. 1C shows an exemplary embodiment of one of the batteries of FIG. 1B.

As shown in FIG. 1A, the HVPS system of the aircraft 100 may include six battery packs 120 (which are numbered 1-6 from left to right) installed within the battery bays in the wing of the aircraft 100. In some embodiments, six battery packs 120 may have the identical design, to simplify the design, manufacturing, and logistics. Each battery pack 120 is connected to two diagonally opposing electric engines 110 through HV channels 130. HV channel pairs are associated by position in each wing (left, center, right) and indicated by different dotted/dashed lines in FIG. 1A. Reference is made to FIG. 1B. FIG. 1B is a diagram illustrating an eVTOL aircraft 195, consistent with some embodiments of the present disclosure. As shown in FIG. 1B, in some embodiments, an eVTOL aircraft may include a battery assembly comprising three (3) electrically separate paired battery pack units 160, 162, and 164. In some embodiments, each paired battery pack unit 160, 162, 164 may include an electrically separate high voltage bus 130, 132, 134 which connects paired batteries out of a set of six total batteries 101-106 of a given paired battery pack unit 160, 162, 164. FIG. 1C shows an exemplary embodiment of one of batteries 101-106. In some embodiments, each set of paired batteries may power four symmetric electrical engines 170-173, 174-177, or 178-181 which, in turn, power four electric propeller units (EPUs) (labelled as 1-12 in FIG. 1B) simultaneously. In some embodiments, the electrical engines 170-181 may correspond to the twelve electrical engines shown in FIG. 1A (labelled as 1-12 in FIG. 1A).

With reference to FIG. 1C, some embodiments may include a pyro-technical fuse 190 located within each one of batteries 101-106. In some embodiments, the pyro-technical fuse may be utilized to prevent a single point of failure upon a short circuit or failure of any one battery of a set of paired batteries by disconnecting the failing battery after activation of the pyro-technical fuse which severs the connection between the failing battery and an operating portion of the electrical system of the eVTOL aircraft 195.

With reference to FIG. 1B, in some embodiments, additional fuses may be positioned on HV buses which connect other components of each paired battery pack unit. For example, fuses 110-121 may be located on an HV bus between each battery 101-106 and respective electrical engines 170-181 and EPUs (labelled as 1-12 in FIG. 1B). Each of fuses 110-121 may be utilized to prevent a single point of failure upon a short circuit or failure of any one component of one of the electrical engines 170-181 or EPUs (labelled as 1-12 in FIG. 1B) by, e.g., disconnecting the failing component after activation of a respective one of the fuses 110-121 which acts to sever the connection between the failing component and operable portions of the electrical system of the eVTOL aircraft 195. As another example, charge fuses 140, 142, 144, 146, 148, and 150 may be located on an HV bus between each battery 101-106 and a charger or charging system. Each of charge fuses 140, 142, 144, 146, 148, and 150 may be utilized to further prevent a single point of failure upon a short circuit or failure of any one battery while charging by, e.g., disconnecting the failing battery from the charger or charging system after activation of one or more of fuses 140, 142, 144, 146, 148, and 150 which severs the connection between the failing battery and operable portions of the electrical system of the eVTOL aircraft 195.

As described herein, the orientation and use of electric propulsion systems may change throughout the operation of the aircraft, depending on various failure scenarios. In some embodiments, each set of paired batteries may power four symmetric electrical engines simultaneously.

For example, and with further reference to FIGS. 1B and 1C, a first battery 101 of a first paired battery pack unit 160 may directly power two of twelve electrical engines 170, 171 which, in turn, power two EPUs (labelled as 1 and 12 in FIG. 1B), and a second battery 102 (not shown) of the paired battery pack unit 160 may directly power two other electrical engines of the twelve electrical engines 172, 173 which, in turn, power two other EPUs (labelled as 4 and 9 in FIG. 1B). In some embodiments, the first battery 101 and the second battery 102 (not shown) of the paired battery pack unit may be cross-linked (i.e., electrically interconnected) via a first high voltage (HV) cross-linking bus 130. In some embodiments, the first HV cross-linking bus 130 may allow for the first battery 101 to act as a backup battery for the second battery 102 (not shown), thereby providing power to the two electrical engines 172, 173 and EPUs (labelled as 4 and 9 in FIG. 1B), which were initially powered by the second battery 102, when the second battery 102 (not shown) fails. In some embodiments, the first HV cross-linking bus 130 may allow for the second battery 102 (not shown) to act as a backup battery for the first battery 101, thereby providing power to the two electrical engines 170, 171 and EPUs (labelled as 1 and 12 in FIG. 1B), which were initially powered by the first battery 101, when the first battery 101 fails. In some embodiments, in the event of a failure of either the first battery 101 or the second battery 102 (not shown) of the first paired battery pack unit 160, the failing battery may be disconnected from the other working battery of the paired battery pack. In some embodiments, the disconnecting may be performed via a pyro-technical fuse 190 located near an output of each battery 101-106 and thus along the HV connection between the first and second batteries 101, 102 of the paired battery pack unit 160. In some embodiments, each battery 101, 102 of the first paired battery pack unit 160 may be electrically separable, e.g., via charge fuses 140, 142, from the remainder of the first paired battery pack unit 160 and any other paired battery pack unit 162, 164 such that, e.g., failures may be isolated events that do not propagate along any connected HV channels.

Continuing the above example, and further with reference to FIGS. 1B and 1C, a third battery 103 (not shown) of a second paired battery pack unit 162 may directly power two additional electrical engines 174, 175 which, in turn, power two other EPUs (labelled as 2 and 11 in FIG. 1B), and a fourth battery 104 (not shown) of the second paired battery pack unit 162 may directly power two other electrical engines 176, 177 which, in turn, power two other EPUs (labelled as 5 and 8 in FIG. 1B). In some embodiments, the third battery 103 and the fourth battery 104 of the second paired battery pack unit 162 may be cross-linked (i.e., electrically interconnected) via a second HV cross-linking bus 132. In some embodiments, the second HV cross-linking bus 132 may allow for the third battery 103 to act as a backup battery for the fourth battery 104, thereby providing power to the two electrical engines 176, 177 and EPUs (labelled as 5 and 8 in FIG. 1B), which were initially powered by the fourth battery 104, when the fourth battery 104 fails. In some embodiments, the second HV cross-linking bus 132 may allow for the fourth battery 104 to act as a backup battery for the third battery 103, thereby providing power to the two electrical engines 174, 175 and EPUs (labelled as 2 and 11 in FIG. 1B), which were initially powered by the third battery 103, when the third battery 103 fails. In some embodiments, in the event of a failure of either the third battery 103 or the fourth battery 104 of the second paired battery pack unit 162, the failing battery may be disconnected from the other working battery of the second paired battery pack unit 162. In some embodiments, the disconnecting may be performed via a pyro-technical fuse 190 located near an output of each one of the batteries 101-106 and thus along the HV connection between the third and fourth batteries 103, 104 of the second paired battery pack unit 162. In some embodiments, each battery 103, 104 of the second paired battery pack unit 162 may be electrically separable, e.g., via charge fuses 144, 146, from the remainder of the paired battery pack unit 162 and any other paired battery pack unit 160, 164 such that, e.g., failures may be isolated events that do not propagate along any connected HV channels.

Further continuing the above example, and further with reference to FIGS. 1B and 1C, a fifth battery 105 (not shown) of a third paired battery pack unit 164 may directly power two additional electrical engines 178, 179 which, in turn, power two other EPUs (labelled as 3 and 10 in FIG. 1B), and a sixth battery 106 of the third paired battery pack unit 164 may directly power two other electrical engines 180, 181 which, in turn, power two other EPUs (labelled as 6 and 7 in FIG. 1B). In some embodiments, the fifth battery 105 and the sixth battery 106 of the third paired battery pack unit 164 may be cross-linked (i.e., electrically interconnected) via a third HV cross-linking bus 134. In some embodiments, the third HV cross-linking bus 134 may allow for the fifth battery 105 to act as a backup battery for the sixth battery 106, thereby providing power to the two electrical engines 180, 181 and EPUs (labelled as 6 and 7 in FIG. 1B), which were initially powered by the sixth battery 106, when the sixth battery 106 fails. In some embodiments, the third HV cross-linking bus 134 may allow for the sixth battery 106 to act as a backup battery for the fifth battery 105, thereby providing power to the two electrical engines 178, 179 and EPUs (labelled as 3 and 10 in FIG. 1B), which were initially powered by the fifth battery 105, when the fifth battery 105 fails. In some embodiments, in the event of a failure of either the fifth battery 105 or the sixth battery 106 of the third paired battery pack unit 164, the failing battery may be disconnected from the other working battery of the third paired battery pack unit 164. In some embodiments, the disconnecting may be performed via a pyro-technical fuse 190 located near an output of each one of the batteries 101-106 and thus along the HV connection between the fifth and sixth batteries 105, 106 of the third paired battery pack unit 164. In some embodiments, each battery 105, 106 of the third paired battery pack unit 164 may be electrically separable, e.g., via charge fuses 148, 150, from the remainder of the paired battery pack unit 164 and any other paired battery pack unit 160, 162 such that, e.g., failures may be isolated events that do not propagate along any connected HV channels.

Continuing with reference to FIG. 1B, in some embodiments, as a result of the above example configuration, the three paired battery pack units (i.e., the first, second, and third paired battery pack units) 160, 162, 164 may allow for an optimization of the power available to operate the twelve electrical engines (labelled as 1-12 in FIG. 1B) by configuring each paired battery pack unit 160, 162, 164 to provide power to particular ones of the twelve electrical engines. As an example, in some embodiments, each one of the three paired battery pack units 160, 162, 164 may be configured such that each set of paired batteries may power any four of twelve electrical engines, e.g., one of the front outboard electrical engines, one of the rear inboard electrical engines, one of the front inboard electrical engines, and one of the rear outboard electrical engines. As another example, in some embodiments, each battery pack unit 160, 162, 164 may be configured that that each set of paired batteries may power any combination of four forward and/or aft electrical engines and/or EPUs. Appendix 1 provides additional information on aspects of a high voltage power supply (HVPS) system.

In some embodiments, as a result of the above example design, particularly the capability of one battery of each paired battery pack to act as a backup battery for a failing battery of that paired battery pack, the backup battery may power four electrical engines simultaneously (i.e., the backup battery may provide power to two electrical engines which are directly electrically connected to the working battery, and also to two electrical engines via an HV cross-linking bus connecting the set of paired batteries of a paired battery pack unit). In some embodiments, the backup battery may provide power to four electrical engines simultaneously but at a slightly lower power level which remains sufficient for proper flight control. As a result of such an exemplary design, all electrical engines continue to receive power, and in turn, all motors and propellers continue to operate even with a first failing battery within any or all of the first, second, and third paired battery pack units. As a further result of such an exemplary design, generally about 20% less battery power may be required, as compared to an independent or common bus structure, to achieve the same result (e.g., to achieve sufficient energy to controllably fly a design mission, and to achieve sufficient thrust to safely perform a hover landing). In some embodiments, as a further result of such an exemplary design and a lowering of the power requirement by about 20%, an increase in energy efficiency may also be achieved due to, e.g., a capability to provide power for a longer period of time, an increase in a range of an aircraft, and a reduction in weight of the aircraft based on the capability to utilize lower power batteries.

It is understood that, in some embodiments, a battery pack unit may comprise one battery which powers any two electrical engines and EPUs, wherein an aircraft may comprise six battery pack units. As another example, in some embodiments, a battery pack unit may comprise three connected batteries, wherein each of the three batteries may directly power any two electrical engines and EPUs, and wherein each battery pack unit comprising three connected batteries may power a total of any six electrical engines and EPUs of the aircraft. As yet another example, in some embodiments, a battery pack unit may comprise four connected batteries, wherein each of the four batteries may directly power any two electrical engines and EPUs, and wherein each battery pack unit comprising four batteries may power a total of any eight electrical engines and EPUs of the aircraft. It is understood that any number of electrical engines and EPUs may refer to electrical engines and EPUs which are located on opposite sides of the aircraft, forward of the aircraft, and/or aft of the aircraft. It is further understood that, in some embodiments, any combination of different sized battery pack units may be utilized to power twelve electrical engines and EPUs. Yet further, it is also understood that any combination of different sized battery pack units may be utilized to power any number of electrical engines and EPUs of an aircraft without limitation to a total number of electrical engines and EPUs.

Figure 2:
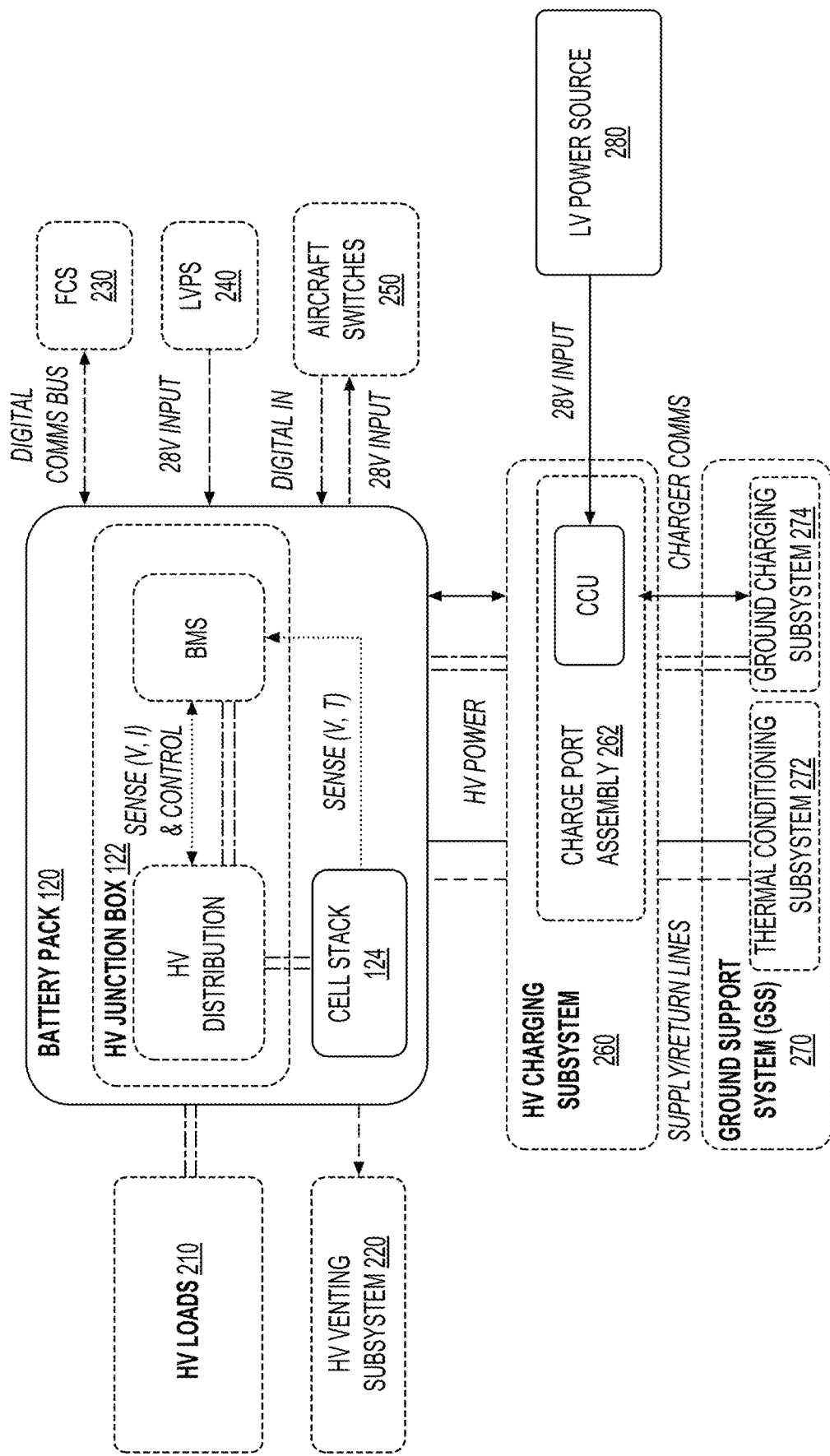
FIG. 2 is a block diagram illustrating a battery pack, consistent with some embodiments of the present disclosure

Reference is made to FIG. 2. FIG. 2 is a block diagram illustrating a battery pack 120, consistent with some embodiments of the present disclosure. As shown in FIG. 2, the battery pack 120 may be electrically and communicatively connected with HV loads 210, an HV venting subsystem 220, the FCS 230, a low voltage power supply (LVPS) system 240, aircraft switches 250, an HV charging subsystem 260, a ground support system (GSS) 270, and an LV power source 280.

In the embodiments of FIG. 2, the battery pack 120 includes an HV Junction Box (HVJB) 122 and a cell stack assembly 124. Each battery pack 120 contains an HV distribution unit and a Battery Management System (BMS) housed within the HVJB 122. Specifically, the BMS may be configured to monitor voltages, temperatures, currents, and isolation resistances and control pack contactors and pyro fuses to protect against fault conditions for safe operation. The BMU may also run algorithms to determine the state of the pack (e.g., a state of charge, a state of health, etc.). The BMS may receive voltage and temperature sensing signals from the cell stack assembly 124 and the HV distribution unit, and control the HV distribution unit accordingly. The HV loads 210 receiving the HV power may include electric engines (e.g., two corresponding electric engines 110 connected to the battery pack 120 shown in FIG. 1A), a Tilt Actuator, DC/DC converters, the ECS, or the Cross-Link used to connect pack pairs.

The battery pack 120 may be connected to the FCS 230 through a digital communication bus. The battery pack 120 may receive a low voltage input voltage (e.g., a 28V input) from the LVPS system 240. The battery pack 120 may receive digital input signal(s) from the aircraft switches 250 and provide a supply voltage (e.g., a 28V input) to the aircraft switches 250. HV power can be transmitted between the GSS 270 and the battery pack 120 through the HV charging subsystem 260. In some embodiments, the HV charging subsystem 260 includes a charge port assembly 262 having a Control MCU (CCU) connected to the LV power source 280 for providing the supply voltage (e.g., a 28V input) to the HV charging subsystem 260. In some embodiments, the GSS 270 may include a Thermal Conditioning Subsystem 272 and a Ground Charging Subsystem 274 electrically and communicatively connected with the charge port assembly 262.

Figure 3:
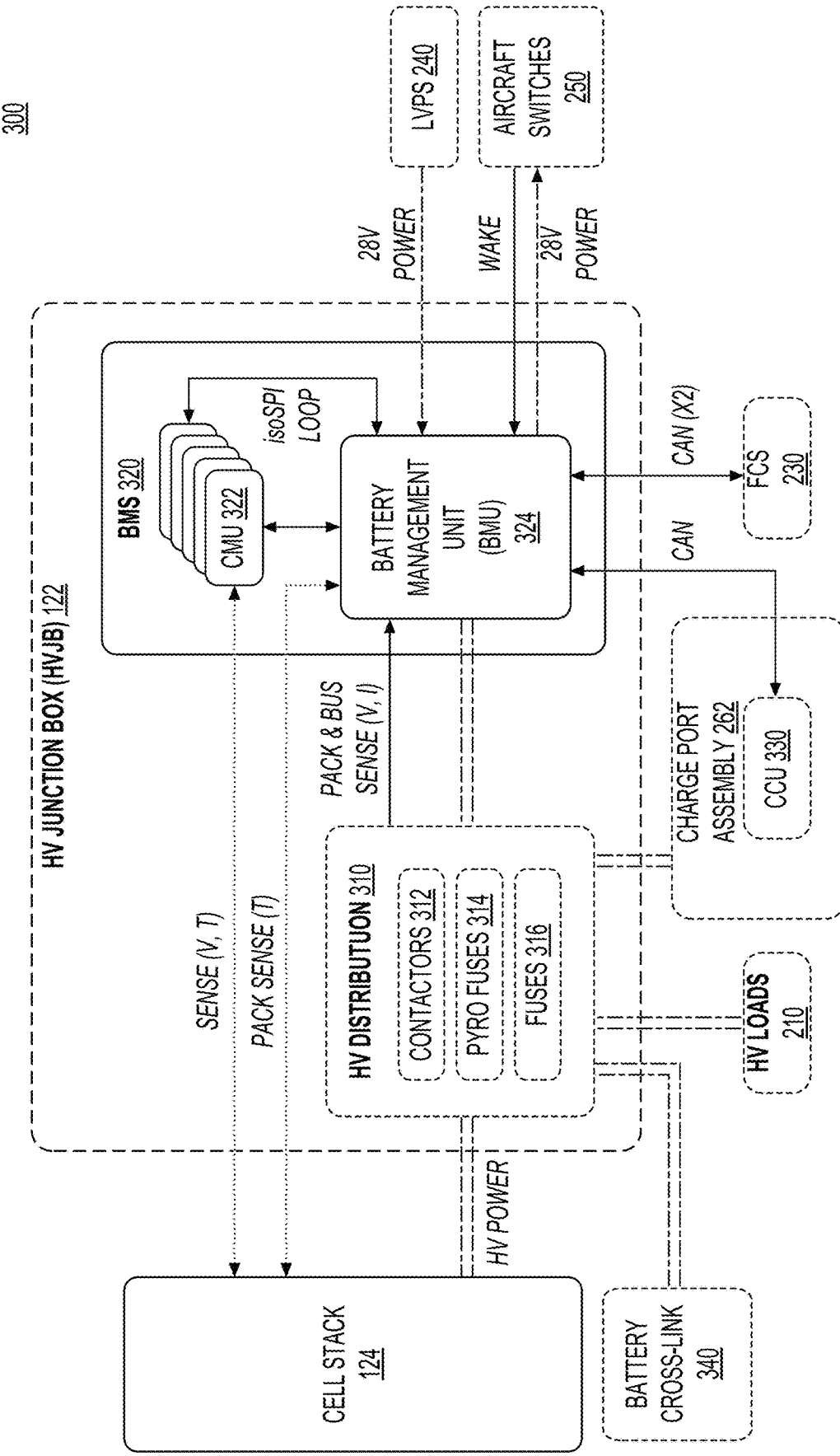
FIG. 3 is a block diagram illustrating aspects of an HV Junction Box (HVJB), consistent with some embodiments of the present disclosure.

Reference is made to FIG. 3. FIG. 3 is a more detailed block diagram 300 illustrating units in the HVJB 122, consistent with some embodiments of the present disclosure. As shown in FIG. 3, in some embodiments, the HV distribution unit 310 in the HVJB 122 may contain HV contactors 312 and a combination of active and passive fuses (e.g., pyro fuses 314 and fuses 316) to protect against overcurrent and short-circuit conditions.

The BMS 320 in the HVJB 122 may include Cell Management Units (CMUs) 322 to monitor the voltages of each set of 7 parallel cells (i.e., a 1S-7P cell group) connected in series in a 14S-7P cell block. The CMU may also be used to monitor a 14S-7P cell block's temperature. The CMUs 322 obtain measurements for all the cell groups in the battery pack 120, communicating the measurements to the Battery Management Unit (BMU) 324 via isoSPI in a daisy-chain configuration. In some embodiments, the CMU 322 does not have an active management or control mechanism for cells within the cell block, but the CMU 322 is able to perform passive cell balancing of the series cell blocks when commanded by the BMU 324. The BMU system architecture may provide the flexibility to command passive balancing both on the ground and in the air.

The BMU Printed Circuit Board Assembly (PCBA) may be configured to monitor voltages, currents, and temperatures from the CMUs 322 in addition to the output current for each of the connected loads. The BMU 324 may be internally powered by the battery cell stack assembly 124 and continuously monitor the state of the battery even when it is not installed in the aircraft 100. By monitoring the battery pack 120, cell block, and cell group parameters, the BMU is enabled to protect against conditions that adversely affect safety or performance, such as overvoltage, undervoltage, overtemperature, under-temperature, loss of electrical isolation, short circuit, overcurrent, etc.

The diagnostic function of the BMU 324 allows for fault detection and isolation through built-in-tests (BIT). Fault indications and overall usage are logged in Non-Volatile Memory (NVM) for data retention and prognostics. In addition, the BMU 324 performs computation of the State of Charge (SOC), State of Health (SOH), State of Power (SOP), State of Energy (SOE) and State of Temperature (SOT) of the battery pack 120. The BMU 324 also controls and monitors bus pre-charging and provides contactor commands. In some embodiments, the BMU 324 may use two microcontrollers to perform the state computation and contactor and fuse control functions so that a subset of BMU 324 functions are retained upon failure of a single microcontroller.

The CCU 330 in the charge port assembly 262 may interface with the external battery charger and communicate with the BMUs 324 on the six installed battery packs 120. In some embodiments, the CCU 330 may be a single PCBA with one microcontroller that manages overall power delivery to each battery pack 120 when charging. As shown in FIG. 2, the CCU 330 may perform the handshake between the Ground Charging Subsystem 274 and the BMUs 324, requests the BMUs 324 to open or close contactors 312, and provides active detection and protection features for overvoltage protection. In some embodiments, the CCU 330 is external to the battery packs 120. The BMUs 324 in each battery pack 120 retain full control and continuously monitor their battery packs 120 during charging operations.

Figure 4:
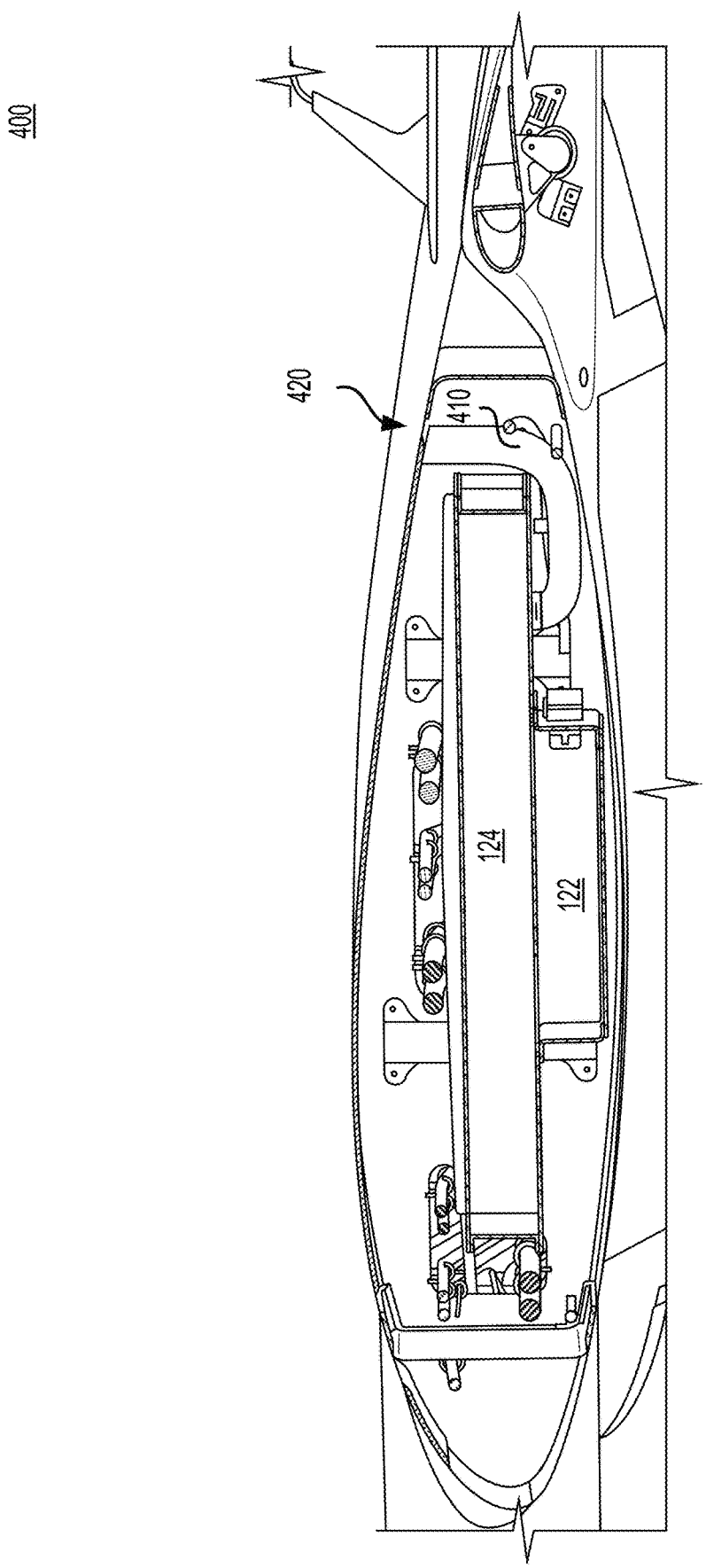
FIG. 4 is a cross-section view of a wing of an aircraft with a battery pack installed in the wing, consistent with some embodiments of the present disclosure.
Figure 5A:
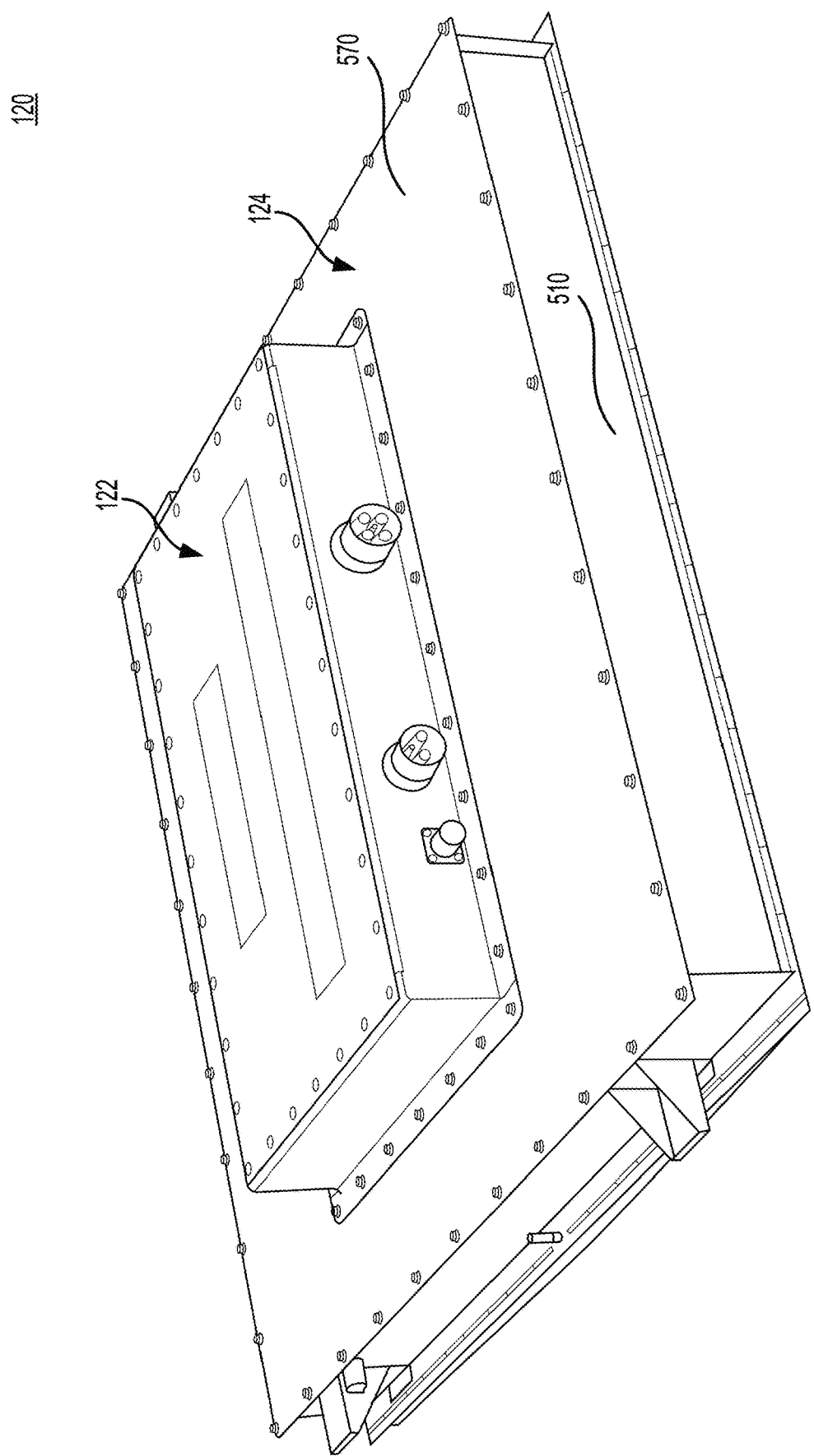
FIG. 5A is a diagram illustrating an overview of a battery pack, consistent with some embodiments of the present disclosure.
Figure 5B:
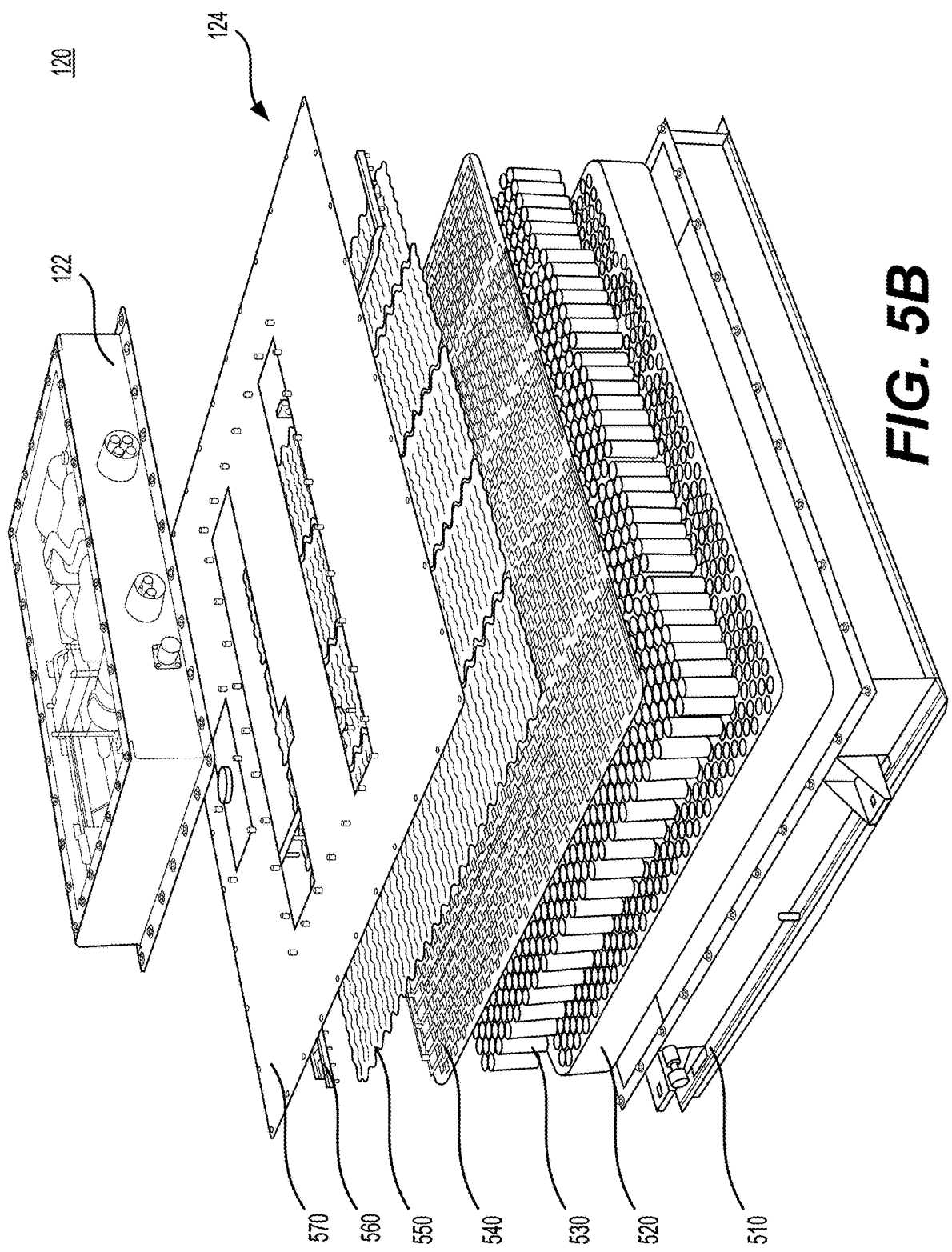
FIG. 5B is a diagram illustrating components and units within a battery pack, consistent with some embodiments of the present disclosure.

Reference is made to FIG. 4 and FIGS. 5A and 5B. FIG. 4 is a cross section view of a wing 400 of the aircraft 100 of FIG. 1A with the battery pack 120 of the battery pack 120 installed in the wing, consistent with some embodiments of the present disclosure. In some embodiment, the battery pack 120 can be removed from service once it has reached a state of health where the battery pack 120 no longer meets the minimum energy and power requirements for the operation. As shown in FIG. 4, in some embodiments, an elbow duct 410 is connected to a vent outlet 420 to exhaust battery emissions upwards. The HVJB 122 of the battery pack 120 is mounted to the battery pack enclosure of the cell stack assembly 124.

FIG. 5A is a diagram illustrating an overview of the battery pack 120, consistent with some embodiments of the present disclosure. FIG. 5B is a diagram illustrating components and units within the battery pack 120 of FIG. 5A, consistent with some embodiments of the present disclosure. In FIGS. 5A and 5B, the battery pack 120 is shown upside down relative to the installed orientation as shown in FIG. 4. As shown in FIGS. 5A and 5B, the battery pack 120 includes the HVJB 122 and the cell stack assembly 124. The cell stack assembly 124 includes an enclosure 510 with a heat exchanger (e.g., a heat exchanger plate), a cell holder 520 including an interstitial foam, a plurality of battery cells 530 (e.g., 1456 cells in each battery pack 120), a current collector 540, a vent flap assembly 550, pack bus bars 560, and a pack lid 570. As shown in FIG. 5A, the HVJB 122 may be mounted to the pack lid 570 using fasteners. Details of the cell stack assembly 124 will be discussed in the following paragraphs with the accompanying drawings.

In some embodiments, battery cells 530 in the battery pack 120 may be Lithium-Ion cells, but the present disclosure is not limited thereto. For example, the battery cells 530 may be 4.5 Ah capacity cells with a 2170 cylindrical form factor. The battery cells 530 can be operated at a voltage range between around 2.5V and around 4.18 V, and each cell has a BOL capacity of 4.5 Ah. In some embodiments, each battery cell 530 contains a Current Interrupt Device (CID) which permanently places the battery cell 530 in an open circuit condition in the event of internal pressure build-up.

Figure 6:
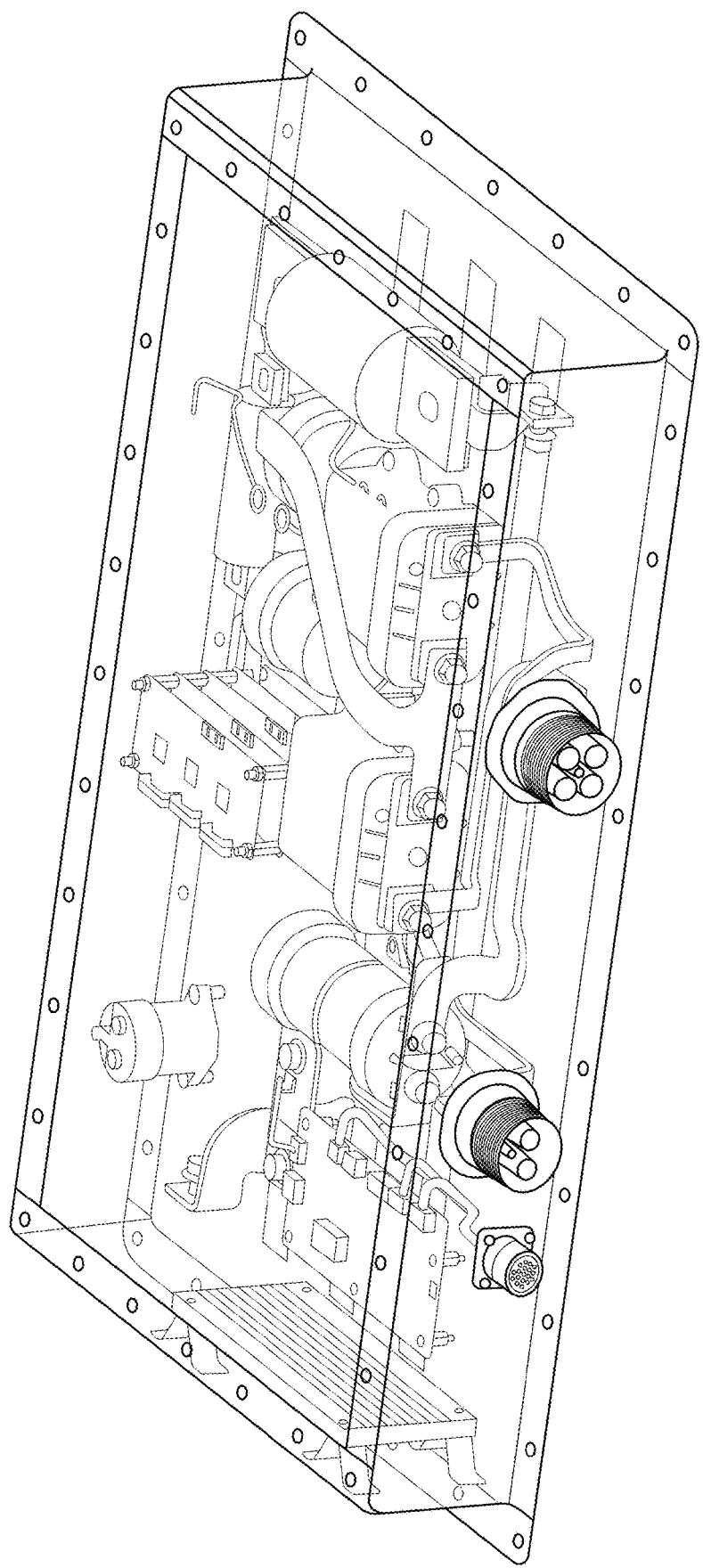
FIG. 6 is a diagram illustrating an exemplary HVJB, consistent with some embodiments of the present disclosure.

FIG. 6 is a diagram illustrating an exemplary HVJB 122, consistent with some embodiments of the present disclosure. As discussed above, the HVJB 122 may be configured to distribute high voltage stored electric energy for propulsion and other system needs, and the HVJB 122 may contain pre-charge resistors and relays, HV bus bars, shunt resistors, HV contactors, connectors, a combination of active and passive fuses to protect against overcurrent and short-circuit conditions, and as determined to be necessary, components to disable high-voltage output in emergency conditions. The components within the HVJB 122 may be enclosed along with the BMU PCBA and mounted to the battery pack enclosure using fasteners.

Figure 7A:
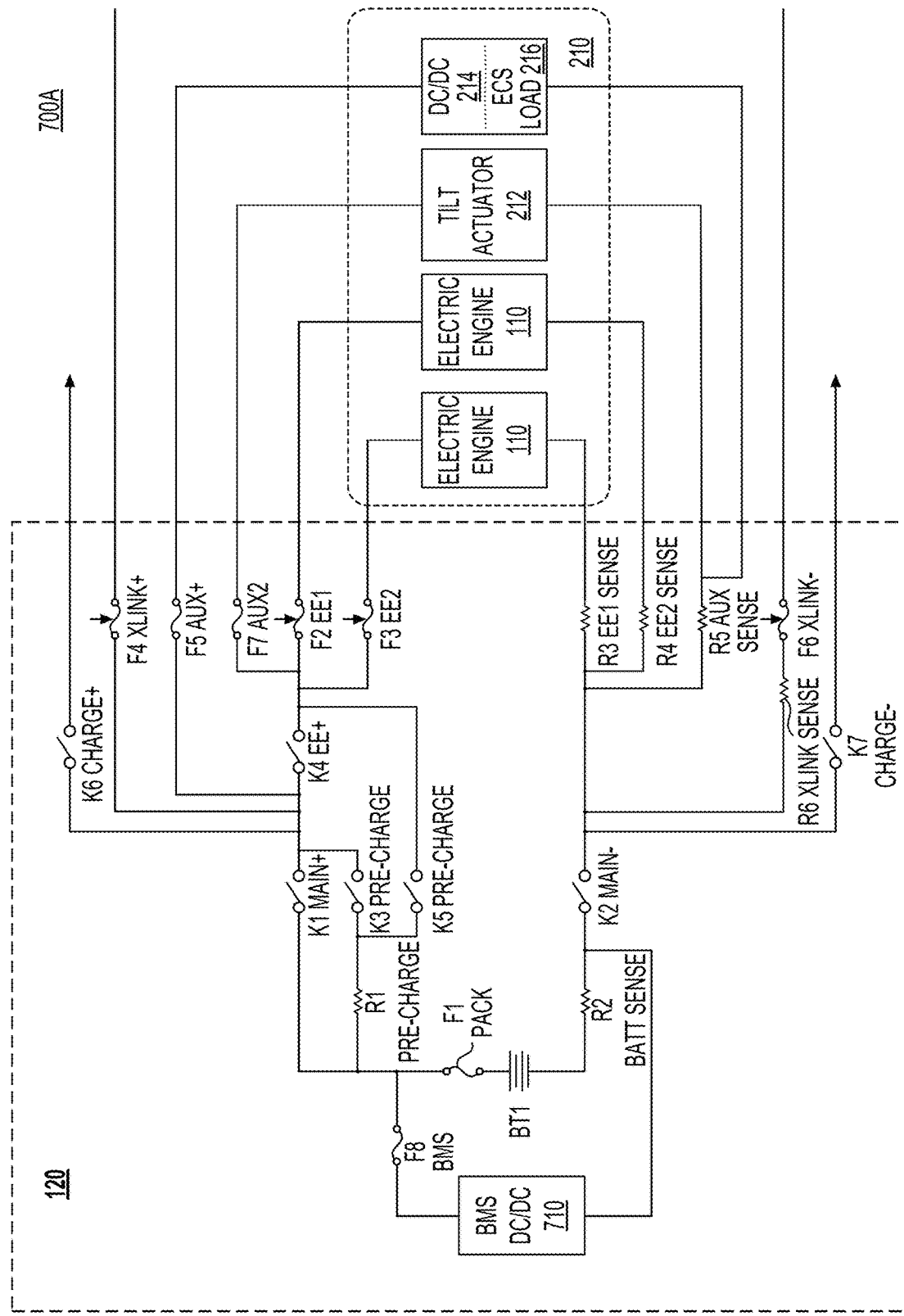
FIG. 7A illustrates an exemplary circuit diagram of an HVJB, consistent with some embodiments of the present disclosure.

FIG. 7A illustrates an exemplary circuit diagram 700A of the HVJB 122, consistent with some embodiments of the present disclosure. As explained above, the HVJB 122 may be electrically connected to the HV loads 210 to provide HV power. Specifically, the DC/DC converter 710 in the BMS 320 and the power storage element BT1 (e.g., the battery cells 530 connected in parallel and in series) can be used to provide the HV power.

As shown in FIG. 7A, the DC/DC converter 710 and the power storage element BT1 are connected to each of the HV loads 210 through pre-charge resistor(s) (e.g., resistor R1) or current sensing resistor(s) (e.g., resistors R2-R6), switching devices K1-K7 (e.g., HV contactors), and a combination of active and passive fuses (e.g., pyro fuses F2, F3, F4 and F6 and fuses F1, F5, F7, and F8) to protect against various failure conditions (e.g., overcurrent, short-circuit, etc.). The active and passive fuses may be arranged in the HV battery pack 120 to safely cut power from the HV battery pack 120 in the event of a short circuit at the load side. The HV loads 210 may include two corresponding electric engines 110, a Tilt Actuator 212, DC/DC converters 214 (e.g., 2.8 kW DC/DC converters), and the ECS load 216.

For example, pyro fuses F2, F3, F4 and F6 may be a type of fuse configured to be activated by an external source when the circuit disconnection and isolation is required. The BMS 320 is used to activate the pyro fuses F2, F3, F4 and/or F6 when a short event occurs. In some embodiments, the BMS 320 in the HVJB 122 can send command signals to the corresponding pyro fuse driver to activate the pyro fuse when the failure occurs, so as to protect against overcurrent and electrically isolate the entire battery pack 120 from the connected loads. In some embodiments, the HVJB 122 may further provide a redundant active trigger configured to enable the pyro fuse driver to activate one or more pyro fuses when the BMS 320 fails to enable the pyro fuse driver, which will be discussed below with accompanying drawings.

Figure 7B:
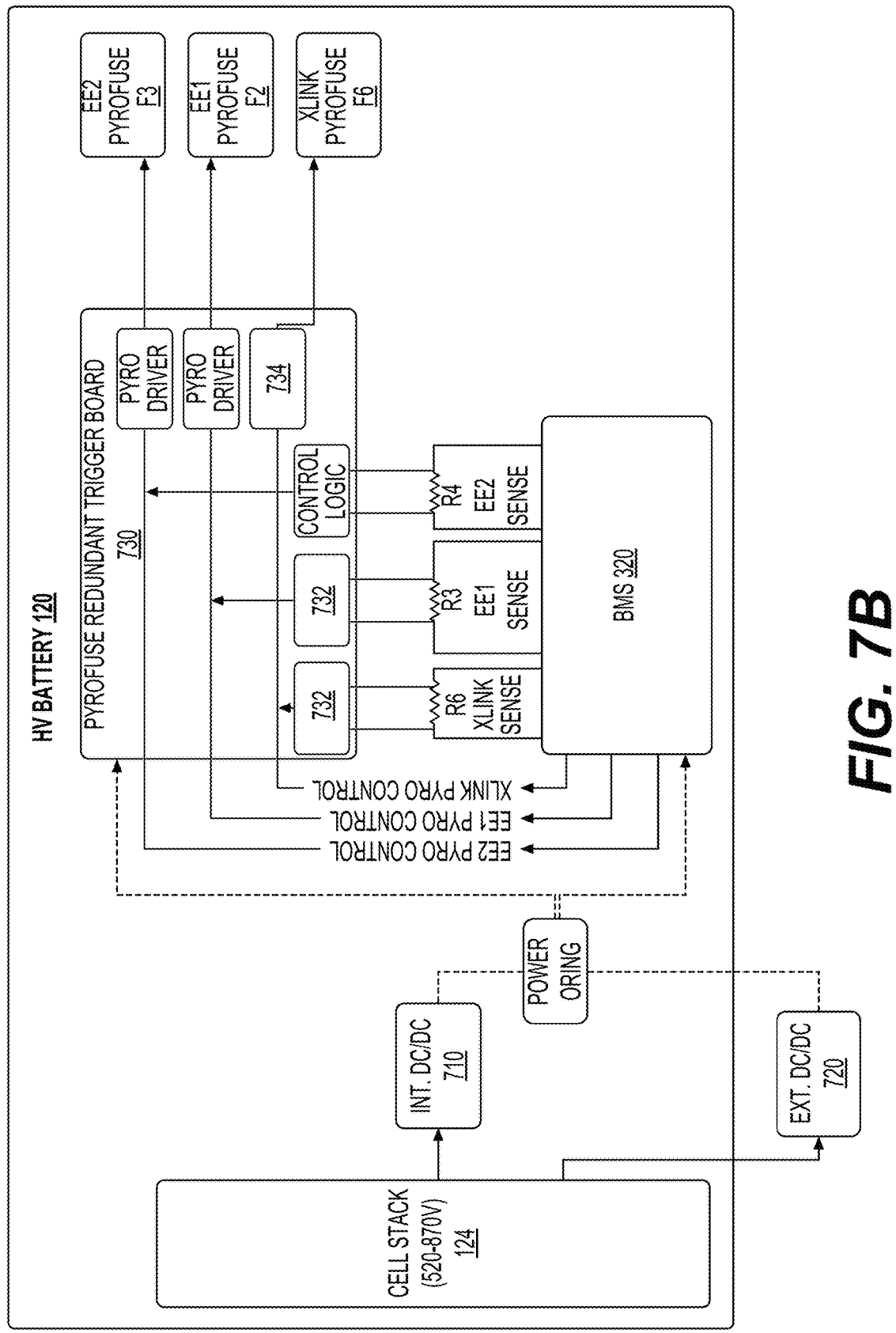
FIG. 7B is an exemplary block diagram illustrating the activation of pyro fuses, consistent with some embodiments of the present disclosure.

FIG. 7B is an exemplary block diagram 700B illustrating the activation of pyro fuses, consistent with some embodiments of the present disclosure. As shown in FIG. 7B, in some embodiments, the voltage output from the battery cell stack assembly 124 may be HV (e.g., 520V-870V). This voltage can be converted by an internal DC-DC converter 710 within the battery pack 120 to supply power for the BMS 320 and a pyro-fuse redundant trigger (PRT) board 730 arranged in the HVJB 122. The PRT board 730 may include various analog components to form multiple control logic circuits 732 to provide redundant active triggers for corresponding pyro fuses (e.g., pyro fuses F2, F3, and F6). In some embodiments, the battery cell stack assembly 124 may also be electrically connected to an external DC-DC converter 720 arranged outside of the battery pack 120. The external DC-DC converter 720 may also be configured to convert the voltage output from the battery cell stack assembly 124 to provide the supply voltage for the BMS 320 and the PRT board 730. In other words, in the embodiments shown in FIG. 7B, a redundant power supply system including the internal DC-DC converter 710 and the external DC-DC converter 720 may ensure the power supply and improve the system stability. When the main power converter (which may be either the internal DC-DC converter 710 or the external DC-DC converter 720) fails, the system can switch to the back-up power converter to supply power to other devices and units in the battery pack 120 to ensure the system operates properly.

As shown in FIG. 7B, multiple pyro fuse drivers 734 configured to activate the corresponding pyro fuses (e.g., pyro fuses F2, F3, and F6) may be located on the PRT board 730, but the present discourse is not limited thereto. In other embodiments, pyro fuse drivers 734 may also be located on another circuit board separately. When the BMS 320 detects an overcurrent failure based on signals sensed by the corresponding current sensing resistor (e.g., resistor R3, resistor R4, or resistor R6), the BMS 320 may output a corresponding pyro-fuse control command signal (e.g., EE1 PYRO CONTROL for the pyro-fuse driver associated with the power line to the first electrical engine, EE2 PYRO CONTROL for the pyro-fuse driver associated with the power line to the second electrical engine, or XLINK PYRO CONTROL for the pyro-fuse driver associated with the power line to the cross-link used to connect pack pairs). Accordingly, the corresponding pyro fuse driver 734, after receiving the pyro-fuse control command signal, may activate the corresponding pyro fuse to electrically isolate the battery pack 120 from the load.

In some embodiments, when the BMS 320 is not functioning and fails to output the pyro-fuse control command signal when the fault occurs, the pyro fuse does not blow and disconnect the power path. In such event, the control logic circuit 732 configured with a different threshold value for triggering the pyro fuse may function as a redundant trigger and output the corresponding command signal to the pyro fuse driver 734 to activate the corresponding pyro fuse. Accordingly, the PRT board 730 is fully independent of the BMS 320 and designed to trigger the pyro fuse to blow based on analog circuitry. By the redundant trigger sources, higher safety levels in the HV battery pack 120 can be achieved.

As shown in FIG. 7B, in some embodiments, both the BMS 320 and the control logic circuits 732 in the PRT board 730 may use the same current sensor (e.g., sensing resistors R3, resistor R4, and resistor R6) to detect the short condition. The BMS 320 may be the primary source sending the activation signal for the pyro fuse, and the PRT board 730 may serve to confirm the safety event and take action only if the BMS 320 fails to activate the pyro fuse.

Accordingly, the embodiments of FIG. 7A and FIG. 7B provide an apparatus for redundant control of active fuses for battery pack safety, which includes a battery (e.g., the power storage element BT1), an electrical load (e.g., HV loads 210), a sensor (e.g., resistors R2-R6), a digital circuit (e.g., the BMS 320), and an analog circuit (e.g., control logic circuits 732). The analog circuit may be housed on a board separate from the digital circuit. In some embodiments, the battery may be a high-voltage battery and configured to be installed in an aircraft (e.g., an electric aircraft, a vertical takeoff-and-landing aircraft, an electric vertical takeoff-and-landing aircraft, etc.), and the electrical load is a system installed in the aircraft. The sensor may be a current sensor.

The electrical load is coupled to the battery via a fuse (e.g., pyro fuses F2, F3, and F6). The fuse may be configured to disconnect the electrical load from the battery after being activated by an electrical signal. The sensor may be configured to sense a short circuit condition at the electrical load. The digital circuit may be configured to receive a signal from the sensor, to detect the short circuit condition at the electrical load, and, during normal operation, to output a first electrical signal to activate the fuse after detecting the short circuit condition at the electrical load. The analog circuit may be configured to receive the signal from the sensor and output a second electrical signal to activate the fuse after receiving the signal from the sensor.

As discussed above, the analog circuit may be configured to output the second electrical signal to activate the fuse after receiving the signal from the sensor if the digital circuit does not output the first electrical signal to activate the fuse. For example, the digital circuit can be configured to, during normal operation, output the first electrical signal to activate the fuse if the signal that it receives from the sensor is above a first threshold value. The analog circuit may be configured to output the second electrical signal to activate the fuse if the signal that it receives from the sensor is above a second threshold value, which is above the first threshold value. In some embodiments, the apparatus includes a memory configured to store the first threshold value, and the memory may be configured to be updated. The first threshold value stored in the memory may be variable and configurable based on an operating temperature.

As shown in the embodiments of FIG. 7B, the apparatus for redundant control of active fuses for battery pack safety may further include a first power supply system (e.g., internal DC-DC converter 710) and a second power supply system (e.g., external DC-DC converter 720). The first power supply system may be configured, during normal operation, to supply electrical power to the digital circuit and the analog circuit. The second power supply system is also configured to supply electrical power to the digital circuit and the analog circuit. Specifically, the second power supply system may be configured to supply electrical power to the digital circuit or the analog circuit if the first power supply system does not supply electrical power to the digital circuit or the analog circuit. As shown in FIG. 7B, the first power supply system and the second power supply system may both receive electrical power from the battery.

Figure 8A:
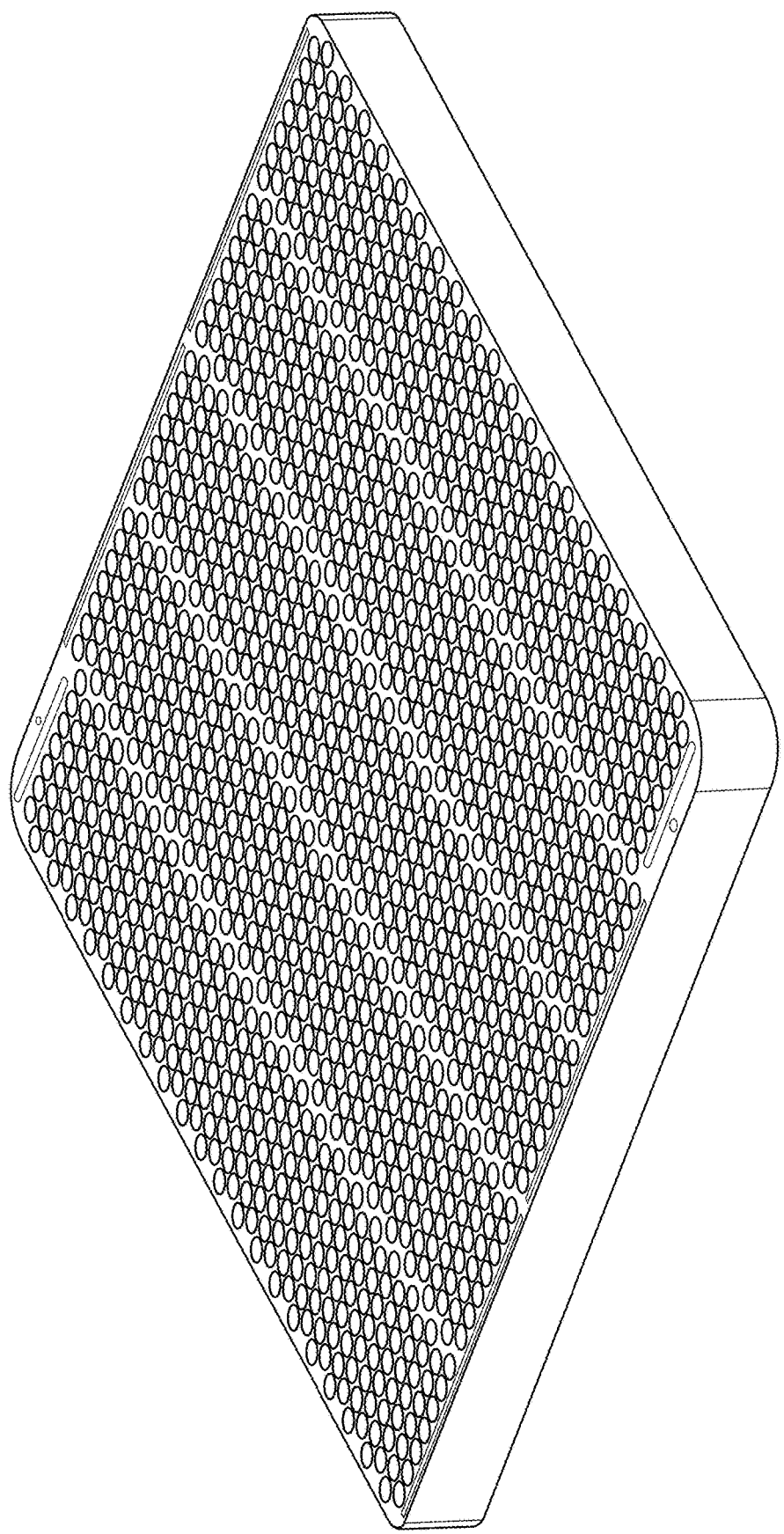
FIG. 8A is a diagram illustrating an exemplary architecture of a foam cell holder, consistent with some embodiments of the present disclosure.

Reference is made to FIG. 8A. FIG. 8A is a diagram illustrating an exemplary architecture of the foam cell holder 520 for organizing battery cells, consistent with some embodiments of the present disclosure. In some embodiments, the cell holder 520 may be a machined foam with a FR4 top sheet and embedded busbars. In some embodiments, the cell holder 520 may be a precisely manufactured, rigid, flame-retardant, closed-cell polyurethane foam structure. The polyurethane foam is a flame-retardant and thermally insulating material. When selecting the materials for the foam cell holder 520, various properties are taken into account, including, for example, mechanical stiffness (e.g., modulus of elasticity, yield strength, etc.), minimized thermal conductivity, amenability to adhesive bonding, high dielectric constant, high resistance to dielectric breakdown, low density (or low weight), and/or mass manufacturing capability (e.g., the ability to cast into complex shapes while minimizing waste materials). For example, various structural foams may meet the standard in the aerospace industry. The cell holder 520 may be resistant to water absorption and fungal growth and may be self-extinguishing and flame resistant. The closed cell structure of the cell holder 520 acts as an insulator and gas barrier to minimize conduction and convection between battery cells 530. Accordingly, the foam cell holder 520 locates the battery cells 530 and isolates the battery cells 530 from neighboring cells to protect the battery cells 530 from thermal runaway conditions. The cell holder 520 may also contain nested busbars for connecting sections of the battery pack 120.

In some embodiments, a casting process can be applied to form the cell holder 520, creating a durable, lightweight structure that is desired for use in the battery pack 120.

Figure 8B:
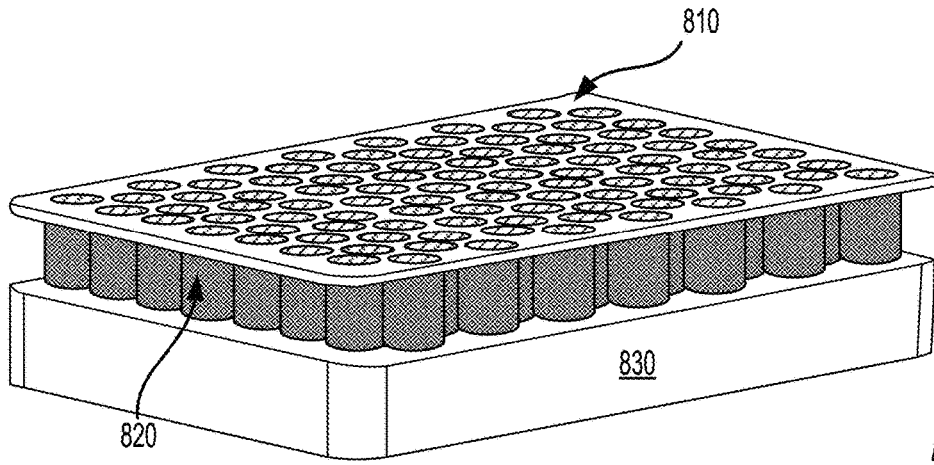
FIG. 8B is a diagram illustrating an exemplary casting process for manufacturing the foam cell holder of FIG. 8A for organizing battery cells, consistent with some embodiments of the present disclosure.

Reference is made to FIG. 8B. FIG. 8B is a diagram illustrating an exemplary casting process for manufacturing the foam cell holder 520 of FIG. 8A for organizing battery cells, consistent with some embodiments of the present disclosure. The process of making the foam cell holder 520 may involve several steps. A top sheet 810 is provided and configured to locate multiple cylinder-shape sleeves 820 prior to casting foam material 830 around the sleeves 820. In some embodiments, the foam material 830 may also include a phase change material, which may absorb significant heat when the phase changes (e.g., changing from solid to liquid). For example, the phase change material may be magnesium sulfate heptahydrate (MgSO4·7H2O), also known as epsom salt or epsomite. In some embodiments, the top sheet 810 can be made of a composite material, such as a fiberglass composite material. For example, the top sheet 810 may be an FR4 layer, but the present disclosure is not limited thereto. In some other embodiments, the top sheet 810 may also be an FR5 layer, or a PBT layer. The fiberglass composite top sheet 810 serves as a guide and ensures that the sleeves 820 are positioned correctly before casting. In some embodiments, the sleeves 820 may be made of carbon fiber composite material. The carbon fiber sleeves 820 are used to establish qualified holes for arranging the battery cells 530, and are designed to fit around the battery cells 530, ensuring that casting process are held securely in place. By using these sleeves 820 for forming chambers in cell holder 520, there is no need for post-machining after the casting process. Accordingly, the required machining to produce the foam cell holder 520 can be reduced.

Once the top sheet 810 and the sleeves 820 are in place, the foam material 830 can be cast around the sleeves 820. As mentioned above, various properties are taken into account for the selection of the foam material 830, including, for example, mechanical stiffness, low thermal conductivity, amenability to adhesive bonding, high dielectric constant, high resistance to dielectric breakdown, low density (or low weight), and/or mass manufacturing capability. For example, the foam material 830 may form a polyurethane-based foam, also known as PU foam. In some embodiments, the PU foam can be produced by a chemical reaction between a polyol and an isocyanate. By mixing the polyol and the isocyanate components in a proper ratio and then pouring the foam material 830 around the sleeves 820 in a mold, the foam material 830 can expand and cure to form the foam cell holder 520 having a solid structure.

Figure 8C:
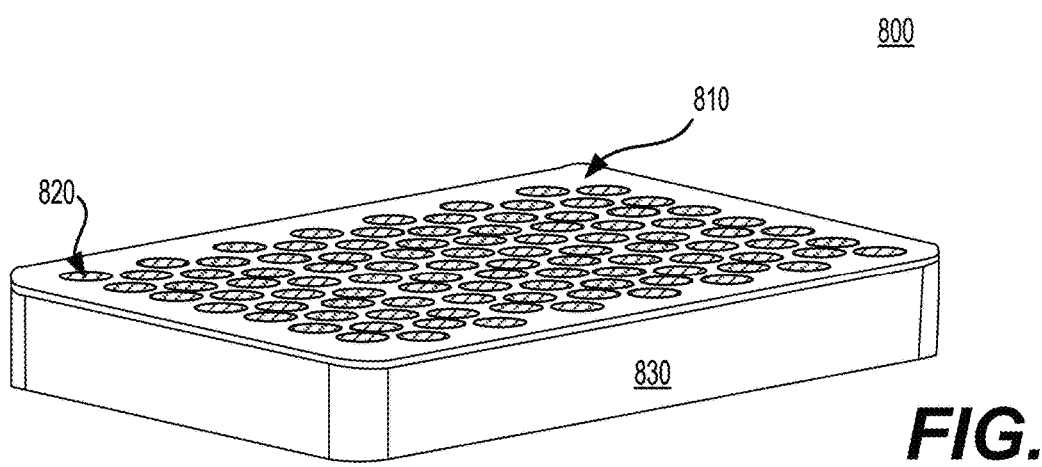
FIG. 8C is a diagram illustrating an exemplary completed structure of the foam cell holder of FIG. 8A after the casting, consistent with some embodiments of the present disclosure.

FIG. 8C is a diagram illustrating an exemplary completed structure 800 of the foam cell holder 520 of FIG. 8A after the casting, consistent with some embodiments of the present disclosure. As shown in FIG. 8C, the structure 800 may provide a low density, low thermal conductivity foam with composite shells, including a composite core stiffened by the battery cells 530 arranged in the sleeves 820. The sleeves 820 also serve as a thermal runaway barrier, providing protection in the event that any of the battery cells 530 fails. As discussed above, the materials for the top sheet 810 and the sleeves 820 can be selected from various materials. In general, the top sheet 810 and the sleeves 820 may use the same or different composite materials, which allows the flexibility in the design process, as the materials can be tailored to meet specific requirements.

Figure 8D:
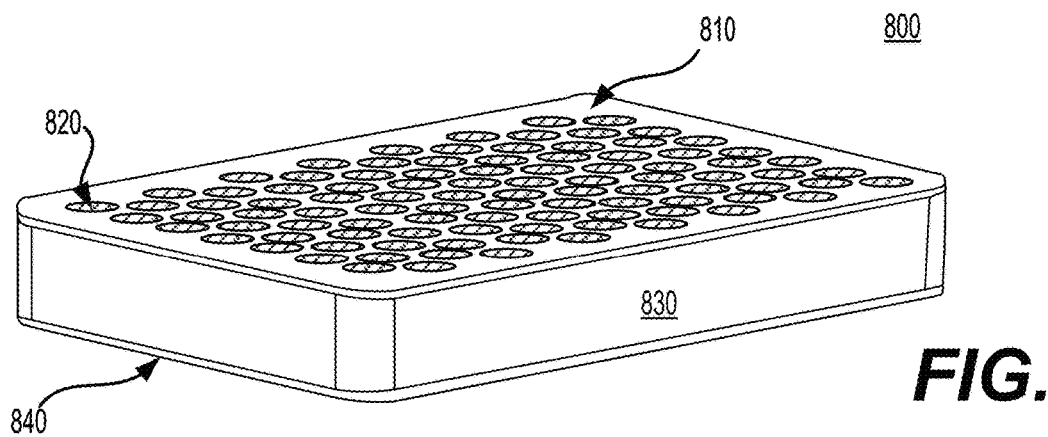
FIG. 8D is a diagram illustrating another exemplary completed structure of the foam cell holder of FIG. 8A after the casting, consistent with some embodiments of the present disclosure.

FIG. 8D is a diagram illustrating another exemplary completed structure 800 of the foam cell holder 520 of FIG. 8A after the casting, consistent with some embodiments of the present disclosure. As shown in FIG. 8D, in some embodiments, the structure 800 may further include a bottom sheet 840 attached to the bottom surface of the foam structure of the foam material 830. For example, the bottom sheet 840 may be an FR4 layer, but the present disclosure is not limited thereto. In some other embodiments, the bottom sheet 840 may also be an FR5 layer or a PBT layer. Similar to the embodiments above, the materials for the bottom sheet 840 can be selected from various materials, and the top sheet 810, the sleeves 820, and the bottom sheet 840 may use the same or different composite materials, which allows the flexibility in the design process, as the materials can be tailored to meet specific requirements. In view of the above, the casting processes shown in the embodiments of FIG. 8B-FIG. 8D offer simple, effective, and efficient methods for creating the foam cell holder 520 to provide a stiffened structure that is able to locate the battery cells 530 for the pack architecture, and minimize the required machining process.

Figure 9:
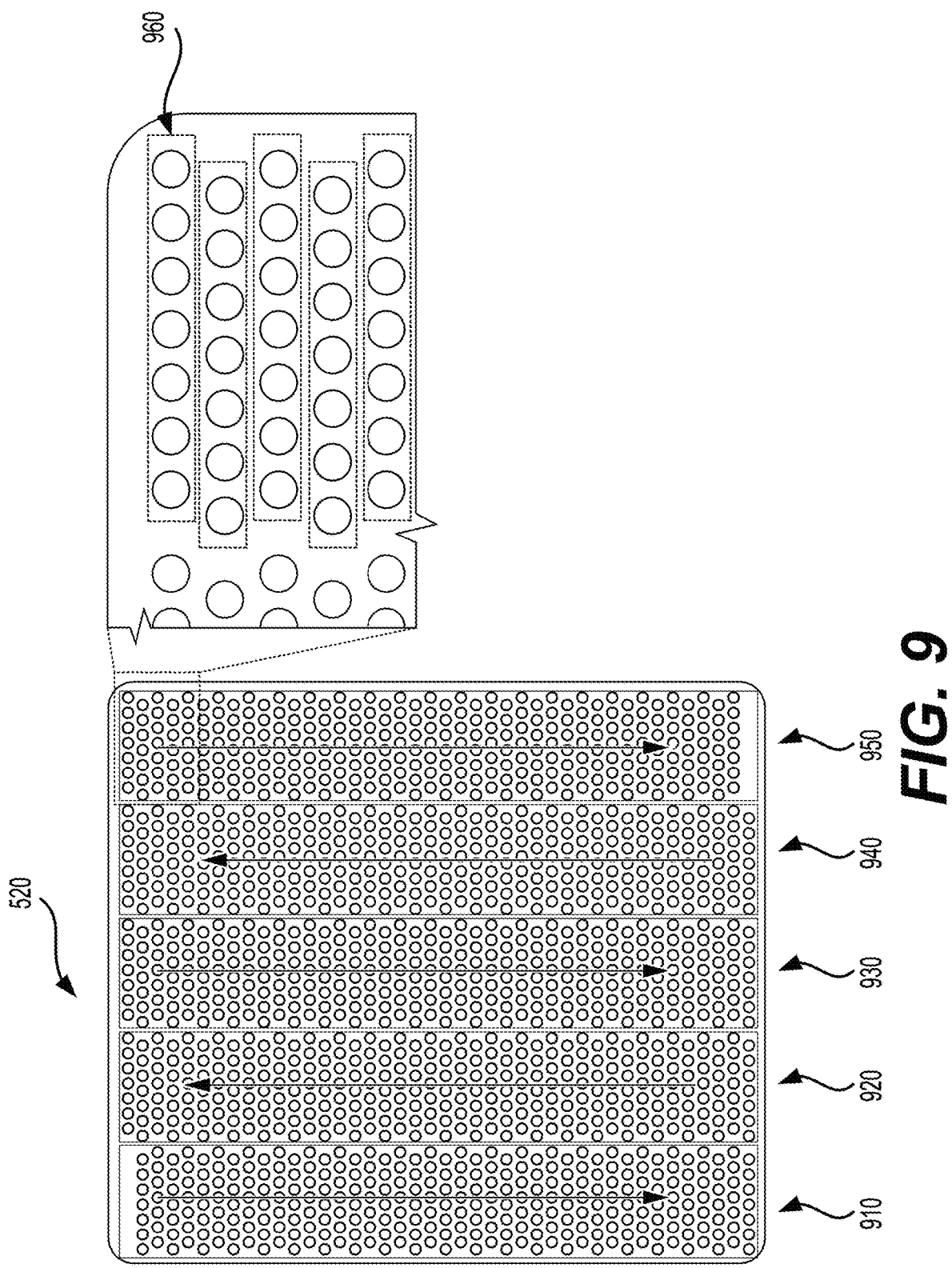
FIG. 9 is a top view of a foam cell holder, consistent with some embodiments of the present disclosure.

FIG. 9 is a top view of the foam cell holder 520, consistent with some embodiments of the present disclosure. In some embodiments, the foam cell holder 520 can be configured to house a total of 1,456 cylindrical battery cells 530. Battery cells 530 of each battery cell group are arranged into their corresponding battery cell row, and the battery cell rows are arranged into a plurality of battery columns. Each battery column is adjacent to at least another battery column. For example, in FIG. 9, the battery cells 530 may be arranged into five columns 910-950. Each of columns 920-940 contains 42 rows of 7 cells for a total of 294 cells per column. The first and last columns 910 and 950 have one less row for a total of 287 cells each. Each row of 7 parallel cells can be referred to as a cell group 960.

Specifically, the foam cell holder 520 includes a block forming a plurality of chambers. Each chamber may be configured to accommodate a battery cell 530. In some embodiments, the block may be formed before accommodating battery cells in the chambers. Accordingly, the block may be configured to organize the battery cells 530 into battery cell groups 960. As shown in FIG. 9, each battery cell group 960 includes a plurality of the battery cells 530 and each of the battery cells 530 is adjacent to at least another of the battery cells 530 in the same battery cell group 960. Each battery cell group 960 is adjacent to at least another battery cell group 960.

The block is also configured to separate each battery cell group 960 from its adjacent battery cell groups 960 using a thermally insulating material, and prevent gas from entering into each battery cell group 960 from its adjacent battery cell groups 960. For example, the block may include a material that is impermeable to gas released by the battery cells 530 and resistant to water absorption. Accordingly, each battery cell 530 is thermally insulated from adjacent battery cells 530 in the same battery cell group 960 or adjacent battery cell groups 960 by the foam, reducing conductive heat transfer and the probability of cell sidewall rupture. The block may be configured to provide a first distance between adjacent battery cells 530 in the same battery cell group 960. In various embodiments, the first distance may be less than or equal to 0.75 mm, 1.0 mm, 1.25 mm, or 1.5 mm. In addition, the block may also be configured to provide a second distance between adjacent battery cell groups 960 in the same battery column. In various embodiments, the second distance may be less than or equal to 0.75 mm, 1.0 mm, 1.25 mm, or 1.5 mm. In addition, the block may also be configured to provide a third distance between adjacent battery columns. In various embodiments, the third distance may be less than or equal to 4.0 mm, 6.0 mm, 8.0 mm, or 10.0 mm.

The battery assembly includes a plurality of electrical conductors (e.g., bus bars) attached to the block of the foam cell holder 520, in which each electrical conductor corresponds to a battery column. The block may include one or more mounting features (e.g., Pressure-Sensitive Adhesive, screws, etc.) to mount the electrical conductors on the block. In some embodiments, the electrical conductors are configured such that, in operation, an overall direction of current flow through one of the battery columns is opposite to an overall direction of current flow through its adjacent battery columns.

In some embodiments, the foam cell holder 520 contains alignment features and holes for positioning the component relative to manufacturing fixtures. For example, the block may include one or more alignment features (e.g., crosshairs, alignment marks, etc.) configured to position the electrical conductors relative to the battery columns. Channels along the edge of the foam are used as mounting locations for insulated aluminum bus bars that are bolted and welded to the current collector 540.

Figure 10A:
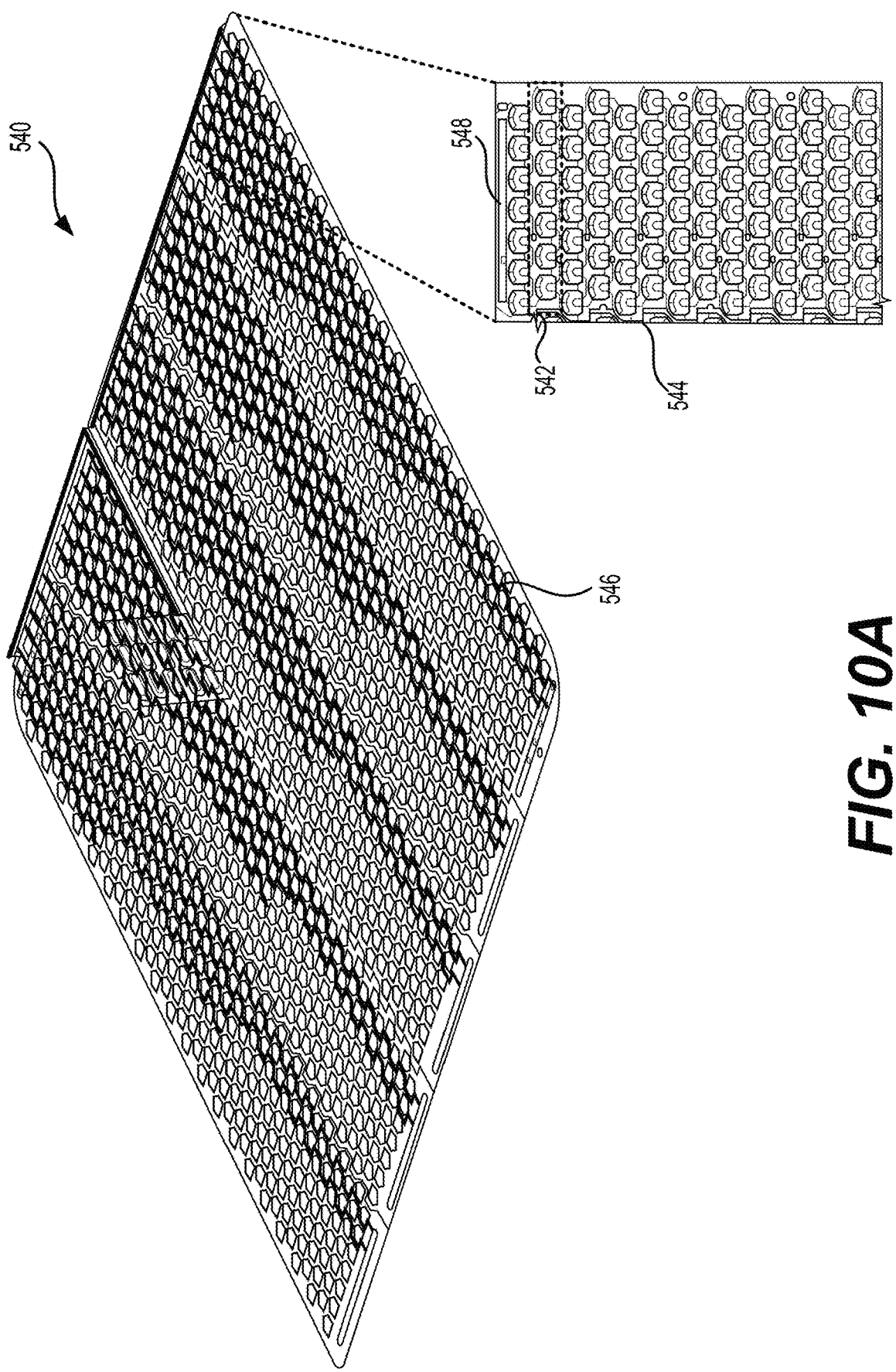
FIG. 10A is a diagram illustrating an exemplary architecture of a current collector assembly, consistent with some embodiments of the present disclosure.

FIG. 10A is a diagram illustrating an exemplary architecture of the current collector 540, consistent with some embodiments of the present disclosure. In some embodiments, the current collector 540 may be a flexible circuit current collector assembly with integrated sense components adhered and laser welded. In some embodiments, the sense components may be directly integrated into a flexible printed circuit board that is part of the current collector assembly, without the need for adhesion or welding. In some embodiments, the cell stack assembly 124 may include a plurality of current collectors 540, and each current collector corresponds to one of the battery columns arranged in the central cell holder 520. The battery columns and current collectors 540 can be stacked, and the current collectors can be mechanically supported by a common mechanical support. Alternatively, the cell stack assembly 124 may also use one single integrated current collector 540 for all battery columns arranged in the central cell holder 520.

In some embodiments, the current collector 540 is formed as a single, integrated component, which can be a single, laminated component. For example, the current collector 540 may provide a single component integrating the sense lines via lamination to implement a laminated busbar with an integrated sensing layer to sense the voltage and/or the temperature of the corresponding cell group 542 or corresponding cell block 544. For example, in each column, voltage and temperature sensing lines 546 may be arranged by lamination and configured to collect voltage traces at one end of the column.

In some embodiments, the current collector 540 is bolted and welded to the aluminum bus bars 548 along with the main pack bus bars 560 used to connect the positive and negative ends of the cell stack assembly 124 to the HVJB 122. In some embodiments, the current collector 540 is made by nickel-plated copper conductors attaching to individual battery cells 530 to form the electrical path for a desired cell combination. For example, the current collector 540 has a 208S-7P pack architecture, which contains a series of 208 cell groups 542, and each cell group 542 includes 7 parallel cells. The current collector 540 includes positive electrical contacts, negative electrical contacts, parallel conductors, and series conductors. Each positive electrical contact may be configured to electrically couple to a positive terminal of one of the battery cells 530. Each negative electrical contact may be configured to electrically couple to a negative terminal of one of the battery cells 530. The parallel conductors are configured to electrically couple the battery cells 530 arranged in each battery cell row in parallel with each other. The series conductors are configured to electrically couple adjacent battery cell rows in the battery column in series with each other. As mentioned above, the battery assembly includes electrical conductors (e.g., bus bars) attached to the block of the foam cell holder 520, in which each electrical conductor corresponds to a battery column. The electrical conductor may be electrically connected to one of the series conductors of the current collector 540.

The current collector 540 may integrate both voltage and temperature sense lines for each 14S-7P cell block 544. Each cell block 544 contains a series of 14 cell groups 542. That is, there are three cell blocks 544 per one column and a total of fifteen cell blocks 544 in the current collector 540. For example, the current collector 540 may include a plurality of temperature sensors, and each temperature sensor may be configured to sense a temperature associated with a subset of the battery cells 530. The current collector 540 may also include a plurality of voltage sense lines, and each voltage sense line may be configured to sense an output voltage associated with a subset of the battery cells 530.

Figure 10B:
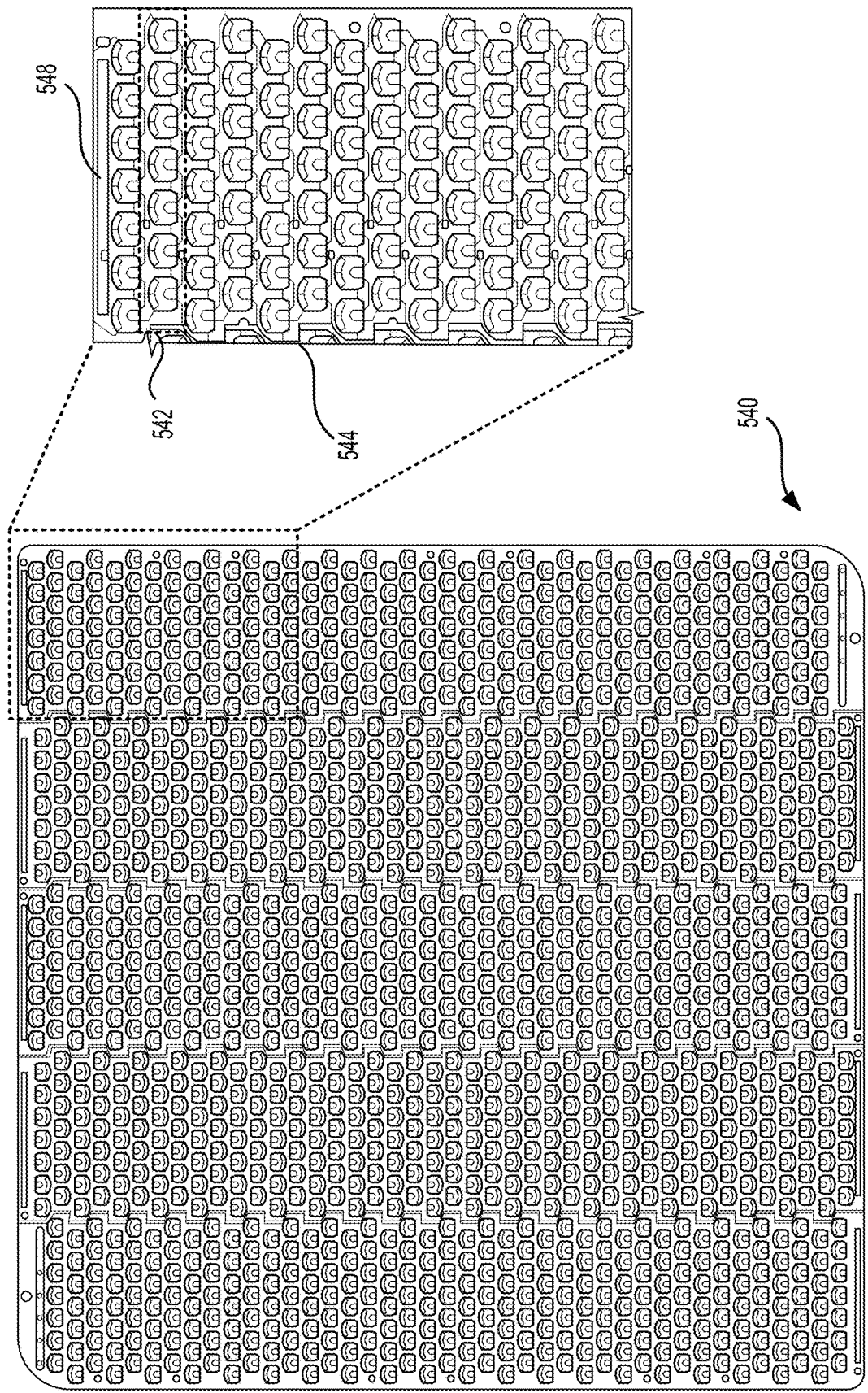
FIG. 10B is a diagram illustrating a top view of the current collector assembly of FIG. 10A at both the pack level and the cell block level, consistent with some embodiments of the present disclosure.

FIG. 10B is a diagram illustrating a top view of the current collector 540 of FIG. 10A at both the pack level and the cell block level, consistent with some embodiments of the present disclosure. The current collector 540 may be attached to the foam cell holder 520 using a pressure sensitive adhesive (PSA). The battery cells 530 within the foam cell holder 520 may be welded to the current collector 540 to form the electrical connection. In particular, each positive terminal of the battery cells 530 is welded to a corresponding positive electrical contact of the current collector 540, and each negative terminal of the battery cells 530 is welded to a corresponding negative electrical contact of the current collector 540. In some other embodiments, the battery cells 530 may also be respectively bonded, soldered, brazed, or screwed to corresponding positive electrical contacts and negative electrical contacts of the current collector 540 to form the electrical connection.

Figure 11:
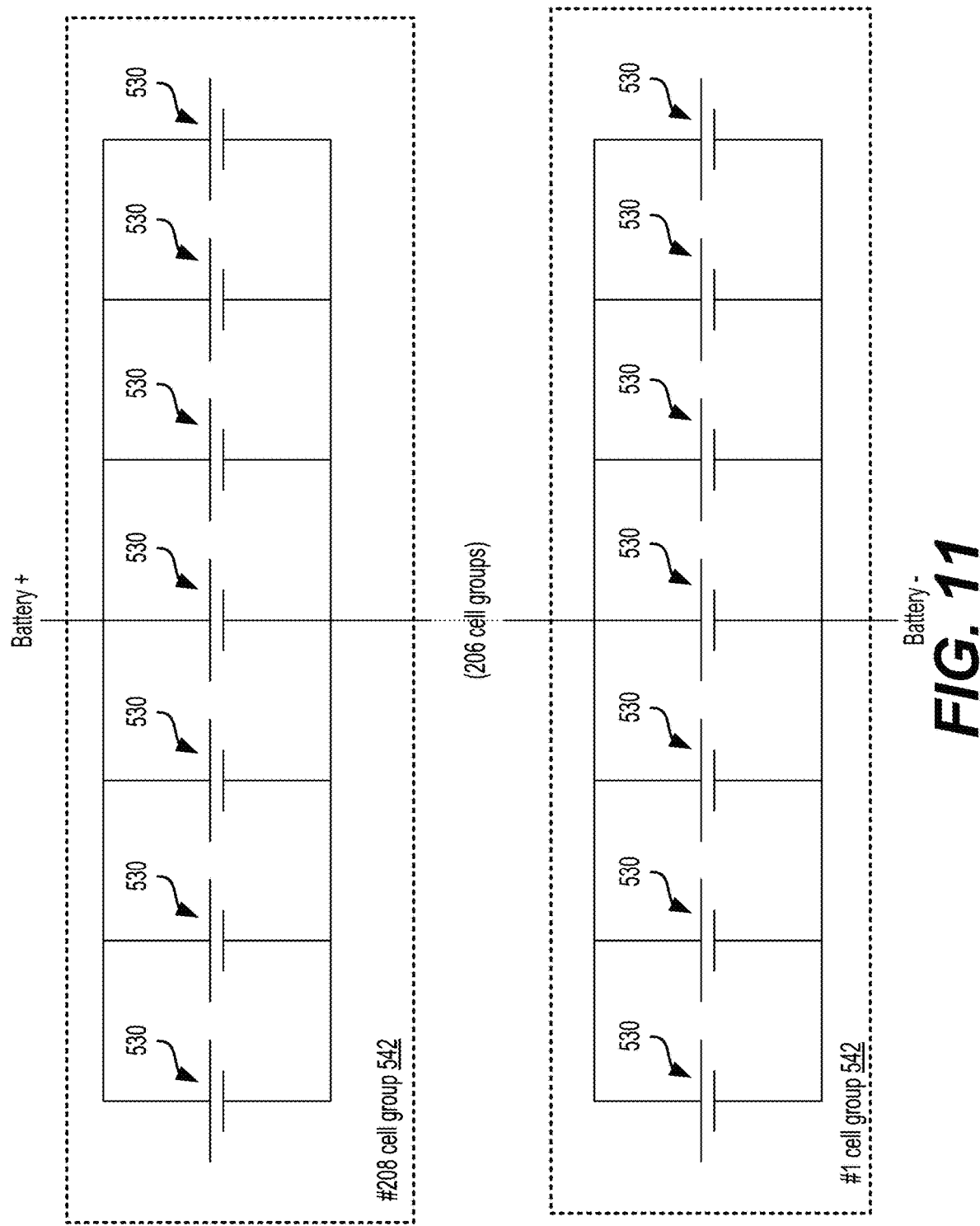
FIG. 11 is an exemplary circuit diagram illustrating the series and parallel arrangements of the battery cells forming the battery pack architecture shown in FIGS. 10A and 10B.

The current collector 540 may form both the parallel and series connections of the battery pack 120 and enable electrical monitoring of each cell group and thermal monitoring of each cell block. Due to the 208S-7P pack architecture, when a battery cell 530 experiences an internal short, only the battery cells 530 in the same 7P cell group are exposed to the short circuit. FIG. 11 is an exemplary circuit diagram illustrating the series and parallel arrangements of the battery cells 530 forming the 208S-7P pack architecture shown in FIGS. 10A and 10B. In some embodiments, by this 208S-7P pack architecture shown in FIG. 11, the battery pack 120 may be configured to provide a maximum voltage of 874 V (i.e., 4.2V for each cell group 542).

Figure 12:
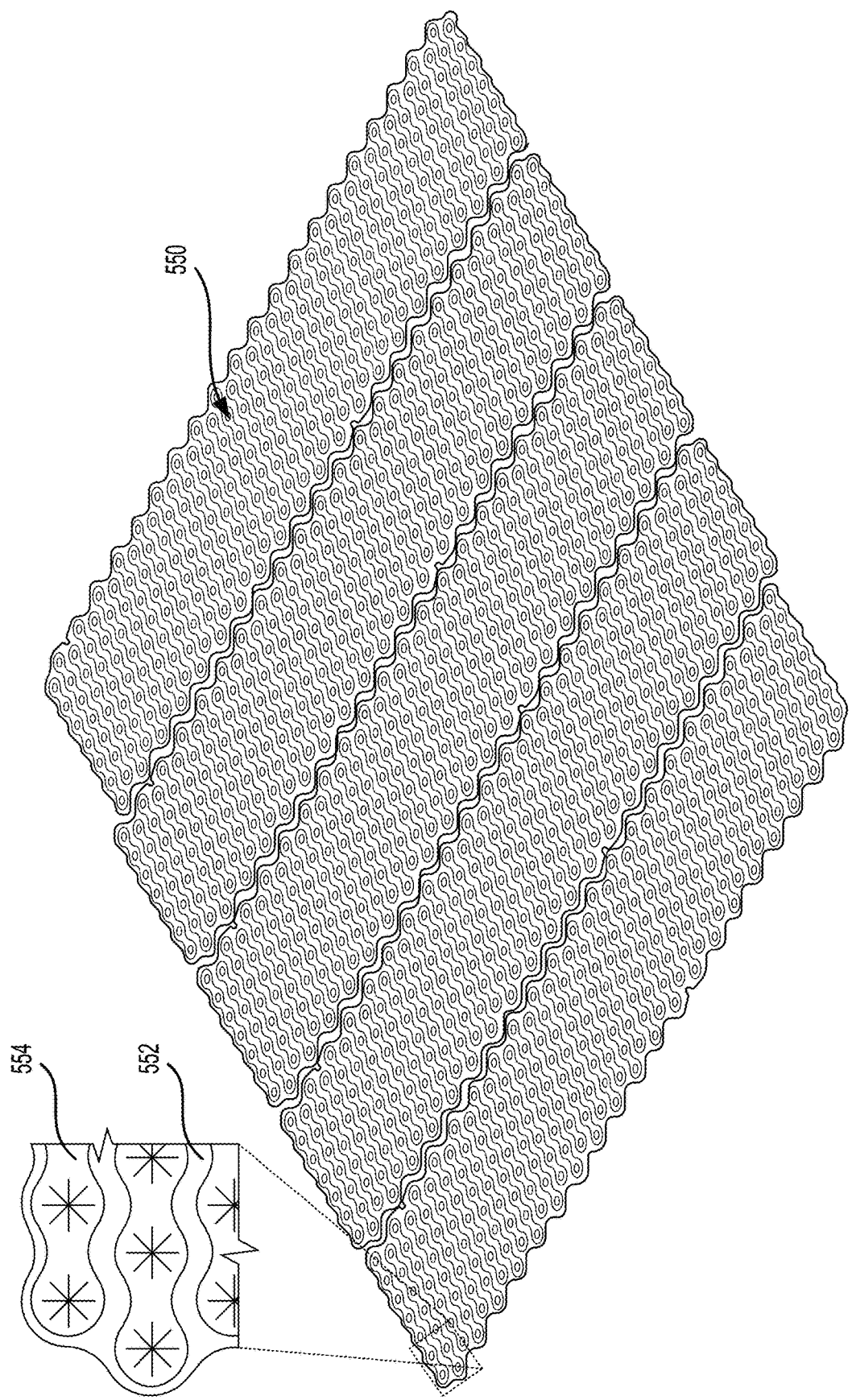
FIG. 12 is a diagram illustrating an exemplary vent flap assembly, consistent with some embodiments of the present disclosure.
Figure 13A:
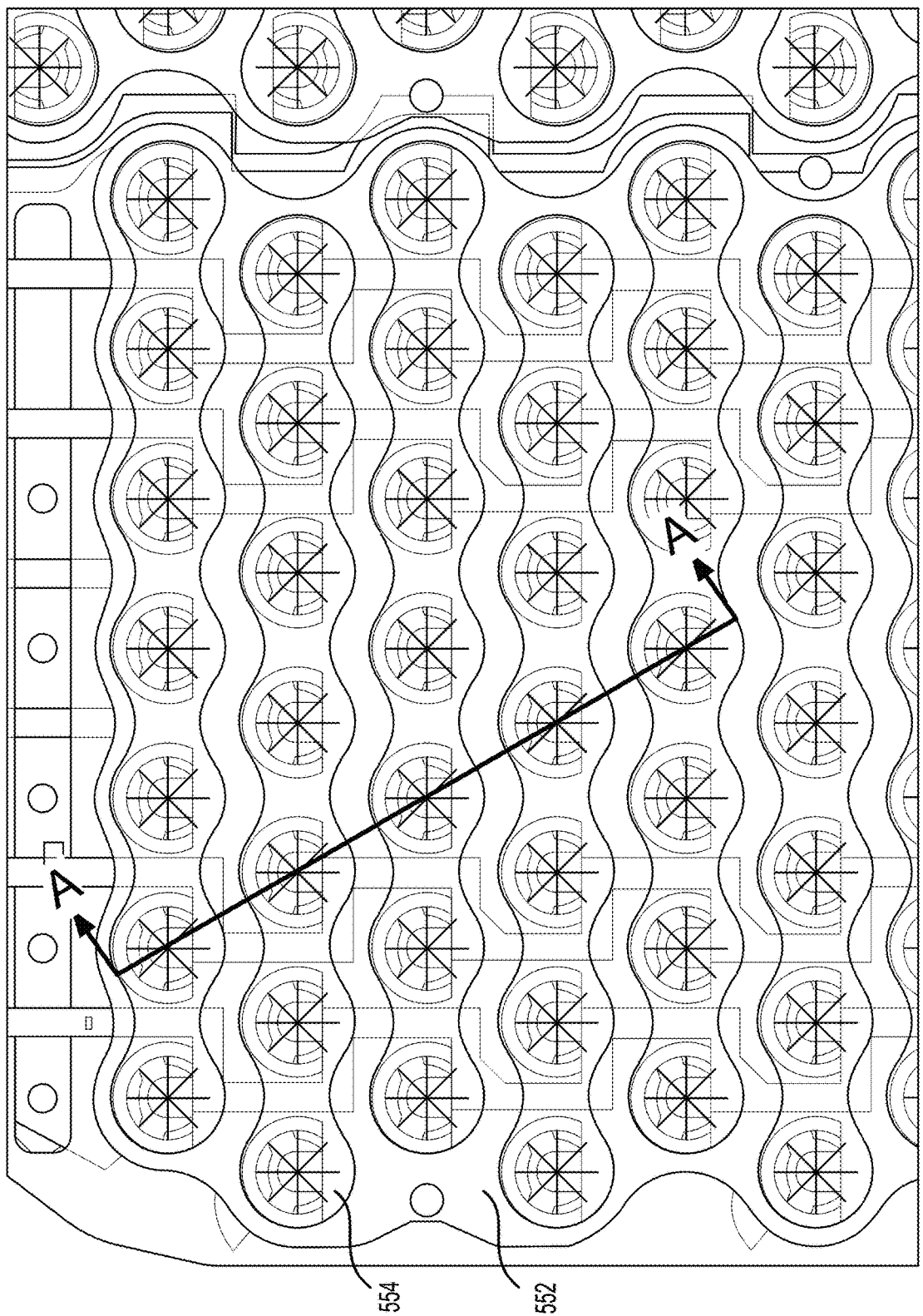
FIG. 13A is a diagram illustrating an enlarged portion of the vent flap assembly of FIG. 12, consistent with some embodiments of the present disclosure.
Figure 13B:
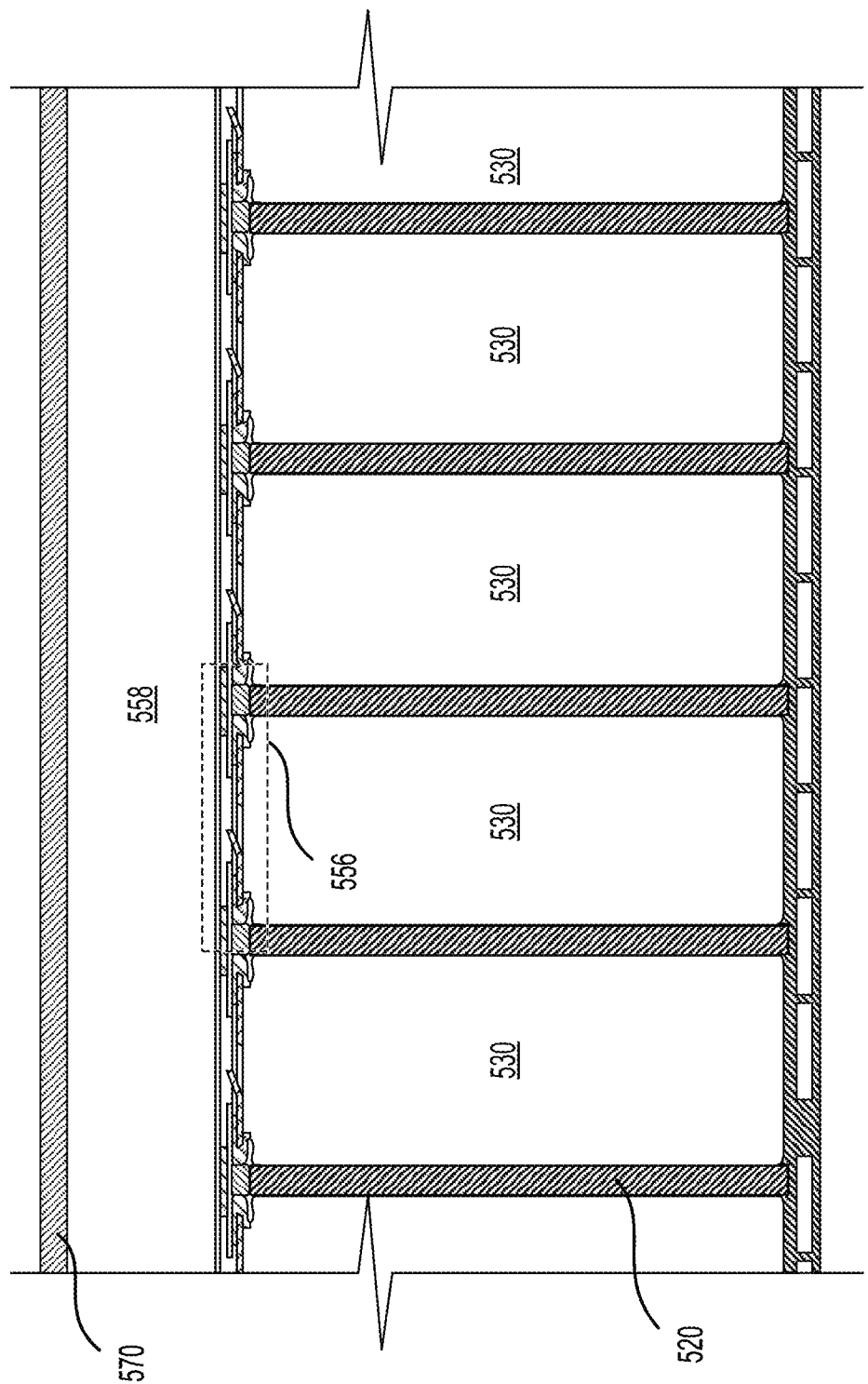
FIG. 13B is a diagram illustrating a cross-sectional view along the line A-A of FIG. 13A, consistent with some embodiments of the present disclosure.

In some embodiments, insulative vent flaps may be placed over the welded current collector 540. Reference is made to FIG. 12 and FIGS. 13A and 13B. FIG. 12 is a diagram illustrating an exemplary vent flap assembly 550 for safely venting battery cells in thermal runaway, consistent with some embodiments of the present disclosure. FIG. 13A is a diagram illustrating an enlarged portion of the vent flap assembly 550 of FIG. 12, consistent with some embodiments of the present disclosure. FIG. 13B illustrates a cross-sectional view along the line A-A of FIG. 13A, consistent with some embodiments of the present disclosure. In FIGS. 13A and 13B, the vent flap assembly 550 is shown upside down relative to installed orientation.

Specifically, as shown in FIG. 12 and FIGS. 13A and 13B, the vent flap assembly 550 includes two layers 552 and 554, which may be flexible and able to resist elevated temperatures (e.g., transient high temperatures or continuous high temperatures). For example, when thermal runaway occurs, the temperature may be at around 800 degrees Celsius. The mechanical support layer 552 may be configured to be attached to the battery assembly. The vent flap layer 554 is attached to the mechanical support layer 552 and includes multiple vent flaps corresponding to battery cells 530 in the battery assembly. Each vent flap includes one or more portions configured to deform to permit flow of gas from the battery cell corresponding to the vent flap. In some embodiments, each vent flap includes up to four, six, eight, or ten cantilevered portions, which are defined using intersecting slits formed in the vent flap layer 554. In some other embodiments, each vent flap consists of a single slit, but the present disclosure is not limited thereto. The mechanical support layer 552 may include at least one of silicone or polyurethane. For example, the mechanical support layer 552 may be a compliant silicone foam layer with the PSA used to secure the vent flap assembly 550 onto the current collector 540, but the present disclosure is not limited thereto. The vent flap layer 554 may be configured to protect neighboring cell groups 542 from cell ejecta and can be formed using materials such as flexible ceramics, thermoplastic polyimide, or any other materials in the same class sharing similar properties and characteristics. Alternatively stated, the vent flap layer 554 can include a thermoplastic material, a ceramic material, or a silicate material. In addition to the star shape shown in FIG. 12, various designs can be used to achieve the vent flap assembly 550. For example, in some embodiments, each vent flap includes one or more cantilevered portions. The vent flap assembly 550 may use relatively stiff, un-cantilevered elements to provide the structure which may be burst open by pressure, without extending too far out, in a runaway thermal event. In some other embodiments, each vent flap may include one or more perforated portions or thinned out/etched portions to deform to permit flow of gas from the battery cell. The vent flap assembly 550 may use various shapes that allow a deformation of cantilevered, perforated, or etched portion(s), for enabling the venting. As shown in the drawings, the vent flaps may be arranged in a two-dimensional repeating pattern. For example, a honeycomb structure for battery cell arrangement may be applied, but the present disclosure is not limited thereto.

By designing and selecting the Young's modulus (or the modulus of elasticity in tension or compression) of the perforated or cantilevered portions properly, the cantilevered, perforated, or etched portion(s) can be configured to deform under pressure of the gas from the battery cells, but not under mechanical pressure or aircraft vibration. Ordinary artisans would understand how to design and select parameters to achieve the performances above. In some embodiments, the thickness of the perforated or cantilevered portions may be about 0.5 to 1.0 mm.

In some embodiments, the mechanical support layer 552 and the vent flap layer 554 may also be configured as a single layer, and may be made of the same material, but the disclosure is not limited thereto. In other embodiments, the mechanical support layer 552 and the vent flap layer 554 may be configured as one single layer but made of different materials.

The vent flap assembly 550 may further include an adhesive layer configured to attach the mechanical support layer 552 to the battery assembly. For example, the adhesive layer may be a pressure-sensitive adhesive layer, but the present disclosure is not limited thereto. For example, the adhesive layer may be formed by using liquid adhesive or melting adhesive to adhere the mechanical support layer 552 to the battery assembly. In other words, the vent flap assembly 550 may include liquid adhesive configured to attach the mechanical support layer to the battery assembly. In some other embodiments, a surface of the mechanical support layer 552 is melted to attach the mechanical support layer 552 to the battery assembly.

FIGS. 13A and 13B show the series connections, in addition to a venting manifold 556 and a cell headspace 558 in the vent flap assembly 550. In some embodiments, the cell headspace 558 provides an open volume (e.g., with about a height of 20 mm) between the pack lid 570 and the vent flap layer 554 for getting gases out and reducing convective heat transfer between different cell groups. In some embodiments, the battery pack 120 may also provide a battery pack vent (e.g., another one-way valve), which may be an off-the-shelf device. In some embodiments, during a cell outgassing event, the gas released by the affected cell is contained and channeled downward by the foam cell holder 520 where it enters the space below the cell and enclosed by the mechanical support layer 552 and the vent flap layer 554. This space may be referred to as the venting manifold 556 and is interconnected for the cells belonging to one cell group. The venting manifold 556 does not interconnect to other cell groups as it is separated by the mechanical support layer 552. Alternatively stated, the battery cells 530 are organized into one or more battery cell groups, and the vent flap assembly 550 may be configured to provide a first space (e.g., the venting manifold 556) corresponding to each battery cell group. The mechanical support layer 552 may be configured to separate each first space from the other first spaces. The perforated or cantilevered portions of the vent flaps corresponding to the battery cells in each battery cell group are configured to deform to permit flow of gas out of the first space corresponding to the battery cell group. For example, when the pressure in the venting manifold 556 rises, the flaps on the vent flap layer 554 open, allowing gasses and potentially ejecta to enter the headspace 558 below the vent flap assembly 550. In other words, the perforated or cantilevered portions of the vent flaps are configured to deform to permit flow of gas out of all the first spaces into a second space (e.g., the headspace 558) formed by the vent flap assembly 550. Accordingly, the vent flap assembly 550 may provide a one-way valve placed on-top of the cells and the current collector 540 to safely vent a cell that has gone into thermal runaway while also protecting neighboring cells from the heat and ejecta of the failed cell.

Figure 14:
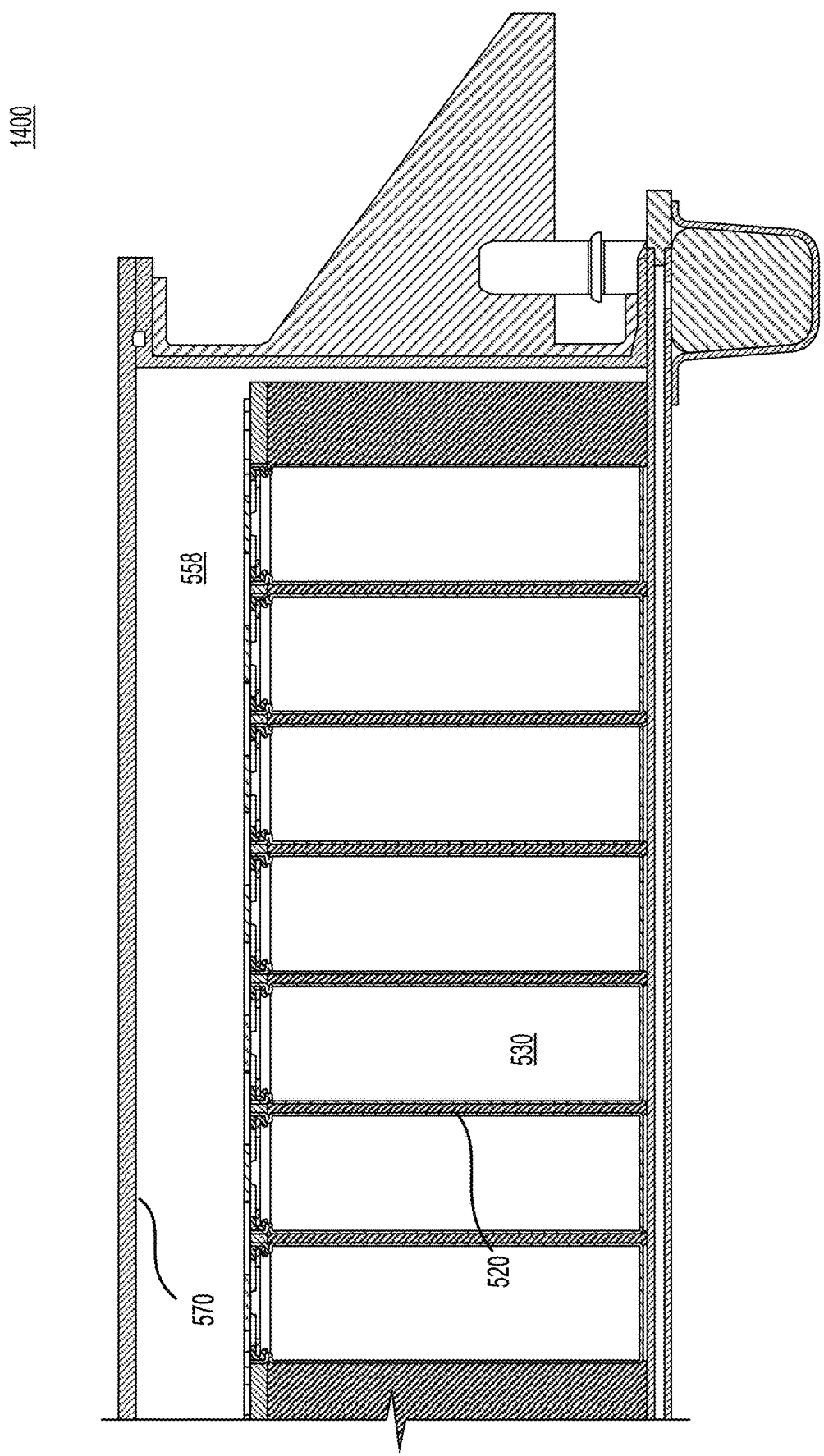
FIG. 14 is a diagram illustrating a cross-sectional view of a battery pack enclosure including head space directly above a vent flap assembly, consistent with some embodiments of the present disclosure.

FIG. 14 illustrates a cross-sectional view of a battery pack enclosure 1400 including the head space directly above the vent flap assembly 550, consistent with some embodiments of the present disclosure. Similar to FIGS. 13A and 13B, the structure in FIG. 14 is shown upside down relative to installed orientation. As shown in FIG. 14, the battery pack enclosure 1400 provides a structural interface for mounting the battery pack 120 to the primary aircraft structure, houses the entire 208S-7P cell stack assembly 124, and is connected to the heat exchanger. In some embodiments, the battery pack enclosure 1400 may provide a 20 mm headspace 558 between the pack lid 570 and the cell stack to reduce convective heat transfer between cell groups.

Accordingly, the battery pack enclosure 1400 includes a defined path for the vent gas to escape through a pressure relief safety device (e.g., a burst valve) that prevents the battery pack 120 from over pressurizing. The pack vent may be a dual stage system that is used to provide pressure equalization between the battery pack 120 and the environment during normal operation. The vent interfaces with a duct that vents battery emissions out of the aircraft 100. Aside from the vent path, the battery pack enclosure 1400 may be sealed such that cell electrolyte leakage is retained in the enclosure and does not drain into the aircraft 100 where it could pose a hazard.

Figure 15:
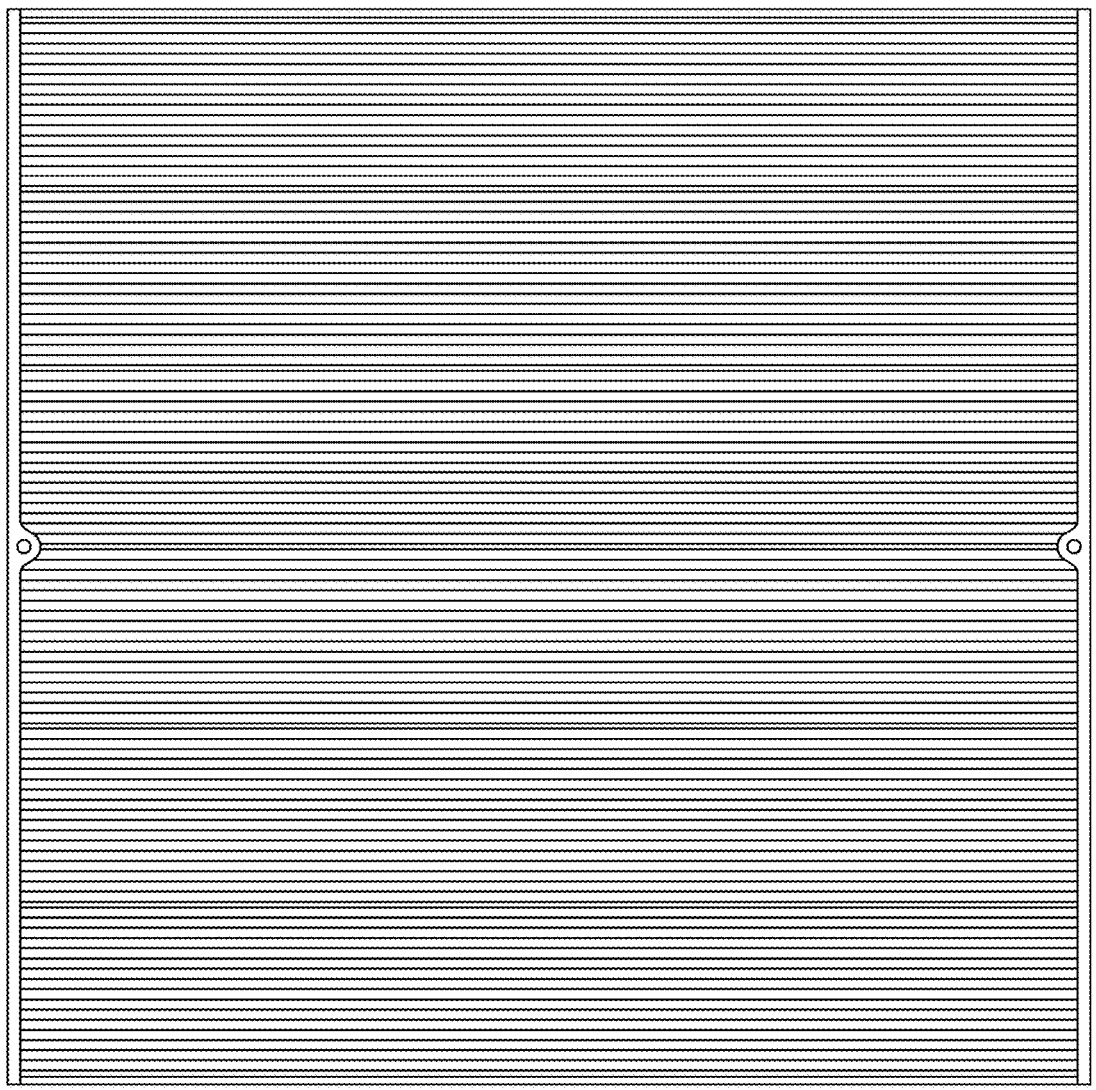
FIG. 15 illustrates an exemplary heat exchanger plate, consistent with some embodiments of the present disclosure.

FIG. 15 illustrates an exemplary heat exchanger plate 1500, consistent with some embodiments of the present disclosure. The heat exchanger plate 1500 may be affixed to the battery pack enclosure 510 to enable regulation of the temperature within the battery pack 120 using thermally conditioned Water Ethylene Glycol (WEG) for heating and cooling. In some embodiments, the active thermal regulation can be used only while the aircraft 100 is on the ground. The heat exchanger plate 1500 may be sized to support the required heating or cooling needs while operating within nominal pressure and flow rate conditions. For example, the heat exchanger plate 1500 can be attached to the battery pack enclosure 510 and the block of the cell holder 520 using a thermally conductive adhesive (e.g., a flame-retardant acrylic adhesive). The thermally conductive adhesive can be used to conduct the heat generated by the cells to the heat exchanger plate 1500. As shown in the embodiments above, the electrical conductors are attached to the block of the cell holder 520 at a first surface thereof, and the heat exchanger plate 1500 is attached to the block of the cell holder 520 at a second surface thereof, opposite the first surface.

FIGS. 16A-16D respectively illustrate different designs for the battery cooling in the HV cooling distribution subsystem, consistent with some embodiments of the present disclosure. As discussed above, the aircraft 100 may include six battery packs 120. Each battery pack 120 includes its coolant inlet and outlet for circulating coolant to achieve the battery cooling. In FIGS. 16A-16D, different coolant line architectures providing a single coolant inlet and outlet within the aircraft 100 are proposed to circulate coolant in parallel to the six battery packs 120 installed inside the wing of the aircraft 100 to minimize both dry and wet weight of the coolant in the coolant lines. The single coolant inlet and outlet within the aircraft 100 allows quick attach and detach. In some embodiments, the battery cooling can be achieved without using on-board pumps. An external pump (on ground, outside the aircraft 100) can be used to circulate the coolant in the battery packs 120 while charging the battery packs 120.

In some embodiments, the cooling operation is performed without exceeding the overall system pressure (e.g., less than 100 psi), and thus no special connectors are needed. The cooling system may be a passive system without additional components for performing active control methods to balance the flow across multiple battery packs 120. Thus, the weight of the system can be minimized.

To charge the multiple battery packs 120 installed inside the wing of the aircraft 100 at a certain charging rate, it is desired to have the battery packs 120 be at the same temperature. Accordingly, the coolant line architecture should be designed to maintain reasonable uniform rate of cooling by improving the coolant flow distribution and the temperature distribution. In addition, it is desired to have the coolant inlet and outlet on the same side for convenient ingress and egress of the passenger.

Figure 16A:
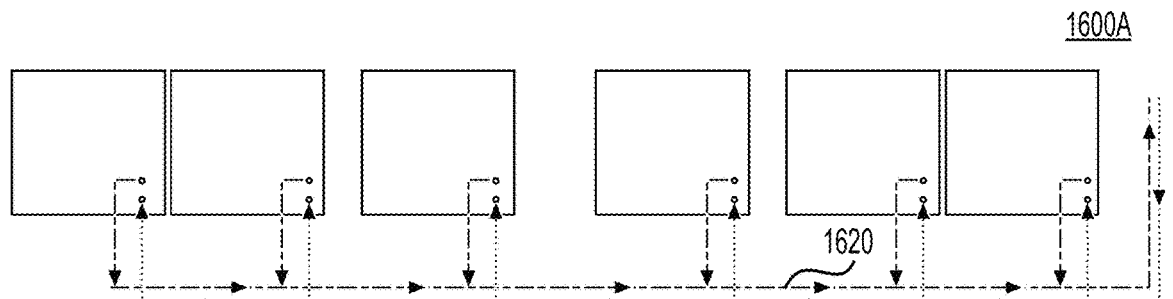
FIGS. 16A-16D illustrate different designs for battery cooling in an HV cooling distribution subsystem, consistent with some embodiments of the present disclosure.

In FIG. 16A, a "U-flow" type coolant line architecture 1600A is provided, where the inlet 1610 and the outlet 1620 can be arranged on the same side. Accordingly, the coolant flow goes down, entering the six battery packs 120 in parallel, and then goes back to the outlet 1620 to create a structure with a generally "U" shape.

Figure 16B:
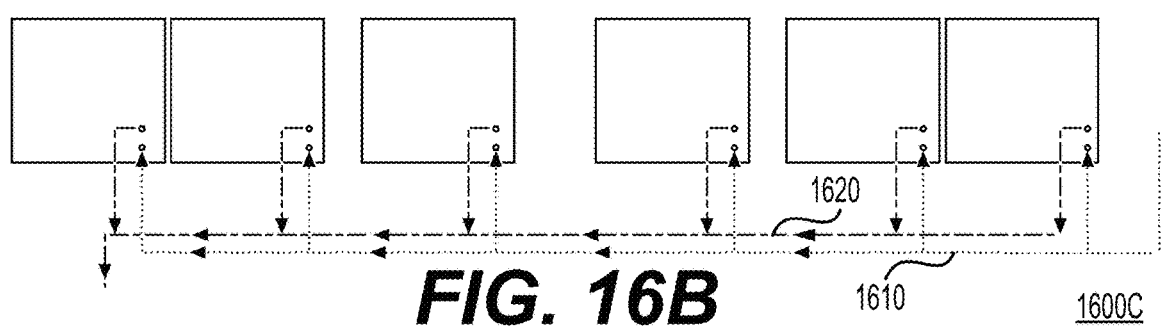

In FIG. 16B, a "Z-flow" type coolant line architecture 1600B is provided, where the inlet 1610 is on one side and the outlet 1620 is on the other side to create a structure with a generally "Z" shape. The Z-flow type coolant line architecture 1600B allows the coolant entering the six battery packs 120 to have the equivalent resistance, which is desired for the optimized flow distribution and the temperature distribution. In the Z-flow type coolant line architecture 1600B, flow distribution in battery packs 120 can be balanced by using different hose sizes, and the design can work with hoses having a small size.

Figure 16C:
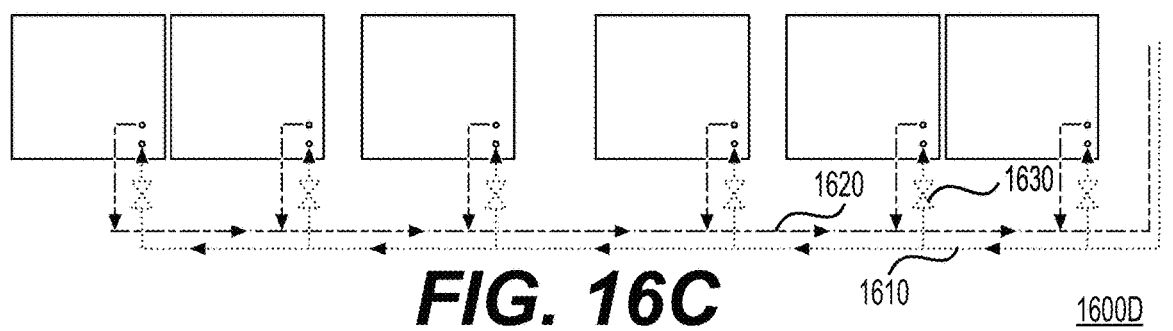

To keep the inlet 1610 and the outlet 1620 on the same side while maintaining the balanced flow, in FIG. 16C, a modified "U-flow" type coolant line architecture 1600C is proposed, in which customized flow restrictors 1630 are respectively arranged between the inlet 1610 and the battery packs 120. In other words, the coolant flows through the customized flow restrictor 1630 before flowing into the corresponding battery pack 120. The customized flow restrictor 1630 providing the resistance can be configured to achieve the proper amount of the coolant flow and balance the flow entering six battery packs 120. For example, in the coolant line architecture 1600C, the flow restrictor 1630 may include a sizing orifice added to the tubing to ensure the same pressure drop from the common inlet to each battery pack 120 to ensure even flow distribution of the coolant to each battery pack 120, and the design can work with hoses having a medium size (e.g., the orifice size of about 3 to 4 mm).

Figure 16D:
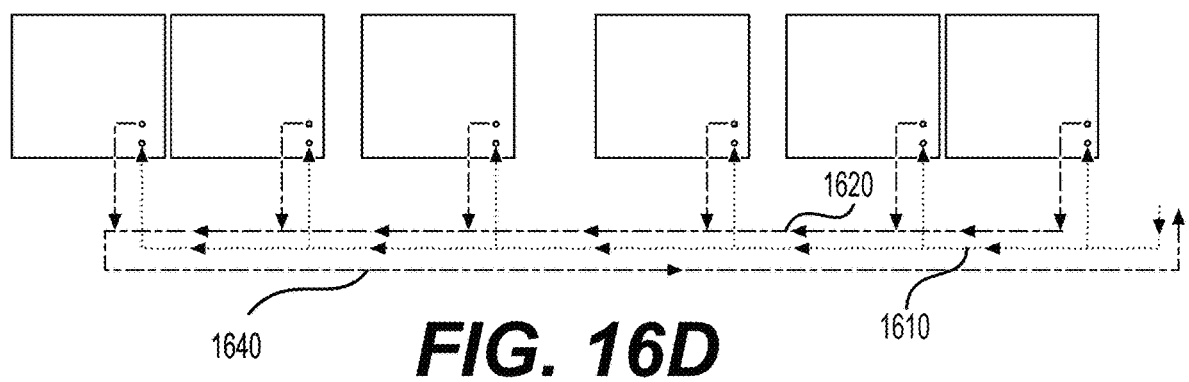

In FIG. 16D, a modified "Z-flow" type coolant line architecture 1600D is proposed, in which an in-flight return line 1640 is added to keep the inlet 1610 and the outlet 1620 on the same side while maintaining the balanced flow. The in-flight return line 1640 is an extra line installed inside the wing of the aircraft 100. By the in-flight return line 1640, the inlet 1610 and the outlet 1620 may be on the same side, while the flow distribution in battery packs 120 can still be balanced by using different hose sizes in the Z-flow architecture 1600D. Similar to the Z-flow type coolant line architecture 1600B, this design can work with hoses having a small size.

Figure 17:
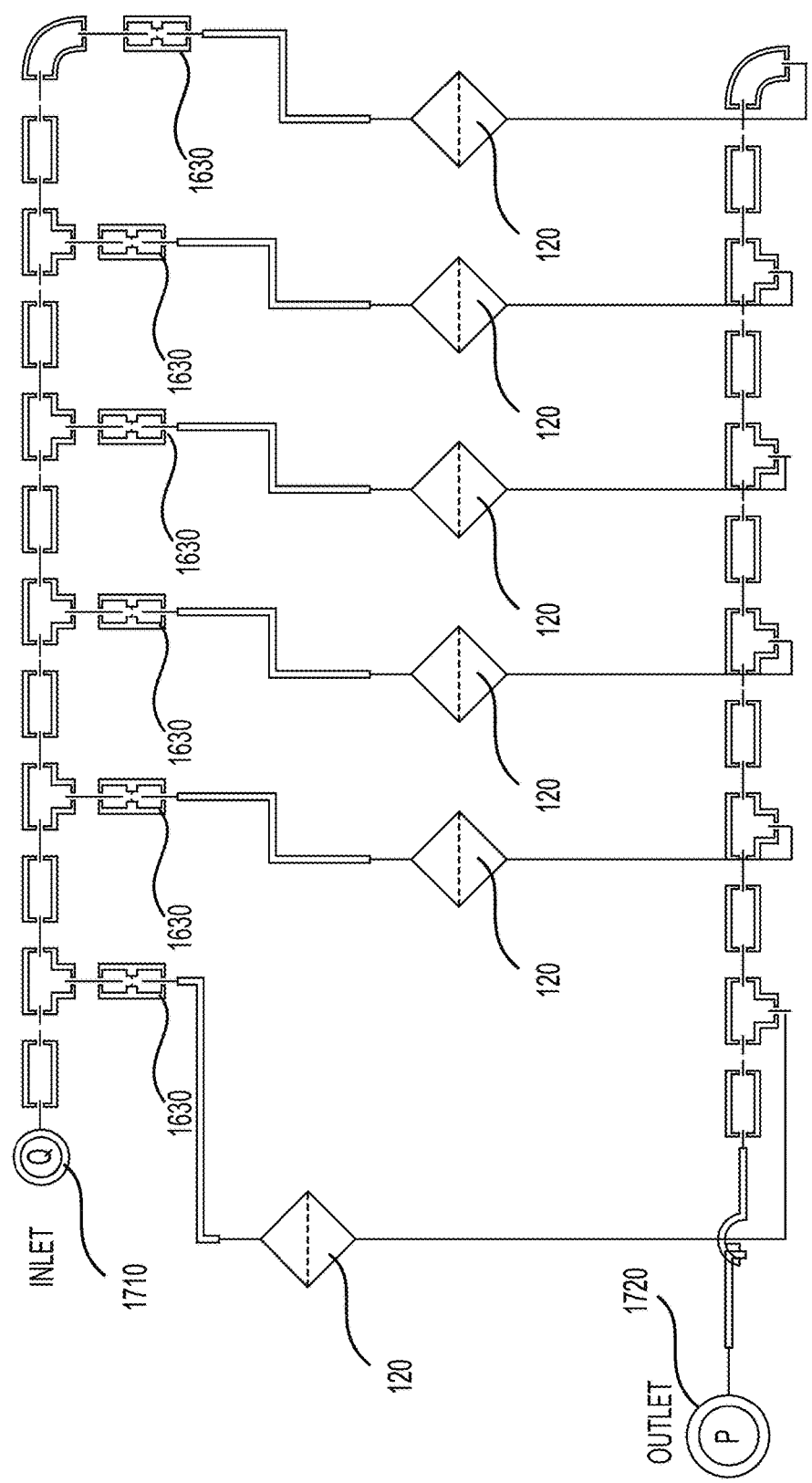
FIG. 17 illustrates an exemplary battery cooling system based on the coolant line architecture of FIG. 16C, consistent with some embodiments of the present disclosure.

FIG. 17 illustrates an exemplary battery cooling system 1700 based on the coolant line architecture of FIG. 16C, consistent with some embodiments of the present disclosure. As discussed above, the aircraft 100 may include a common inlet 1710 and a common outlet 1720 for the coolant, and the coolant flows into the six battery packs 120 in parallel after flowing through the respective flow restrictors 1630 added to the tubing associated with the six battery packs. In some embodiments, the respective flow restrictors 1630 may have different lengths and/or orifice sizes according to the practice needs to balance the flow.

Figure 18:
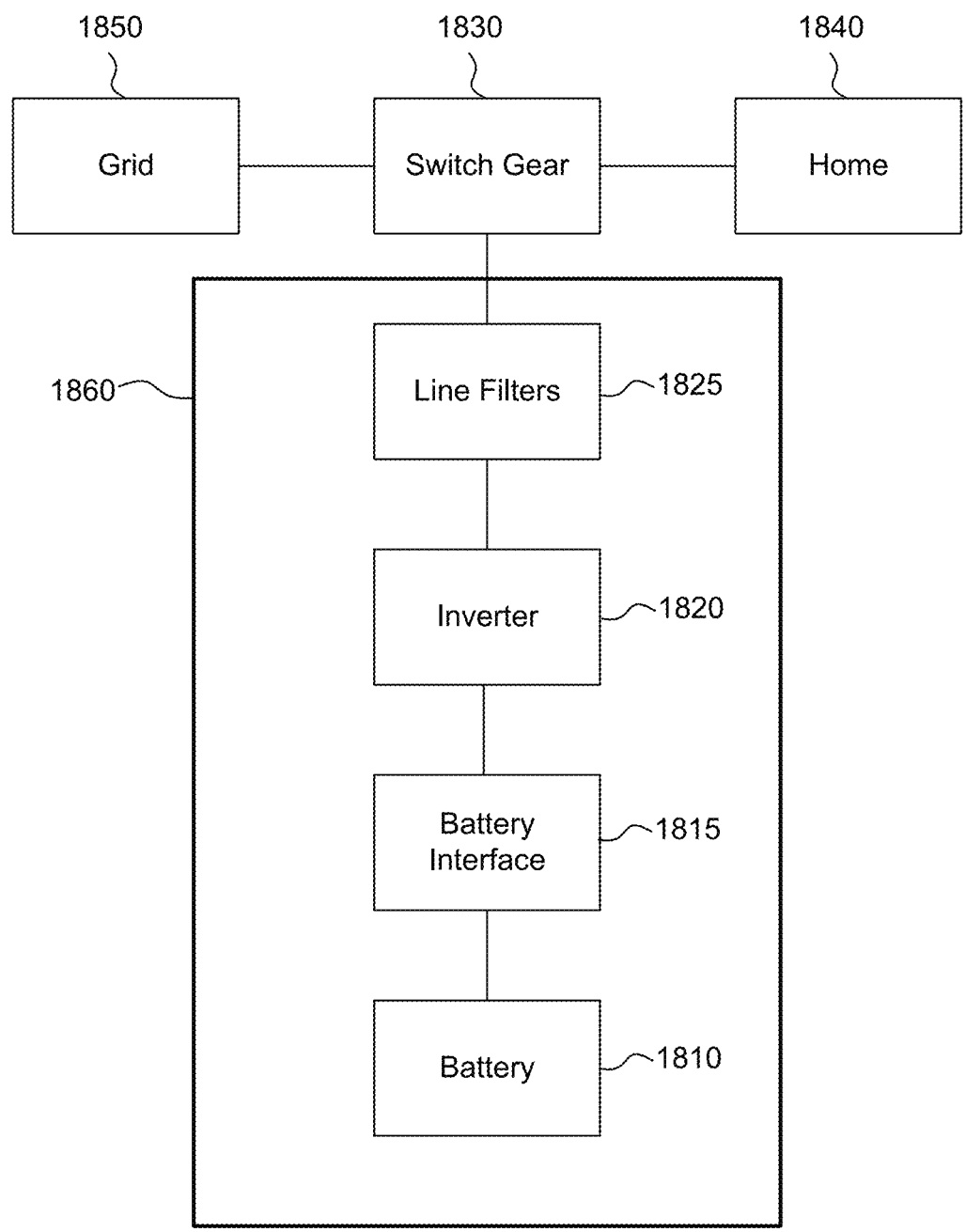
FIG. 18 illustrates an exemplary home system, consistent with some embodiments of the present disclosure.

Reference is made to FIG. 18. FIG. 18 illustrates an exemplary home system 1800, consistent with some embodiments of the present disclosure. It is understood that batteries and/or battery systems used in a demanding application within aircraft, e.g., a high voltage battery produced for primary use in powering an eVTOL aircraft, causes progressive degradation of battery characteristics, and that such batteries and/or battery systems become unusable in that primary application over time. The typical parameters indicating this degradation are reduction in energy storage capacity below a threshold, increased temperature rise under conditions of higher stress (current, power) encountered in aircraft usage, increase in internal resistance/impedance of the battery or battery system, and reduction in power delivery capacity to a level below demands of a host device of the aircraft. Such high voltage batteries or battery systems, however, may continue to be useful in other secondary applications including but not limited to domestic power supply systems, rural energy storage systems, and other backup power systems including large scale power grid and domestic power grid backup systems. For example, a secondary application of such batteries and/or battery systems may comprise providing power to a residence, wherein a repurposed battery or battery system may be used as an energy source for providing power to a residence, and wherein a battery or battery system may directly connect to a home system inverter and power supply.

In some embodiments of the disclosure, a high voltage battery used originally in an aircraft may be repurposed for secondary use with high reliability. In some embodiments, a high voltage battery may be an eVTOL aircraft battery. In some embodiments, the high voltage battery may have been originally designed, ab initio, for the original use and also for repurposing for the secondary use. For example, the high voltage battery may have been originally designed such that minimal modifications may be necessary before it is repurposed for the secondary use. As an example, the high voltage battery may be designed originally to comprise a removable high voltage junction box including a battery management system, such that modification for the secondary use may involve exchanging the original junction box with another junction box (including a different battery management system) that may be configured for the secondary use. As another example, the high voltage battery may be designed to work with an inverter that is compatible with both the original use and the secondary use. For example, the inverter's voltage, current, power, temperature, humidity, and other ratings may be configured such that the inverter may be suitable for both the original use and the secondary use. As another example, the high voltage battery may be configured with a battery interface that is compatible with the interfaces in both the original use (e.g., eVTOL aircraft) and the secondary use (e.g., a home energy storage system), such that when the high voltage battery is repurposed for the secondary use, no changes need be made to the battery interfaces.

In some embodiments, a secondary use may be for installation within and providing power for a home system (i.e., a home electrical power system). In some embodiments, a home system may be a utility system which powers various subsystems of a residential home, a group of residential homes, a commercial place of business, or an industrial premise. In some embodiments, a home system may comprise an electronic switching system (ESS). As illustrated in the example of FIG. 18, a home system 1800 may comprise a repurposed battery 1810, which is coupled to a battery interface 1815, which is coupled to an inverter 1820, which is coupled to one or more line filters 1825. In some embodiments, the battery 1810, battery interface 1815, inverter 1820, and the one or more line filters 1825 may comprise an electronic switching system 1860 of the home system 1800. In some embodiments, the battery interface 1815 may be a DC/DC interface. In some embodiments, such an exemplary electronic switching system 1860 may be connected to one or more home electrical lines 1840 via a switching network (i.e., switch gear) 1830. In some embodiments, the switching network 1830 may be configured to allow for powering of the home electrical lines 1840 either via the electronic switching system 1860 or via an external electrical power grid 1850.

Figure 19:
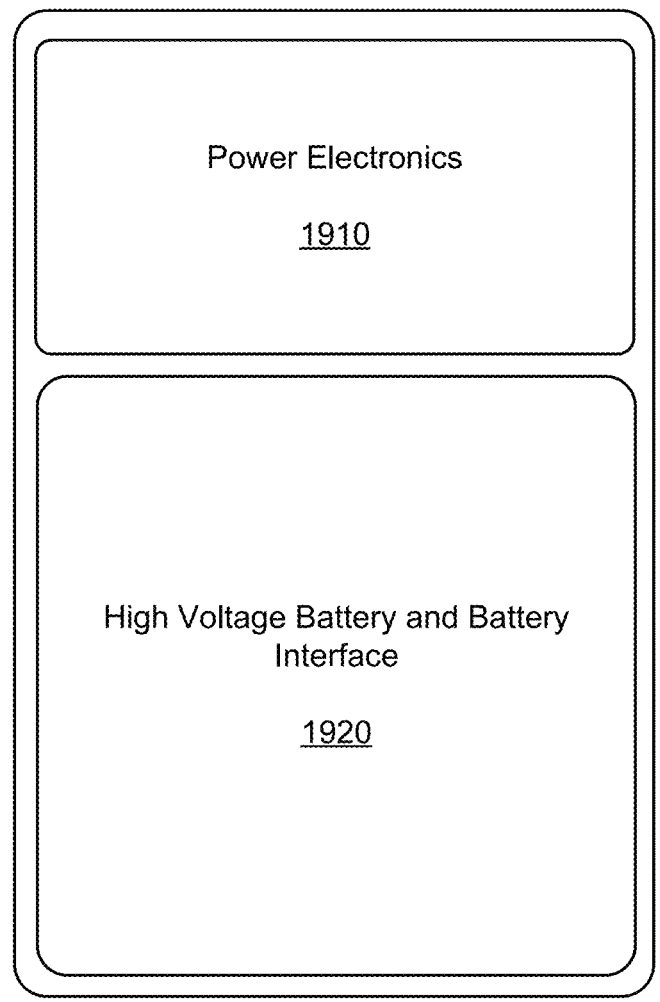
FIG. 19 illustrates an exemplary electronic switching system for the exemplary home system illustrated in FIG. 18, consistent with some embodiments of the present disclosure.

Reference is made to FIG. 19. FIG. 19 illustrates an exemplary electronic switching system 1900 for the home system 1800 illustrated in FIG. 18. As illustrated in the example of FIG. 19, an electronic switching system 1900 may comprise a repurposed HV battery and battery interface 1920, wherein the battery interface comprises a battery management system (BMS), and power electronics 1910 which comprise an inverter and one or more line filters. In some embodiments, such an exemplary electronic switching system 1900 may be connected to one or more home electrical lines via a switching network (i.e., switch gear). In some embodiments, the switching network may be configured to allow for powering of the home electrical lines either via the electronic switching system or via an external electrical power grid. In some embodiments, an inverter within the power electronics 1910 of the electronic switching system 1900 may be configured to have minimal total harmonic distortion (THD) such that minimal filtration is required for connecting the electronic switching system to a utility bus, thereby providing minimal harmonic distortion in any power returned to an external power grid connected to the electronic switching system 1900 and a home system.

Continuing with reference to FIGS. 18 and 19, in some embodiments, the repurposed battery may be a high power (i.e., HV) battery comprising high power cells which may allow for increased power applications in a home electrical system 1840. As an example, one or more of such HV batteries comprising high power cells may be utilized for DC fast charging (DCFC) applications in a home. In some embodiments, a DCFC application may comprise DCFC of an electronic vehicle (EV) at significantly higher rates than currently possible. For example, two high power batteries comprising high power cells, as described herein, may be used in a home system to charge an EV in about 40-80% of the time typically required by a V3 Supercharger, and about 25 times faster than extant home EV charging stations. As another example, in order to further support DCFC applications via an electrical switching system 1900, a custom DC/DC battery interface may be required to support DCFC performance. As a result, in some embodiments, a custom DC/DC battery interface may be minimized in size, optimized for efficiency, and/or include control logic, sensors, and/or communication interfaces which further support, e.g., DCFC of vehicles via an electronic switching system 1900 for a home.

With further reference to FIG. 19, in further embodiments wherein the repurposed battery is a high power battery comprising high power cells, the repurposed battery may further have low resistance. In some embodiments, the repurposed battery may further generate low amounts of heat as compared to extant home electrical switching system batteries. As a result, in some embodiments, the repurposed battery may be utilized as a heat sink for an inverter. As a further result, in some embodiments, such an inverter may not require any additional forced cooling for operation. As yet a further result, in some embodiments, an electrical switching system comprising a high power battery comprising high power cells may be a quieter and/or more compact system.

Continuing with reference to FIGS. 18 and 19, in some embodiments, the home system may comprise batteries 1810 in parallel, wherein at least one of the batteries 1810 in parallel is a repurposed battery. In some embodiments, no additional equipment may be required to add further capacity to the electrical switching system 1860 by including an additional battery connected in parallel to a first battery 1810 of an electrical switching system 1860. For example, in some embodiments, an electrical switching system 1860 may comprise a master battery which further comprises an interface, inverter, and one or more line filters, wherein additional batteries may be coupled to the master battery in parallel. In some embodiments, a specific capacity required by a particular home may be met by including batteries connected in parallel to a master battery.

In some embodiments, a repurposed battery may comprise a majority of the sensors required for proper functioning within an electrical switching system 1900 and/or a home system 1800. For example, a repurposed battery for utilization in an electrical switching system 1900 and/or a home system 1800 may only require an aircraft-specific high voltage junction box (HVJB) to be replaced with a home system-specific HVJB. In some embodiments, a repurposed battery for utilization in an electrical switching system 1900 and/or a home system 1800 may only require a positive battery connector, a negative battery connector, and a 5× cell monitoring unit (CMU) connector.

In some embodiments, a common HVJB may be implemented in the battery from an initial build of the battery for its primary use. In such embodiments, the common HVJB may remove the requirement to replace the HVJB with a home system-specific HVJB prior to a secondary use of the battery. Due to the excess processing and/or storage capacity required for aircraft batteries, such batteries may also have the capacity to be pre-loaded to be configured with home system compatibility and/or functionality during its initial build.

Figures 20A, 20B:
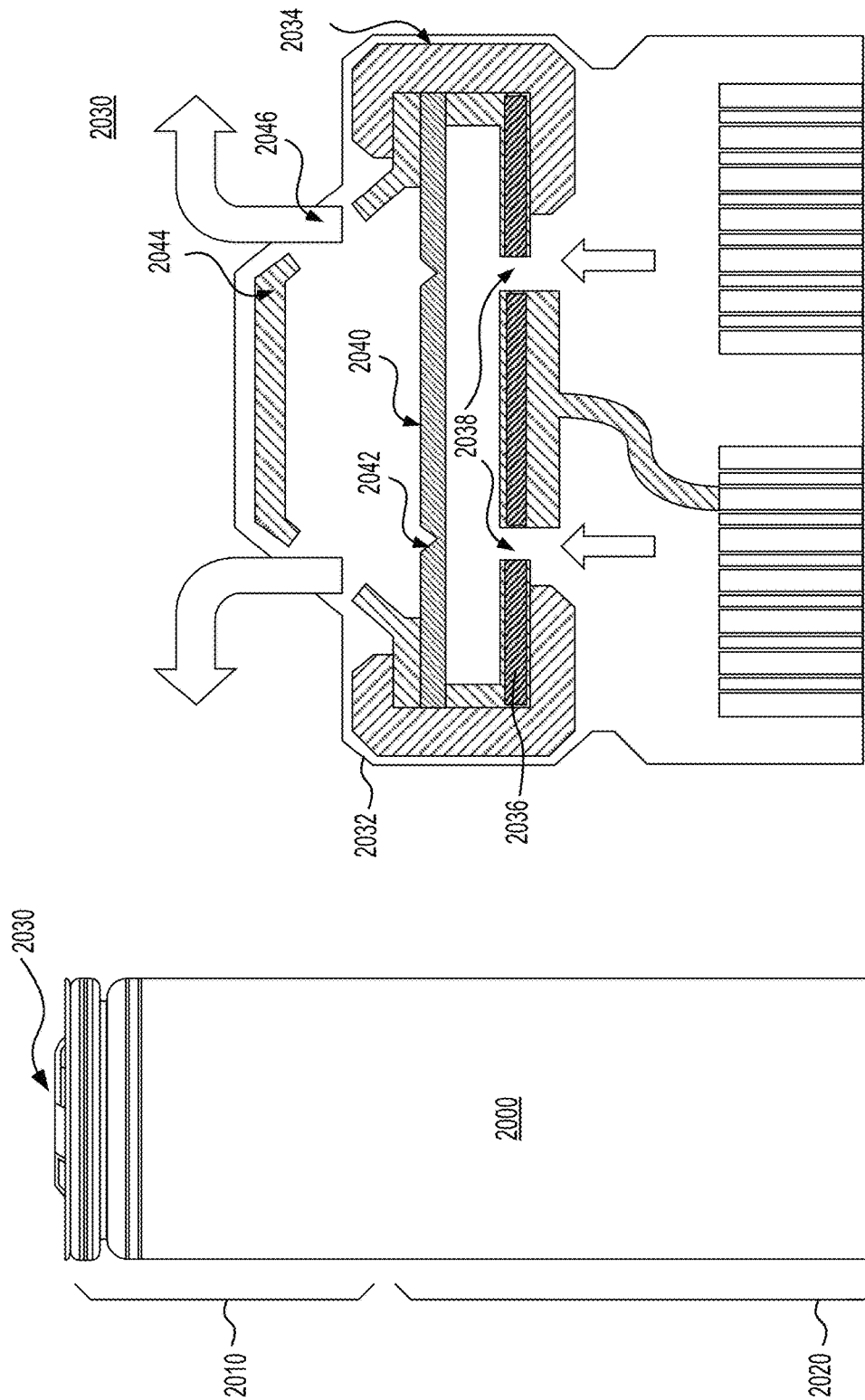
FIG. 20A is a diagram illustrating an exemplary cylindrical battery cell, consistent with some embodiments of the present disclosure.
FIG. 20B is a diagram illustrating an exemplary top vent region, consistent with some embodiments of the present disclosure.

FIG. 20A is a diagram illustrating an exemplary cylindrical battery cell 2000, consistent with some embodiments of the present disclosure. In the embodiments of FIG. 20A, the battery cell 2000 may have different thicknesses at an upper portion 2010 and a lower portion 2020. Specifically, the upper portion 2010 adjacent to a top vent region 2030 of the battery cell 2000 may be thicker than the lower portion 2020 away from the top vent region 2030. For example, the upper portion 2010 may be the top one-third part of the cylindrical battery cell 2000, and the lower portion 2020 may be the lower two-third part of the cylindrical battery cell 2000.

FIG. 20B is a diagram illustrating an exemplary top vent region 2030, consistent with some embodiments of the present disclosure. During the thermal runaway, the gasses produced during the exothermic event within the battery cell need to be directed away safely from critical components within the battery cell and other adjacent cells to protect the battery pack. As shown in FIG. 20B, the top vent region 2030 of the battery cell 2000 is designed to vent the gasses accumulated during the thermal runaway. In some embodiments, the top vent region 2030 includes a metal outer jacket 2032, a plastic insert 2034, a bottom disk 2036 with through holes 2038, a vent disk 2040 with one or more scorings 2042, a positive terminal cap 2044 with one or more vent holes 2046 for releasing extra internal pressure.

For example, the vent disk 2040 may be a rupture disk, also known as a pressure safety disc, burst disc, bursting disc, or burst diaphragm etc. The vent disk 2040 functions as a non-reclosing pressure-relief safety device to protect the battery cell 2000 from over pressurization or potentially damaging conditions. In the event that the internal pressure of the battery cell 2000 increases to a critical point due to the gas accumulation, the vent disk 2040 will break at the scorings 2042 and form a pathway for the gas venting through the through holes 2038 and the vent holes 2046. The metal outer jacket 2032 provides the steel walls of the battery cell, which are designed to constrain the pressure and temperature conditions when the venting occurs.

Figure 21B:
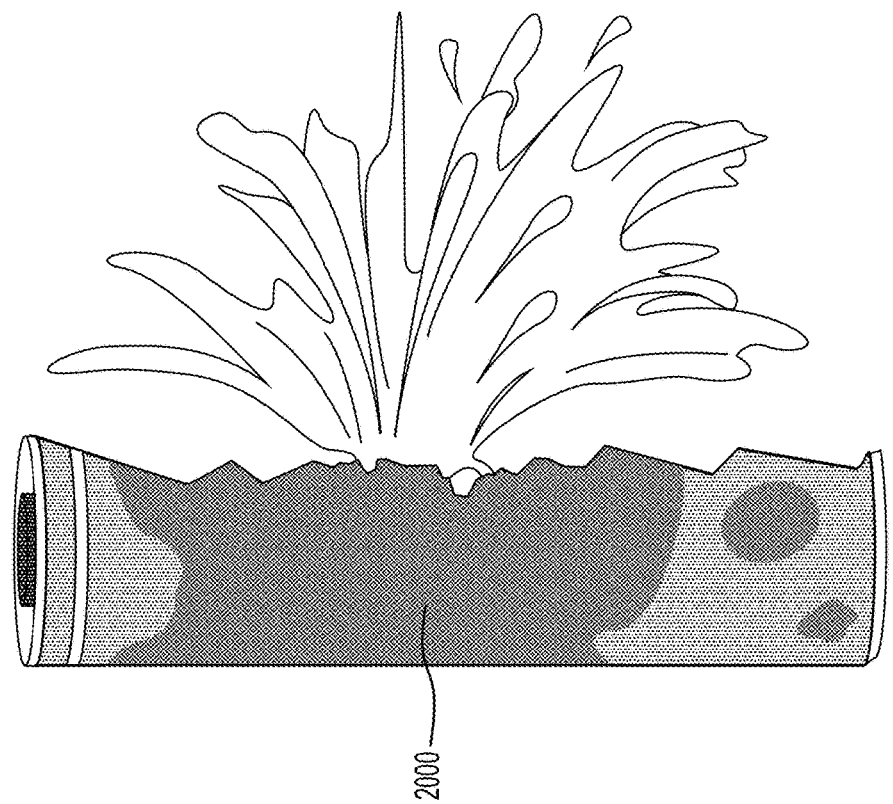
FIG. 21B is a diagram illustrating an exemplary undesired sidewall rupture (SWR) event, consistent with some embodiments of the present disclosure.
Figure 21A:
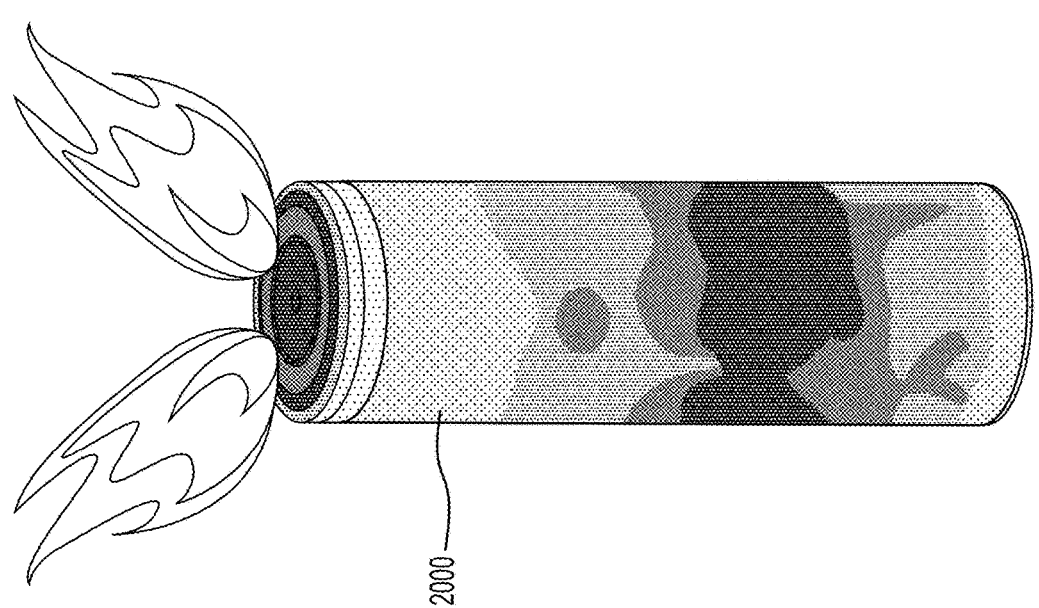
FIG. 21A is a diagram illustrating an exemplary top venting event, consistent with some embodiments of the present disclosure.

FIG. 21A is a diagram illustrating an exemplary top venting event, consistent with some embodiments of the present disclosure. As shown in FIG. 21A, the pressure of a disintegrating or malfunction battery cell 2000 may be so large that the venting with flame may occur. FIG. 21B is a diagram illustrating an exemplary undesired sidewall rupture (SWR) event, consistent with some embodiments of the present disclosure. Sidewall rupture of batteries during the thermal runaway may occur when the gases are unable to escape in an orderly way through the vent holes 2046 in FIG. 20B, which causes severe damages to the adjacent battery cells.

In order to balance the weight and the strength of the battery cell 2000, in some embodiments, the additional thickness is provided only to the upper portion 2010 adjacent to the top vent region 2030 to prevent the undesired SWR event. As discussed above, the upper portion 2010 in FIG. 20A may be the top one-third of the battery cell 2000, where the SWR generally occurs. In some embodiments, the can of the battery cell 2000 may be made by applying a deep drawing process. A stepped draw could be done to limit the ironing to the lower portion 2020, so as to keep the extra thickness only applied to the upper portion 2010.

Figure 22:
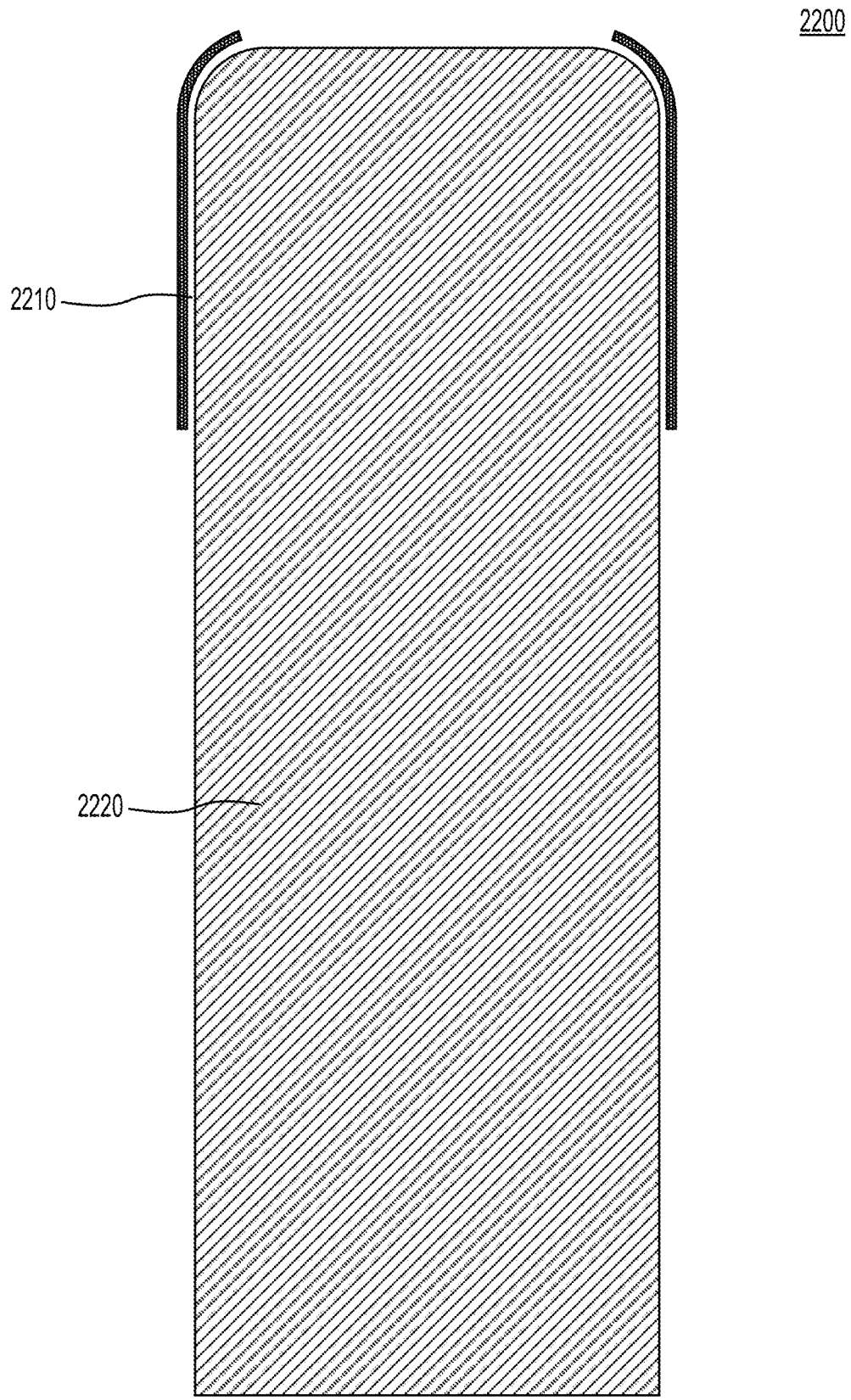
FIG. 22 is a diagram illustrating another exemplary cylindrical battery cell, consistent with some embodiments of the present disclosure.

FIG. 22 is a diagram illustrating another exemplary cylindrical battery cell 2200, consistent with some embodiments of the present disclosure. In the embodiments of FIG. 22, the battery cell 2200 may include a metallic sleeve structure 2210 covering an upper portion of a battery can body 2220 to strengthen and reinforce the upper portion of the battery cell 2200 to prevent the undesired SWR event. In some embodiments, the metallic sleeve structure 2210 may be formed by a metal stamping or drawing process.

Figure 23:
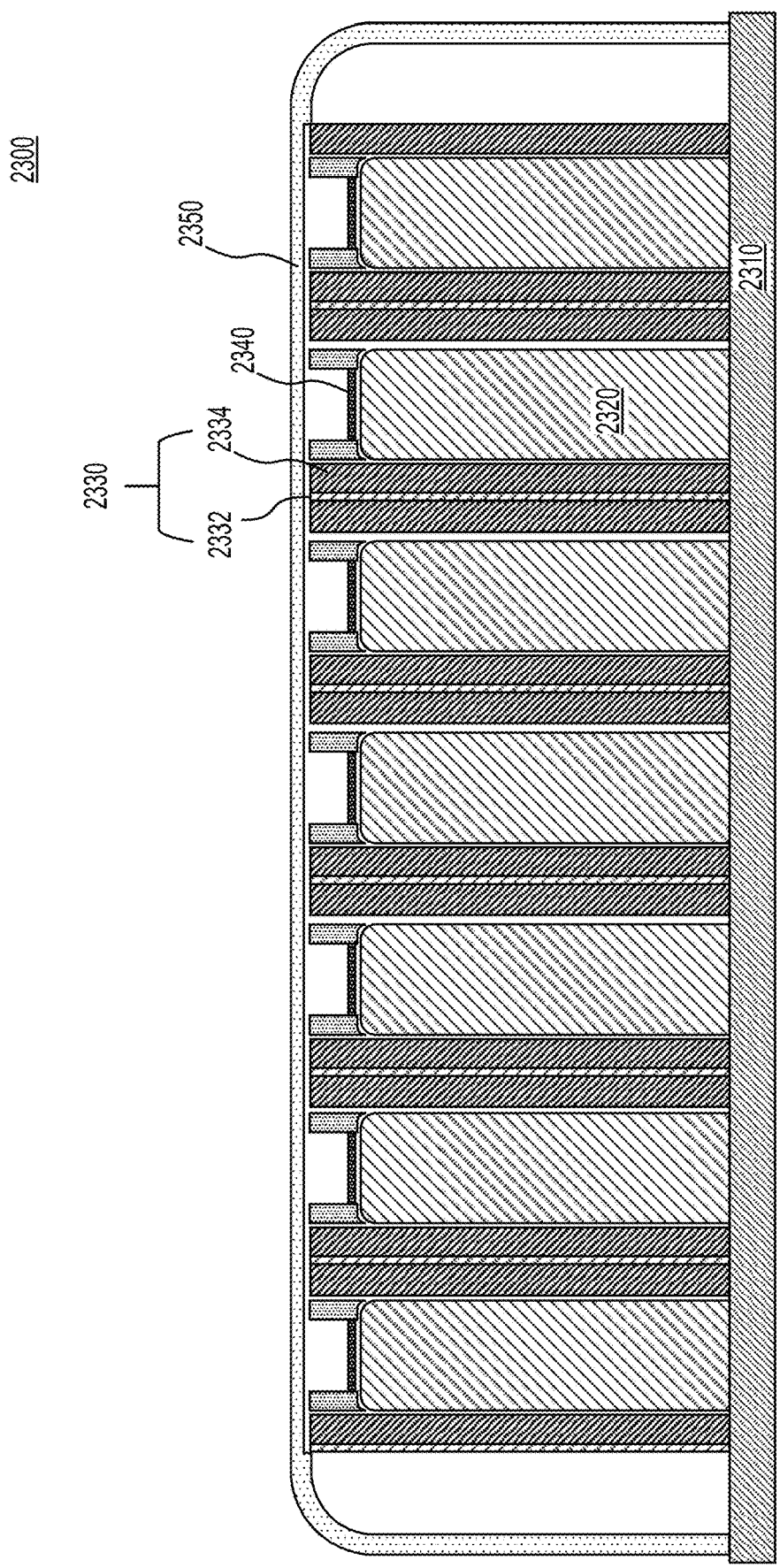
FIG. 23 is a diagram illustrating a cross-sectional view of an exemplary battery pack, consistent with some embodiments of the present disclosure.

FIG. 23 is a diagram illustrating a cross-sectional view of an exemplary battery pack 2300, consistent with some embodiments of the present disclosure. In the embodiments of FIG. 23, compared to the foam cell holder in the aforementioned embodiments, the foam cell holder of the battery pack 2300 may further include a honeycomb core structure to reinforce the battery pack 2300. As discussed above, steel walls of the battery cell can are designed to constrain the pressure such that the hot gasses can vent from the top of the battery cell. However, when an SWR occurs, flammable gasses may be vented out from the side of the battery cell, which would likely cause rapid fire propagation and damages to neighboring cells. In addition, for aircraft batteries, the battery pack 2300 must withstand the impact from a crash. A honeycomb core structure integrated with the foam cell holder can add stiffness to the battery pack 2300, reinforce the battery pack 2300 to withstand the crash impact, and also protect neighboring battery cells from hot gasses when an SWR occurs.

As shown in FIG. 23, in some embodiments, the battery pack 2300 may include a heat exchanger plate 2310 at the bottom side, battery cells 2320, a foam cell holder 2330 including a honeycomb core structure 2332 separating the battery cells 2320 and a foam material 2334 around the battery cells 2320, a current collector 2340 electrically coupled to terminals of the battery cells 2320, and a battery pack enclosure 2350. As described in the above embodiments, the heat exchanger plate 2310 can be attached to the battery pack enclosure 2350 and the foam cell holder 2330 using a thermally conductive adhesive. The battery pack enclosure 2350 provides vent channels 2360 for the vent gas to escape through the pressure relief safety device described in the above embodiments. In combination with the battery pack enclosure 2350 and the heat exchanger plate 2310 attached to the two sides of the honeycomb core structure 2332, the honeycomb core structure 2332 offers a sandwich panel with improved rigidity at minimal weight. Details of the heat exchanger plate 2310, battery cells 2320, the current collector 2340, and the battery pack enclosure 2350 have been described in the above embodiments and thus are not repeated herein for the sake of brevity.

Figure 24:
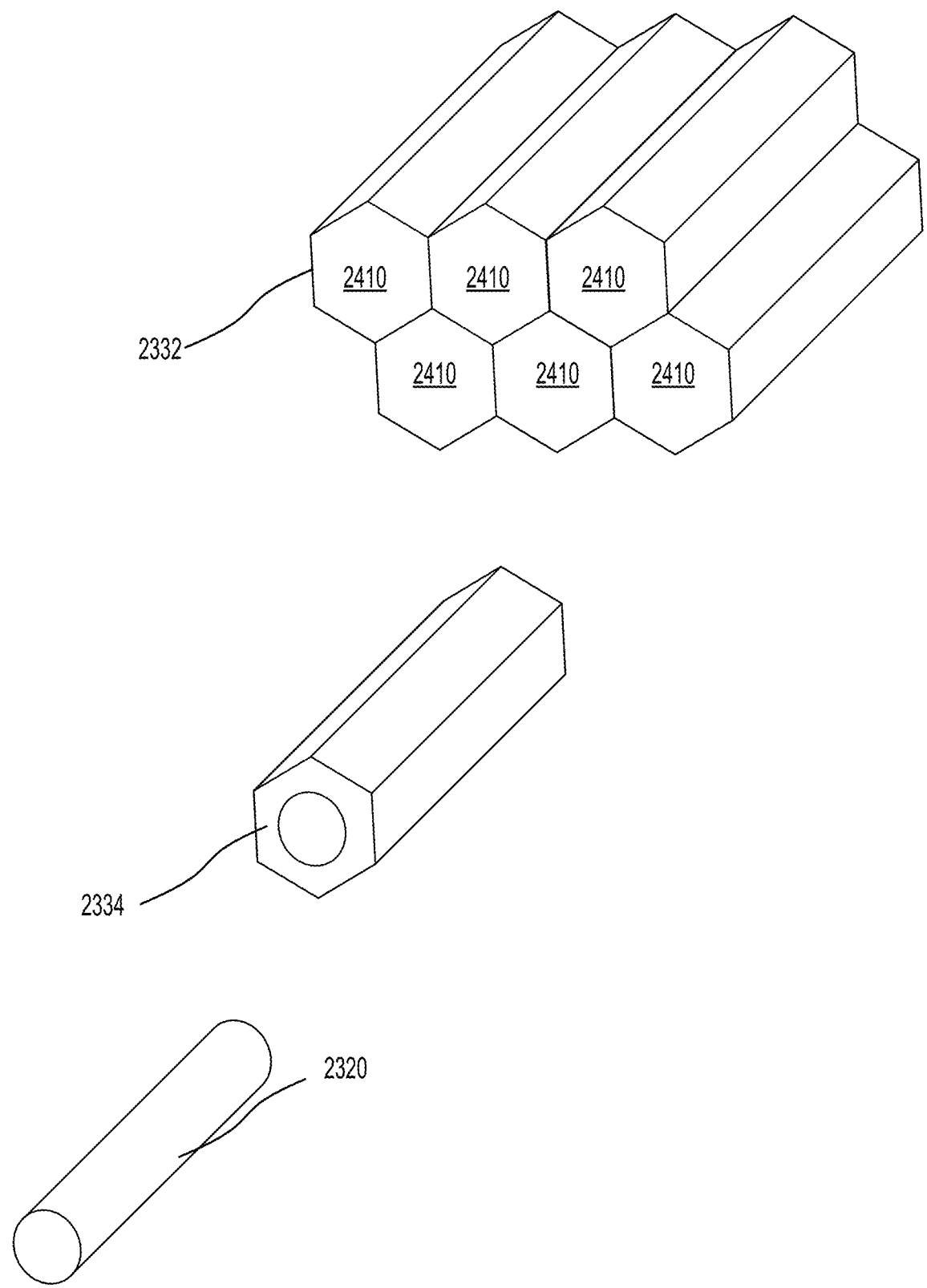
FIG. 24 is a diagram illustrating an exemplary exploded-view of the foam cell holder, consistent with some embodiments of the present disclosure.

FIG. 24 is a diagram illustrating an exemplary exploded-view of the honeycomb core structure 2332, the foam material 2334, and a corresponding battery cell 2320 in the foam cell holder 2330, consistent with some embodiments of the present disclosure. In some embodiments, the honeycomb core structure 2332 may be formed by using a flame-resistant meta-aramid material (e.g., Nomex) or stainless steel, but the present disclosure is not limited thereto. In other embodiments, the honeycomb core structure 2332 may be formed by using various flame-resistant materials. As shown in FIG. 24, the honeycomb core structure 2332 includes multiple hexagonal cells 2410 stacked in layers to form the "honeycomb" structure to achieve a high strength-to-weight ratio. Each hexagonal cell 2410 is configured to contain a corresponding battery cell 2320. In addition, because any two of the adjacent battery cells are separated by the honeycomb core structure 2332, when an SWR occurs, the honeycomb core structure 2332 offers additional protection to block the flammable gasses from entering an adjacent hexagonal cell 2410 and prevent damages to the corresponding battery cell 2320.

Figure 25A:
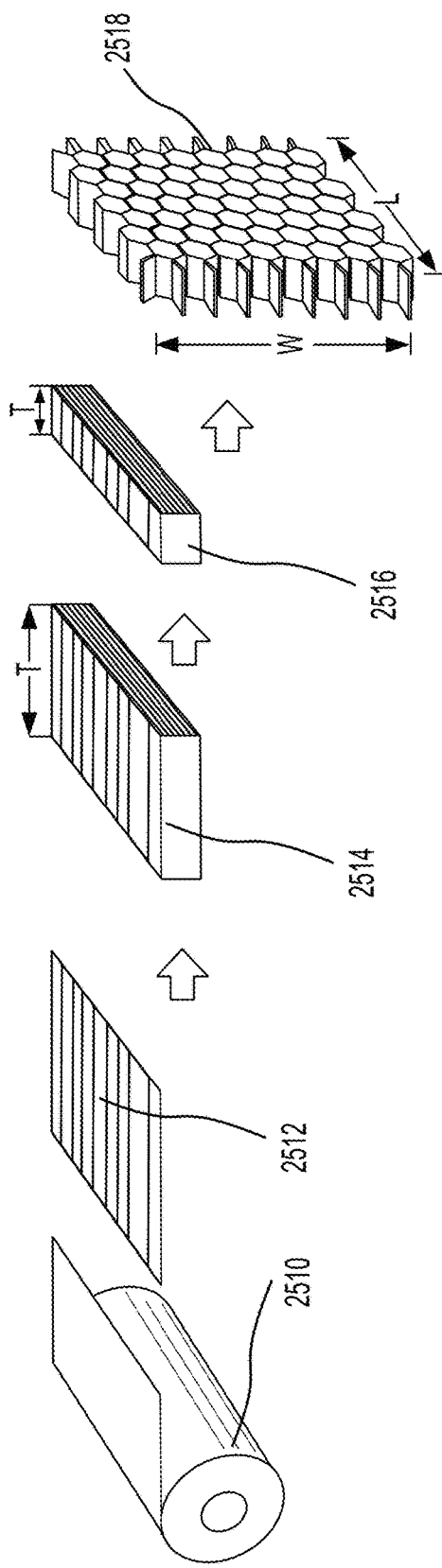
FIG. 25A-FIG. 25C respectively illustrate exemplary manufacturing process for forming a honeycomb core structure, consistent with some embodiments of the present disclosure.
Figure 25B:
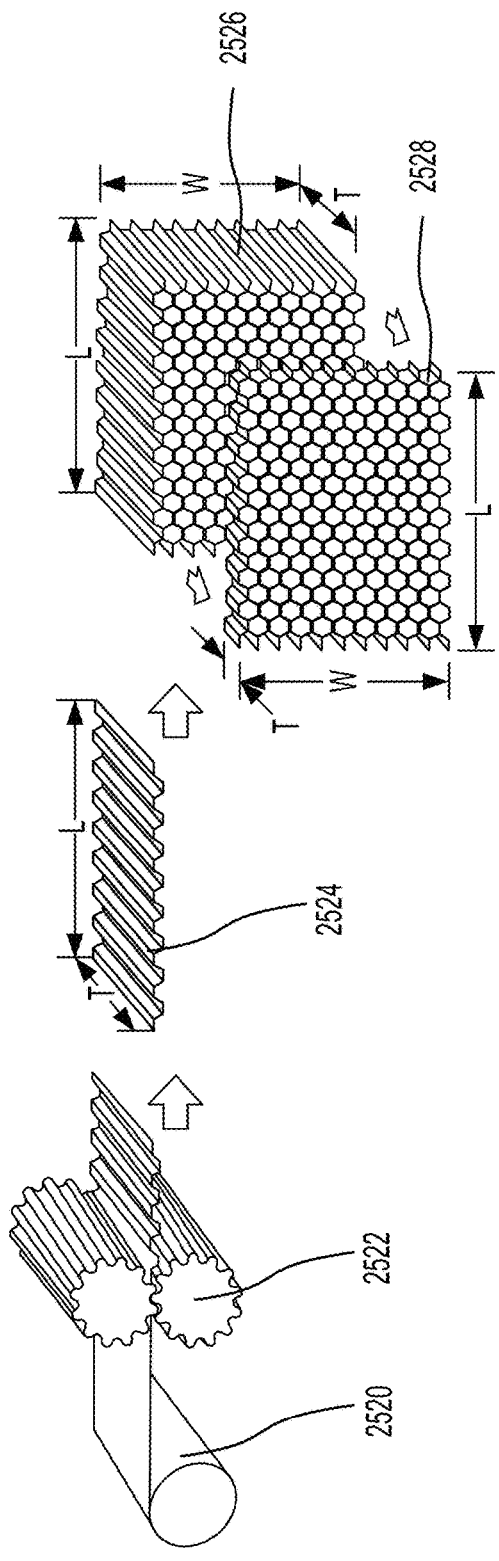
Figure 25C:
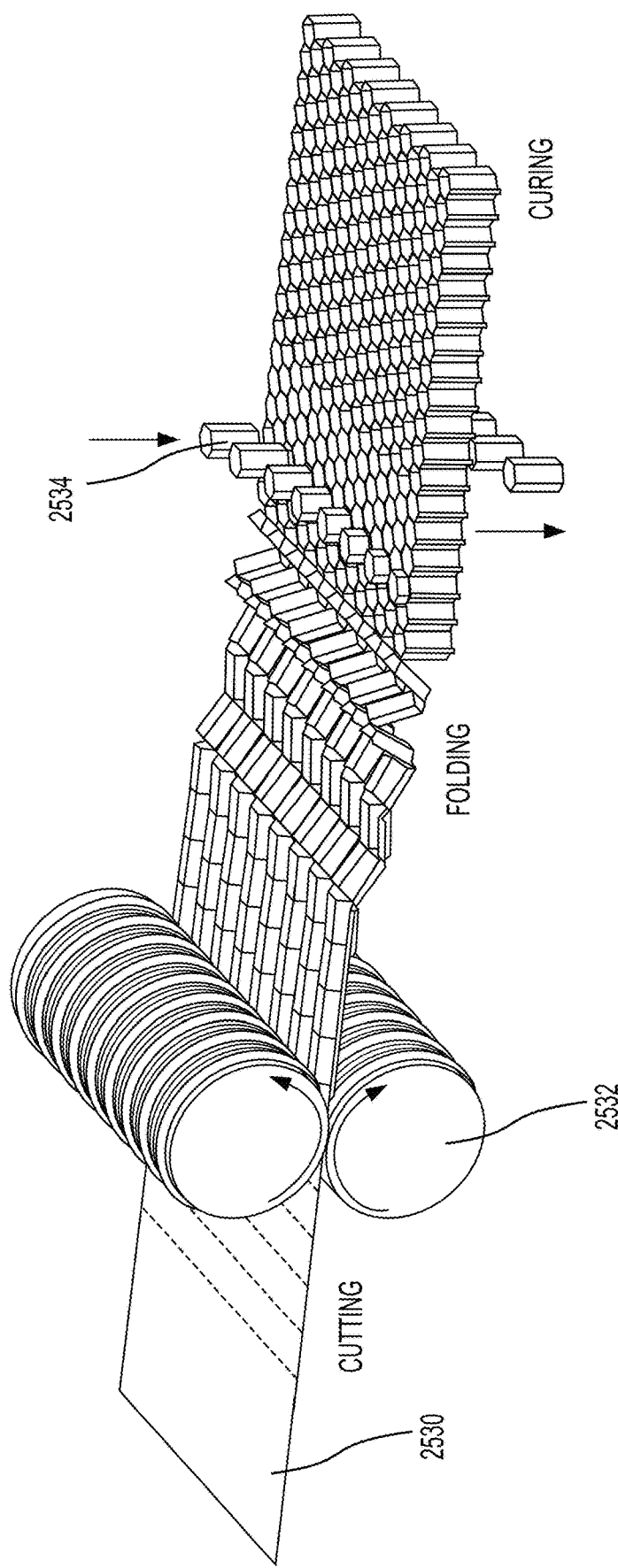

In various embodiments, the honeycomb core structure 2332 may be manufactured using different processes. FIG. 25A-FIG. 25C respectively illustrate exemplary manufacturing process for forming a honeycomb core structure, consistent with some embodiments of the present disclosure. For example, in an expansion honeycomb core manufacturing process shown in FIG. 25A, a roll of foil 2510 may be passed through a printer for adhesive lines 2512 to be printed. Then, after the adhesive lines 2512 are printed, the foil 2510 may be cut to size and stacked into piles using a stacking machine. Then, the stacked sheets may be pressed using a heated press. Accordingly, the adhesive may cure and bond the sheets of foil to form a honeycomb block 2514. The honeycomb block 2514 may be then cut into slices 2516, in which the thickness T of each slice may be tailored according to the requirements. Finally, the honeycomb slice 2516 is expanded to obtain the final product 2518 with the desired width W and length L.

For example, in a corrugation honeycomb core manufacturing method shown in FIG. 25B, a roll of foil 2520 is fed through a corrugated roller 2522 to create a corrugated sheet 2524. Then, an adhesive may be applied to flat sections of the corrugated sheets. Then, by stacking the corrugated sheets with the flat sections held together and curing the adhesive, the honeycomb core block 2526 with the desired width W and length L is formed. The corrugated honeycomb block 2526 may be further cut into slices 2528, in which the thickness T of each slice may be tailored according to the requirements. As shown in FIG. 25C, in some other embodiments, a foil 2530 may be cut and folded by a cutting and folding machine 2532. Then, hexagonal tools 2534 may be used to make cavities for the hexagonal cells. After the curing process is applied, the hexagonal tools 2534 are removed to obtain the final product. In some embodiments, the honeycomb block may be made in large billets, with a thickness of one or more meters. Then, the honeycomb block can be wire-sliced to a desired thickness, such as about ¼ inch to ¾ inch, according to the actual needs.

Figure 26:
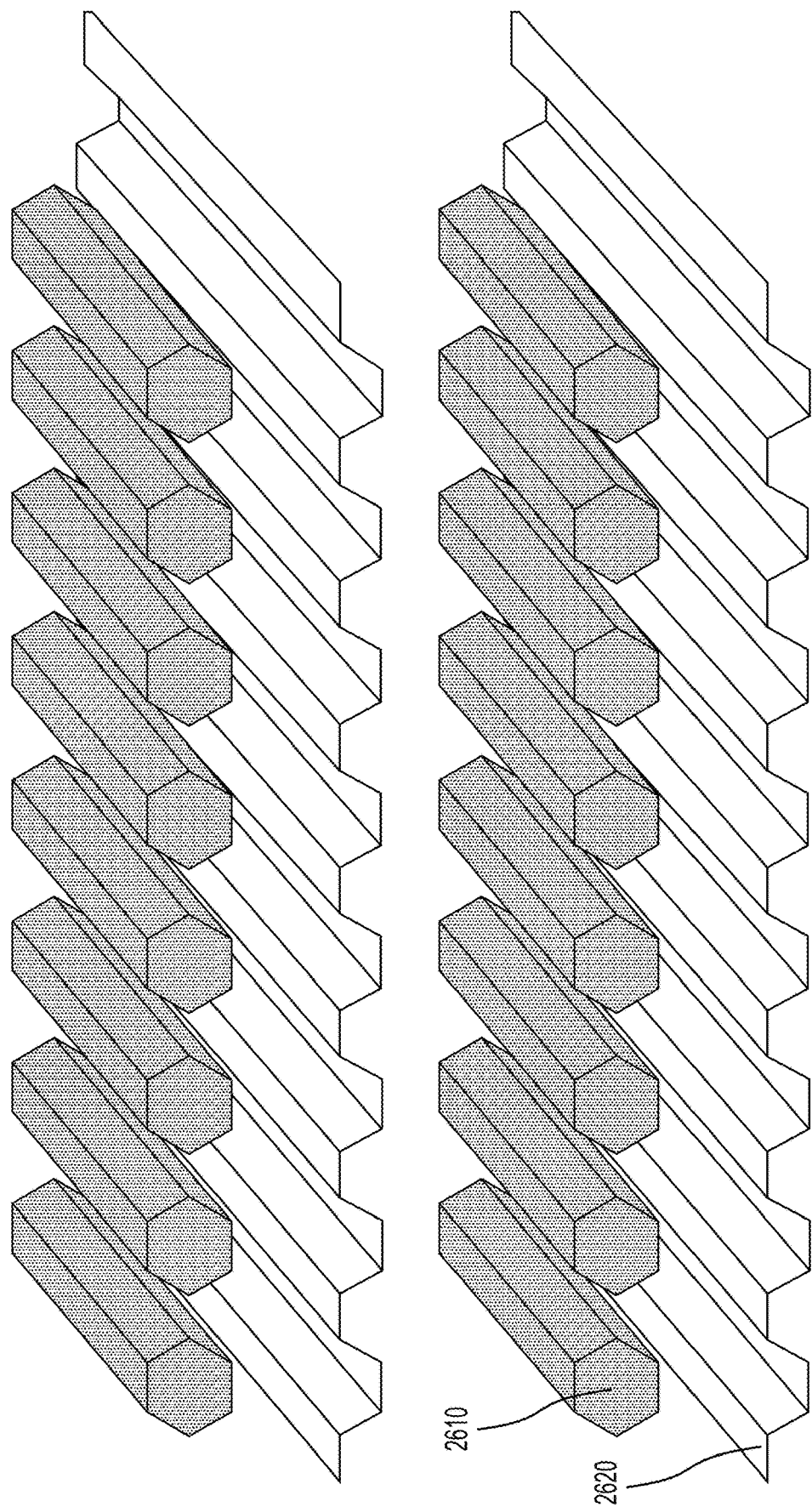
FIG. 26 illustrates an exemplary manufacturing process for forming a foam cell holder with a honeycomb core structure, consistent with some embodiments of the present disclosure.

FIG. 26 illustrates an exemplary manufacturing process for forming a foam cell holder with a honeycomb core structure, consistent with some embodiments of the present disclosure. As shown in FIG. 26, long foam cores 2610 can be made. In some embodiments, each foam core 2610 has a desired hexagonal outer shape and a hole at the center for accommodating the battery cell. For example, the foam cores 2610 may be machined from a foam billet or made from extruded foam.

Corrugated sheets 2620 can be made and wet with the resin, so as to bond the corrugated sheets 2620 to the foam cores 2610 and bond the corrugated sheets 2620 together to make the honeycomb structure. As described above, the corrugated sheets 2620 may be a flame-resistant meta-aramid material (e.g., Nomex) or stainless steel. Then, the foam cores 2610 are stacked on top of a corresponding corrugated sheet 2620. Accordingly, the stacking process is repeated until the staggered layers of the foam cores 2610 and the corrugated sheets 2620 form a corrugated honeycomb block with aa desired size. In some embodiments, the corrugated honeycomb block may be a module or an entire pack. Then, a curing process and a slicing process can be performed to the corrugated honeycomb block to obtain the sliced foam cell holder with the desired thickness. Then, the cell holes can be machined along with the vent channels and the current collector to obtain the foam cell holder.

In some other embodiments, the foam cell holder with the honeycomb core structure may be manufactured by using alternative processes, and thus the processes shown in FIG. 26 are merely examples and not meant to limit the present disclosure. For example, a standard honeycomb structure core can be potted with the foam material. The cells can be filled and then post machined for the cell holes. In some embodiments, inserts may be installed in the potting procedure to leave the cell holes. In some embodiments, the cells may be potted in-situ. In some other embodiments, foam inserts may be installed in a standard honeycomb structure core. For example, the foam inserts may be bonded or partially bonded to the honeycomb structure core, as a part of the build-up process of the cell stack.

Figure 27:
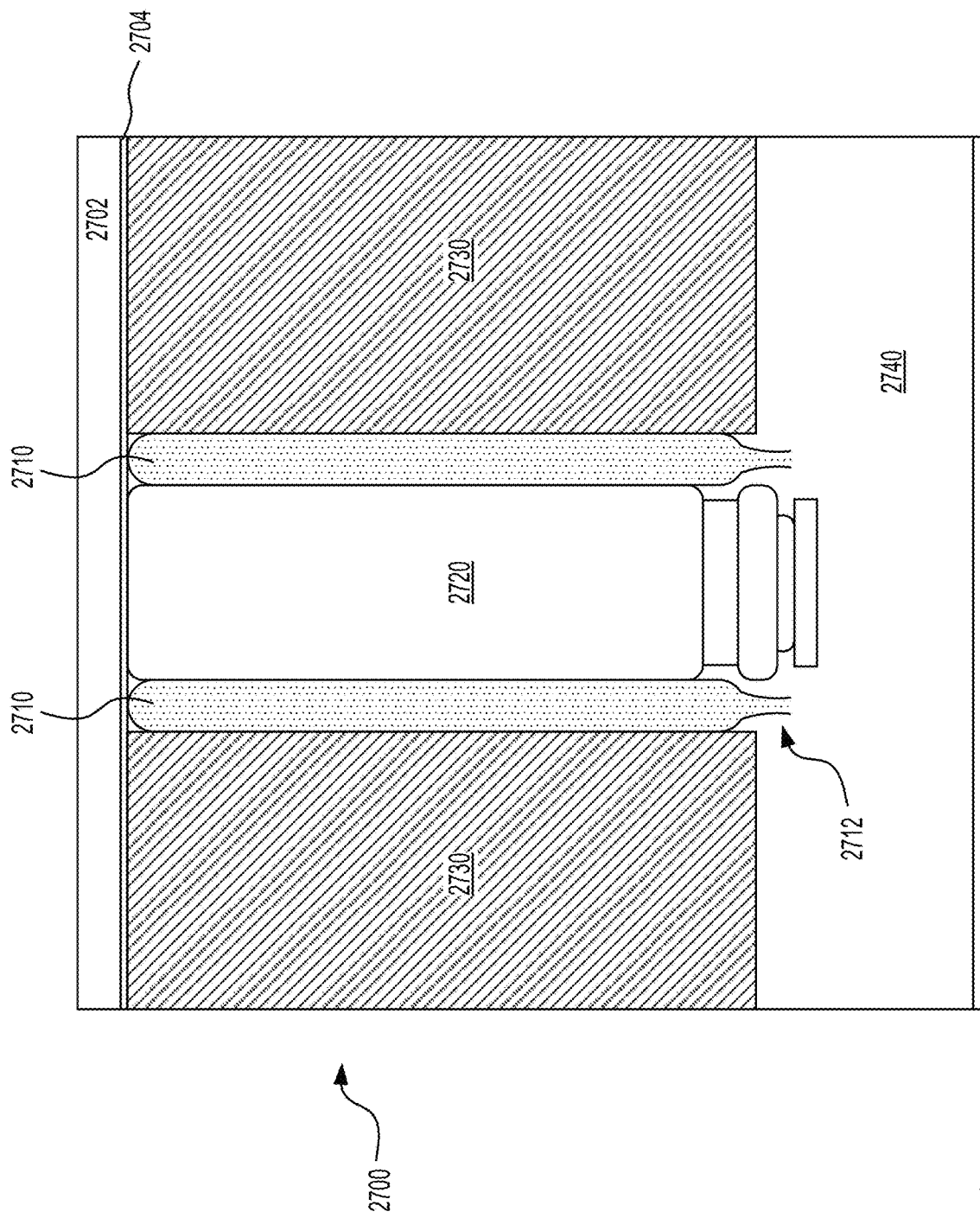
FIG. 27 is a diagram illustrating a cross-sectional view of an exemplary foam cell holder, consistent with some embodiments of the present disclosure.

FIG. 27 is a diagram illustrating a cross-sectional view of an exemplary foam cell holder 2700, consistent with some embodiments of the present disclosure. Similar to the embodiments above, a heat exchanger plate 2702 can be attached to the foam cell holder 2700 using a Thermal Interface Material (TIM) 2704. In the embodiments of FIG. 27, compared to the foam cell holders in the aforementioned embodiments, the foam cell holder 2700 further includes phase change materials (PCMs) between the battery cell 2720 and the foam material 2730. Specifically, the foam cell holder 2700 includes a PCM sleeve 2710 containing a phase change material, which may absorb significant heat when the phase changes (e.g., changing from solid to liquid). For example, the PCM sleeve 2710 may be a mylar pouch containing magnesium sulfate heptahydrate (MgSO4 7H2O), also known as epsom salt or epsomite. The PCM sleeve 2710 may provide pouch seams 2712 at one side adjacent to the venting space 2740, so that the released water due to the phase change may turn into steam and be vented into the venting space 2740, which removes the accumulated energy from the system. In some embodiments, the pouch seams 2712 may be thermal welded seams. For example, a thermal welded seal may be created by applying heat to the materials in order to melt them and fuse them together to form a strong bond. The strength and durability of the bond depend on various factors such as the temperature, pressure, and duration of the welding process, as well as the properties of the materials being joined.

Figure 28A:
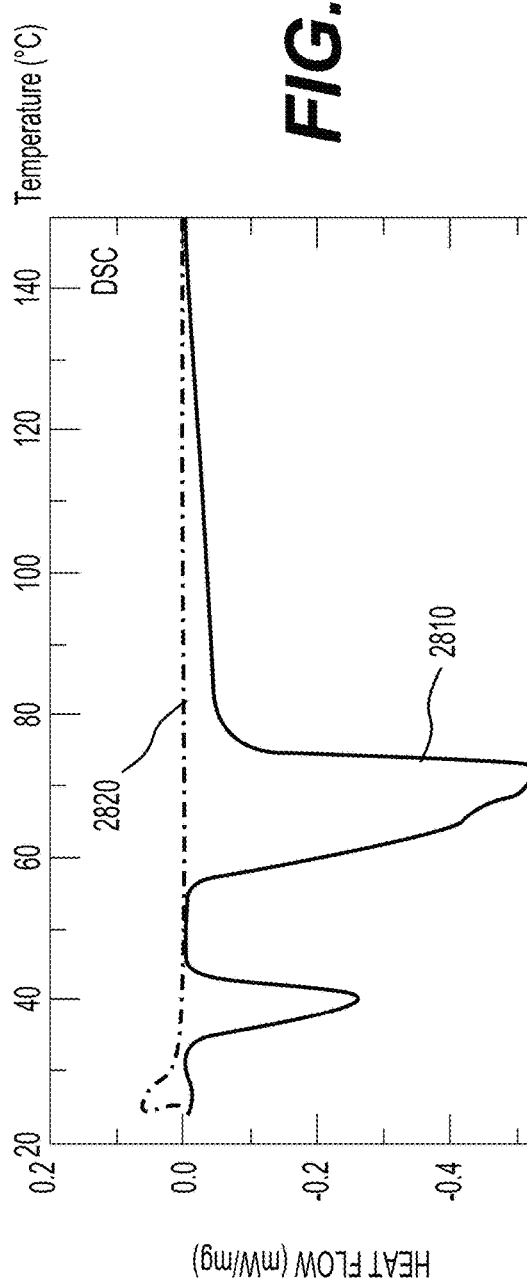
FIG. 28A illustrates exemplary a Differential Scanning calorimetry (DSC) analysis of the dehydration and hydration of the epsomite, consistent with some embodiments of the present disclosure.
Figure 28B:
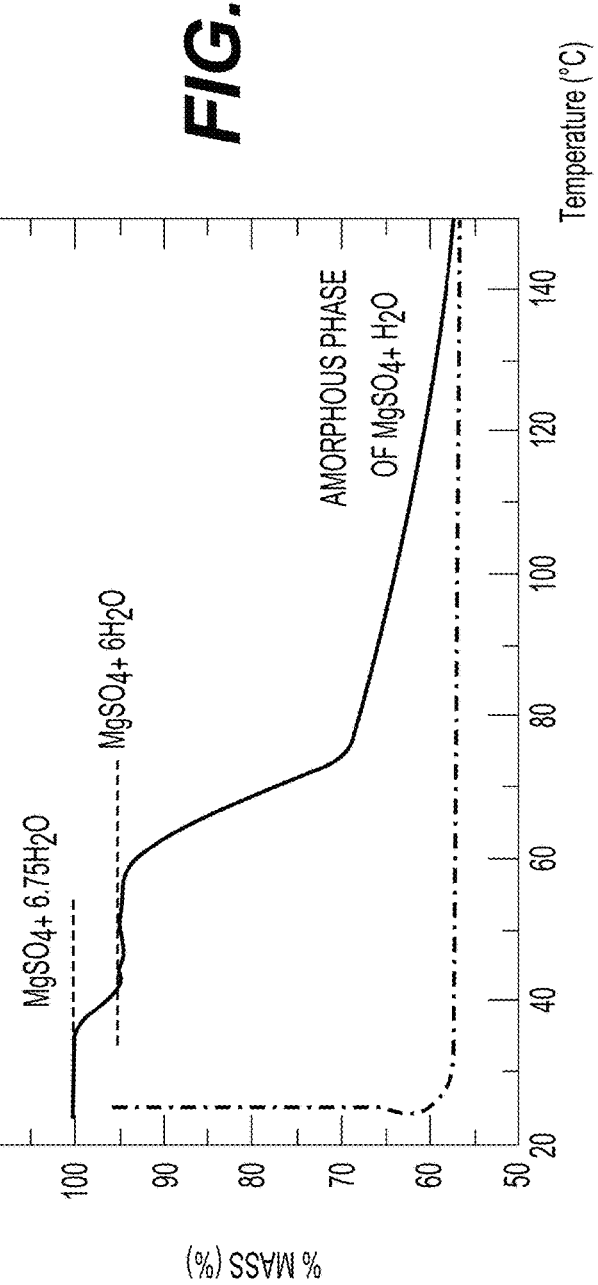
FIG. 28B illustrates an exemplary thermogravimetry analysis (TGA) of the epsomite, consistent with some embodiments of the present disclosure.

FIG. 28A illustrates exemplary a Differential Scanning calorimetry (DSC) analysis of the dehydration and hydration of the epsomite, consistent with some embodiments of the present disclosure. The x-axis and y-axis respectively denote the temperature (in Celsius) and the heat flow. Lines 2810 and 2820 respectively denote the DSC curves of the dehydration and hydration. FIG. 28B illustrates an exemplary thermogravimetry analysis (TGA) of the epsomite, consistent with some embodiments of the present disclosure. The x-axis and y-axis respectively denote the temperature (in Celsius) and the percentage of initial mass. A line 2830 denote the TGA curve from the thermal reaction when the epsomite is heated.

As shown in the analysis of FIG. 28A and FIG. 28B, upon being heated above about 60° C., which is about the thermal runaway temperature of the battery cells, the epsomite undergoes a dehydration process, releasing water molecules and absorbing heat. In some embodiments, as the temperature continues to rise, the dehydration process will accelerate, and more water molecules will be removed from the epsomite crystals. The anhydrous form of magnesium sulfate that remains after the dehydration process has different physical properties from the hydrated form. For example, anhydrous magnesium sulfate is a white crystalline powder that is less soluble in water than the hydrated form. Thus, the PCM sleeve containing the epsomite provides a safe and cost-effective solution to avoid damages to adjacent cells when a thermal runaway occurs by removing the heat accumulated in the battery pack, as the epsomite absorbs significant heat to dehydrate, and the released water further absorbs heat as it turns into the steam and is vented from the battery pack.

The embodiments may further be described using the following clauses:

1. An apparatus for organizing battery cells, comprising:
a block comprising:
a plurality of sleeves forming a plurality of chambers, each chamber being configured to accommodate a battery cell;
a first sheet configured to locate the plurality of sleeves; and
a foam structure surrounding the plurality of sleeves,
wherein the block is configured to:
organize the battery cells into battery cell groups, each battery cell group comprising a plurality of the battery cells, each of the battery cells in the battery cell group adjacent to at least another of the battery cells in the battery cell group, wherein each battery cell group is adjacent to at least another battery cell group,
separate each battery cell group from its adjacent battery cell groups using a thermally insulating material, and
prevent gas from entering into each battery cell group from its adjacent battery cell groups.
2. The apparatus of clause 1, wherein the sleeves and the foam structure comprise a flame-retardant material.
3. The apparatus of clause 1, wherein the sleeves and the foam structure comprise a thermally insulating material.
4. The apparatus of clause 1, wherein the sleeves and the foam structure comprise a material that is impermeable to gas released by the battery cells.
5. The apparatus of clause 1, wherein the sleeves and the foam structure comprise a material that is resistant to water absorption.
6. The apparatus of clause 1, wherein the foam structure comprises polyurethane.

7. The apparatus of clause 1, wherein the plurality of sleeves comprise a carbon fiber composite material.
8. The apparatus of clause 1, wherein the first sheet comprises a fiberglass composite material.
9. The apparatus of clause 1, wherein the first sheet is configured to locate the sleeves to provide a first distance between adjacent battery cells in a battery cell group of less than or equal to 1.5 mm.
10. The apparatus of clause 1, wherein the first sheet is configured to locate the sleeves to provide a first distance between adjacent battery cells in a battery cell group of less than or equal to 1.25 mm.
11. The apparatus of clause 1, wherein the first sheet is configured to locate the sleeves to provide a first distance between adjacent battery cells in a battery cell group of less than or equal to 1.0 mm.
12. The apparatus of clause 1, wherein the first sheet is configured to locate the sleeves to provide a first distance between adjacent battery cells in a battery cell group of less than or equal to 0.75 mm.
13. The apparatus of clause 1, wherein the first sheet is configured to locate the sleeves to provide a second distance between adjacent battery cell groups in a battery column of less than or equal to 1.5 mm.
14. The apparatus of clause 1, wherein the first sheet is configured to locate the sleeves to provide a second distance between adjacent battery cell groups in a battery column of less than or equal to 1.25 mm.
15. The apparatus of clause 1, wherein the first sheet is configured to locate the sleeves to provide a second distance between adjacent battery cell groups in a battery column of less than or equal to 1.0 mm.
16. The apparatus of clause 1, wherein the first sheet is configured to locate the sleeves to provide a second distance between adjacent battery cell groups in a battery column of less than or equal to 0.75 mm.
17. The apparatus of clause 1, wherein the block is further configured to:
arrange the battery cells of each battery cell group into their corresponding battery cell row, and
arrange the battery cell rows into a plurality of battery columns, each battery column adjacent to at least another battery column.
18. The apparatus of clause 17, wherein the battery cells in a battery column are arranged in a two-dimensional repeating pattern.
19. The apparatus of clause 18 wherein the two-dimensional repeating pattern forms a honeycomb structure.
20. The apparatus of clause 17, further comprising:
a plurality of electrical conductors attached to the block, each electrical conductor corresponding to a battery column.
21. The apparatus of clause 20, wherein the block comprises one or more alignment features configured to position the plurality of electrical conductors relative to the battery columns.
22 The apparatus of clause 20, wherein the block comprises one or more mounting features to mount the plurality of electrical conductors on the block.
23. The apparatus of clause 20, wherein the electrical conductors are configured such that, in operation, an overall direction of current flow through one of the battery columns is opposite to an overall direction of current flow through its adjacent battery columns.
24 The apparatus of clause 17, wherein the first sheet is configured to locate the sleeves to provide a third distance between adjacent battery columns of less than or equal to 10.0 mm.
25. The apparatus of clause 17, wherein the first sheet is configured to locate the sleeves to provide a third distance between adjacent battery columns of less than or equal to 8.0 mm.
26 The apparatus of clause 17, wherein the first sheet is configured to locate the sleeves to provide a third distance between adjacent battery columns of less than or equal to 6.0 mm.
27. The apparatus of clause 17, wherein the first sheet is configured to locate the sleeves to provide a third distance between adjacent battery columns of greater than or equal to 4.0 mm.
28. The apparatus of clause 1, wherein the block further comprises a second sheet attached to a bottom surface of the foam structure.
29 The apparatus of clause 28, wherein the second sheet comprises a fiberglass composite material.
30. A method for assembling an apparatus for organizing battery cells, comprising:
locating a plurality of sleeves to a first sheet to provide a plurality of chambers, each chamber being configured to accommodate a battery cell; and
casting a foam material around the plurality of sleeves to provide a foam structure protecting the battery cells, wherein the first sheet is configured to position the plurality of sleeves before the casting.
31 The method of clause 30, wherein the sleeves and the foam structure comprise a flame-retardant material.
32. The method of clause 30, wherein the sleeves and the foam structure comprise a thermally insulating material.
33 The method of clause 30, wherein the sleeves and the foam structure comprise a material that is impermeable to gas released by the battery cells.
34. The method of clause 30, wherein the sleeves and the foam structure comprise a material that is resistant to water absorption.
35 The method of clause 30, wherein the foam structure comprises polyurethane.
36. The method of clause 30, wherein the plurality of sleeves comprise a carbon fiber composite material.
37. The method of clause 30, wherein the first sheet comprises a fiberglass composite material.
38. The method of clause 30, further comprising:
locating a second sheet attached to a bottom surface of the foam structure.
39. The method of clause 38, wherein the second sheet comprises a fiberglass composite material.
40. An apparatus for organizing battery cells, comprising:
a block comprising a plurality of hexagonal cells, each hexagonal cell configured to accommodate a battery cell, the block comprising:
a honeycomb core structure forming the plurality of hexagonal cells; and
a foam material within each of the hexagonal cells to provide a foam structure surrounding a corresponding battery cell to protect the corresponding battery cell.
41 The apparatus of clause 40, wherein the battery cell has different thicknesses at an upper portion and a lower portion.

42. The apparatus of clause 41, wherein the upper portion adjacent to a top vent region of the battery cell is thicker than the lower portion away from the top vent region.

43. The apparatus of clause 41, wherein the upper portion is the top one-third of the battery cell.

44. The apparatus of clause 40, wherein the battery cell comprises a can body and a sleeve structure covering an upper portion of the can body.

45. The apparatus of clause 40, wherein the block further comprises:
a sleeve containing a phase change material between the battery cell and the foam material.

46. The apparatus of clause 45, wherein the sleeve is configured to provide pouch seams at one side adjacent to a venting space.

47. The apparatus of clause 45, wherein the phase change material comprises epsomite.

48. The apparatus of clause 47, wherein the epsomite is configured to undergo a dehydration process and release water during a thermal runaway.

49 The apparatus of clause 47, wherein the released water is configured to absorb heat and turn into steam during the thermal runaway.

50 The apparatus of clause 40, wherein the honeycomb core structure is formed by a flame-resistant meta-aramid material or stainless steel.

The foregoing description has been presented for purposes of illustration. It is not exhaustive and does not limit the disclosure to the precise forms or embodiments disclosed. Modifications and adaptations of the disclosure will be apparent to those skilled in the art from consideration of the specification and practice of the disclosed embodiments of the disclosures disclosed herein.

What is claimed is:

1. An apparatus for organizing battery cells, comprising:
a block comprising a plurality of hexagonal cells, each hexagonal cell configured to accommodate a battery cell with a can wall having first thickness at an upper portion that differs from a second thickness at a lower portion of the can wall, the block comprising:
    a honeycomb core structure forming the plurality of hexagonal cells;
    a foam material within each of the hexagonal cells to provide a foam structure surrounding a corresponding battery cell to protect the corresponding battery cell; and
    a sleeve containing a phase change material between the battery cell and the foam material, wherein the sleeve is configured to provide pouch seams at one side of the sleeve adjacent to a venting space.

2. The apparatus of claim 1, wherein the upper portion adjacent to a top vent region of the battery cell is thicker than the lower portion away from the top vent region.

3. The apparatus of claim 1, wherein the upper portion is the top one-third of the battery cell.

4. The apparatus of claim 1, wherein the battery cell comprises a sleeve structure, separate from the sleeve, covering an upper portion of the can wall.

5. The apparatus of claim 1, wherein the phase change material comprises epsomite.

6. The apparatus of claim 5, wherein the epsomite is configured to undergo a dehydration process and release water during a thermal runaway.

7. The apparatus of claim 6, wherein the released water is configured to absorb heat and turn into steam during the thermal runaway.

8. The apparatus of claim 1, wherein the honeycomb core structure comprises a flame-resistant meta-aramid material or stainless steel.

9. The apparatus of claim 1, wherein the hexagonal cells are configured to block a flow of gas.

10. The apparatus of claim 1, wherein the pouch seams are thermal welded seams.

11. An apparatus for organizing battery cells, comprising:
a block comprising a plurality of cells, each cell configured to accommodate a battery cell, each battery cell with a can wall having a first thickness at an upper portion of the can wall that differs from a second thickness at a lower portion of the can wall, the block comprising:
    a structure forming the plurality of cells;
    a foam material within each of the cells to provide a foam structure surrounding a corresponding battery cell to protect the corresponding battery cell; and
    a sleeve containing a phase change material between the battery cell and the foam material, wherein the sleeve is configured to provide pouch seams at one side of the sleeve adjacent to a venting space.

12. The apparatus of claim 11, wherein the upper portion adjacent to a top vent region of the battery cell is thicker than the lower portion away from the top vent region.

13. The apparatus of claim 12, wherein the upper portion is the top one-third of the battery cell.

14. The apparatus of claim 11, wherein the pouch seams are thermal welded seams.

15. The apparatus of claim 11, wherein:
the structure is a honeycomb core structure,
the plurality of cells are a plurality of hexagonal cells, and
the honeycomb core structure is formed by a flame-resistant meta-aramid material or stainless steel.

16. The apparatus of claim 15, wherein the hexagonal cells are configured to block a flow of gas.

17. The apparatus of claim 11, wherein the battery cell comprises a sleeve structure, separate from the sleeve, covering an upper portion of the can wall.

18. The apparatus of claim 11, wherein the phase change material comprises epsomite, the epsomite being configured to undergo a dehydration process and release water during thermal runaway.

19. An apparatus for organizing battery cells, comprising:
a block comprising a plurality of hexagonal cells, each hexagonal cell configured to accommodate a battery cell, the block comprising:
    a honeycomb core structure forming the plurality of hexagonal cells;
    a foam material within each of the hexagonal cells to provide a foam structure surrounding a corresponding battery cell to protect the corresponding battery cell; and
    a sleeve containing a phase change material between the battery cell and the foam material,
    wherein the sleeve is configured to provide pouch seams at one side adjacent to a venting space.

20. The apparatus of claim 19, wherein an upper portion of the battery cell adjacent to a top vent region of the battery cell is thicker than a lower portion away from the top vent region.

21. The apparatus of claim 19, wherein each battery cell has with a first thickness at an upper portion of the battery cell that differs from a second thickness at a lower portion of the battery cell.

22. The apparatus of claim 21, wherein the upper portion adjacent to a top vent region of the battery cell is thicker than the lower portion away from the top vent region.

23. The apparatus of claim 22, wherein the upper portion is the top one-third of the battery cell.

24. The apparatus of claim 19, wherein the pouch seams are thermal welded seams.

25. The apparatus of claim 19, wherein the battery cell comprises a sleeve structure, separate from the sleeve, covering an upper portion of the battery cell.

26. The apparatus of claim 19, wherein the phase change material comprises epsomite, the epsomite being configured to undergo a dehydration process and release water during a thermal runaway.

27. The apparatus of claim 19, wherein the honeycomb core structure comprises a flame-resistant meta-aramid material or stainless steel.

28. The apparatus of claim 19, wherein the hexagonal cells are configured to block a flow of gas.

\* \* \* \* \*